US012561574B2

(12) United States Patent
Denis et al.

(10) Patent No.: US 12,561,574 B2
(45) Date of Patent: Feb. 24, 2026

(54) DETERMINISTICALLY DEFINED, DIFFERENTIABLE, NEUROMORPHICALLY-INFORMED I/O-MAPPED NEURAL NETWORK

(71) Applicant: Seer Global, Inc., New York, NY (US)

(72) Inventors: Andrew Denis, Prescott, AZ (US); Harry Howard Wills, Jr., Princeville, HI (US)

(73) Assignee: ZON GLOBAL IP INC., New York, NY (US)

( * ) Notice: Subject to any disclaimer, the term of this patent is extended or adjusted under 35 U.S.C. 154(b) by 0 days.

(21) Appl. No.: 18/934,967

(22) Filed: Nov. 1, 2024

(65) Prior Publication Data

US 2025/0217660 A1     Jul. 3, 2025

Related U.S. Application Data

(63) Continuation-in-part of application No. 18/787,514, filed on Jul. 29, 2024, now Pat. No. 12,236,964.

(Continued)

(51) Int. Cl.
*G10L 25/30*        (2013.01)
*G06F 17/13*        (2006.01)
(Continued)

(52) U.S. Cl.
CPC .............. *G06N 3/092* (2023.01); *G10L 25/30* (2013.01)

(58) Field of Classification Search
CPC ......... G10L 21/02; G10L 25/30; G06F 17/13; G06N 3/06; G06N 3/061; G06N 3/065; G06N 3/084; G06N 3/082; G06N 3/086
(Continued)

(56) References Cited

U.S. PATENT DOCUMENTS 9,842,605 B2     12/2017  Lu et al.
10,176,809 B1     1/2019  Piérard
(Continued)

FOREIGN PATENT DOCUMENTS

CN        117521729 A        2/2024
EP          1703774 A        9/2006
(Continued)

OTHER PUBLICATIONS

Brandstetter et al., "Message Passing Neural PDE Solvers", International Conference on Learning Representations (ICLR), Mar. 20, 2023, pp. 1 to 27. (Year: 2023).*
(Continued)

*Primary Examiner* — Martin Lerner
(74) *Attorney, Agent, or Firm* — NEO IP

(57)        ABSTRACT

A system includes a neural network architecture. It a new type of neural network able to process statically mapped as well as temporally sequenced information with much better power utilization, data requirements and operational efficiencies. Unlike prior artificial neural network approaches, the present invention includes uniquely defined sets of relationships. The unique use of non-linear input-output mapping functions combined with a time-variant pilot function, and a deterministically bounded, fully-differentiable, nonlinear resonance field subsystem allows the present invention to be readily deployed to work with virtually any neural network architecture/implementation including photonic, opto-acoustic or other variants. This dramatically reduces the size and complexity of virtually any neural network architecture because it offloads what would otherwise need to be done in the form of back/forward propagation trained weights and biases to much simpler, more scalable differentiable input/output mapping functions.

10 Claims, 30 Drawing Sheets

Neuromorphic Field Representation

Related U.S. Application Data

(60) Provisional application No. 63/541,891, filed on Oct. 1, 2023, provisional application No. 63/529,724, filed on Jul. 29, 2023.

(51) Int. Cl.
   *G06N 3/082* (2023.01)
   *G06N 3/086* (2023.01)
   *G06N 3/092* (2023.01)

(58) Field of Classification Search
   USPC ........ 704/232, 233, 226; 706/19, 38, 44, 27; 708/804
   See application file for complete search history.

(56) References Cited

U.S. PATENT DOCUMENTS

| | | | |
|---|---|---|---|
| 10,211,856 B1 * | 2/2019 | Petre ...................... G06N 3/063 |
| 10,373,300 B1 | 8/2019 | Besenbruch et al. |
| 10,460,747 B2 | 10/2019 | Roblek et al. |
| 10,489,936 B1 | 11/2019 | Zafar et al. |
| 10,963,540 B2 * | 3/2021 | Raissi ..................... G06F 17/13 |
| 10,991,379 B2 | 4/2021 | Hijazi et al. |
| 11,049,481 B1 | 6/2021 | Li et al. |
| 11,082,789 B1 | 8/2021 | Mimilakis et al. |
| 11,462,209 B2 | 10/2022 | Arik et al. |
| 11,514,925 B2 | 11/2022 | Jin et al. |
| 11,562,764 B2 | 1/2023 | Schmidt et al. |
| 11,645,356 B2 | 5/2023 | O'Donncha et al. |
| 11,657,828 B2 | 5/2023 | Quillen |
| 11,728,826 B2 | 8/2023 | Pope |
| 11,854,554 B2 | 12/2023 | Chang et al. |
| 11,876,969 B2 | 1/2024 | Said |
| 11,887,602 B1 | 1/2024 | Wilson et al. |
| 11,978,466 B2 | 5/2024 | Zhang et al. |
| 11,985,179 B1 | 5/2024 | Tacer et al. |
| 12,001,950 B2 | 6/2024 | Zhang et al. |
| 12,008,332 B1 | 6/2024 | Gardner et al. |
| 12,020,679 B1 | 6/2024 | Xu et al. |
| 12,062,380 B2 | 8/2024 | Kleijn et al. |
| 12,141,347 B1 * | 11/2024 | Souden ............... G10L 21/0208 |
| 12,168,176 B2 | 12/2024 | Rios |
| 12,198,030 B1 | 1/2025 | Mysore et al. |
| 12,236,964 B1 | 2/2025 | Denis |
| 12,382,051 B2 | 8/2025 | Denis et al. |
| 12,387,736 B2 | 8/2025 | Denis et al. |
| 2001/0050953 A1 | 12/2001 | Kempf |
| 2003/0115054 A1 | 6/2003 | Iso-Sipila |
| 2011/0188755 A1 * | 8/2011 | Bratkovski ............. G06F 3/045 |
| | | 382/181 |
| 2015/0208028 A1 | 7/2015 | Knutson et al. |
| 2017/0024652 A1 | 1/2017 | Kipersztok et al. |
| 2017/0099200 A1 | 4/2017 | Ellenbogen et al. |
| 2018/0174026 A1 * | 6/2018 | Davies .................... G06N 3/063 |
| 2018/0366138 A1 | 12/2018 | Ramprashad |
| 2019/0237096 A1 | 8/2019 | Trella et al. |
| 2020/0058317 A1 | 2/2020 | Gaalaas |
| 2020/0193276 A1 * | 6/2020 | Wozniak ................ G06N 3/048 |
| 2020/0293889 A1 * | 9/2020 | Terasaki ................. G06N 3/063 |
| 2021/0065731 A1 | 3/2021 | Matsukawa et al. |
| 2021/0125629 A1 | 4/2021 | Bryan |
| 2021/0142816 A1 | 5/2021 | Yamada |
| 2021/0150769 A1 | 5/2021 | Babaheidarian |
| 2022/0013132 A1 | 1/2022 | Engel et al. |
| 2022/0092413 A1 | 3/2022 | Wang et al. |
| 2022/0101872 A1 | 3/2022 | Kumar et al. |
| 2022/0174328 A1 | 6/2022 | Toderici et al. |
| 2022/0180165 A1 * | 6/2022 | Ishii ....................... G06N 3/065 |
| 2022/0182455 A1 | 6/2022 | Zimmerman et al. |
| 2022/0198278 A1 | 6/2022 | O'Donncha et al. |
| 2022/0208204 A1 | 6/2022 | Sivaraman Narayanaswamy et al. |
| 2022/0215848 A1 | 7/2022 | Xiao et al. |
| 2022/0238091 A1 | 7/2022 | Jasleen et al. |
| 2022/0253671 A1 | 8/2022 | Chamberlain et al. |
| 2022/0269923 A1 * | 8/2022 | Nadji-Tehrani ........ G06N 3/045 |
| 2022/0337442 A1 | 10/2022 | Bahl |
| 2023/0019463 A1 | 1/2023 | Duke et al. |
| 2023/0108579 A1 * | 4/2023 | Cao .......................... G06N 3/04 |
| | | 706/27 |
| 2023/0147781 A1 * | 5/2023 | Timofejevs ............. G10L 25/51 |
| | | 704/232 |
| 2023/0156207 A1 | 5/2023 | Yang et al. |
| 2023/0162725 A1 | 5/2023 | Jin et al. |
| 2023/0199204 A1 | 6/2023 | Moussaoui et al. |
| 2023/0230610 A1 | 7/2023 | Seetharaman et al. |
| 2023/0244678 A1 | 8/2023 | Hill |
| 2023/0245668 A1 | 8/2023 | Xiao et al. |
| 2023/0259714 A1 | 8/2023 | Lange |
| 2023/0267950 A1 | 8/2023 | Jang et al. |
| 2023/0298593 A1 | 9/2023 | Ramos et al. |
| 2023/0325612 A1 | 10/2023 | Ghatage et al. |
| 2023/0402050 A1 | 12/2023 | Vilkamo et al. |
| 2024/0029755 A1 | 1/2024 | Querze, III et al. |
| 2024/0055006 A1 | 2/2024 | Biswas |
| 2024/0078264 A1 | 3/2024 | Solis et al. |
| 2024/0080044 A1 | 3/2024 | Kim et al. |
| 2024/0152669 A1 | 5/2024 | Pestourie et al. |
| 2024/0160856 A1 | 5/2024 | Sprott et al. |
| 2024/0185829 A1 | 6/2024 | Wang et al. |
| 2024/0203443 A1 | 6/2024 | JJoshi et al. |
| 2024/0221756 A1 * | 7/2024 | Lopatka .................. G10L 25/51 |
| 2024/0257819 A1 | 8/2024 | Boros et al. |
| 2024/0282298 A1 | 8/2024 | Koneru et al. |
| 2024/0296352 A1 | 9/2024 | Yanosy, Jr. et al. |
| 2024/0311405 A1 | 9/2024 | Kim et al. |
| 2024/0371388 A1 | 11/2024 | Huang et al. |
| 2024/0394523 A1 * | 11/2024 | Aimone ................. G06N 3/063 |
| 2024/0403619 A1 * | 12/2024 | Shaiba Nassar ....... G06N 3/065 |
| 2024/0419756 A1 * | 12/2024 | Brandstetter ........... G06F 17/13 |
| 2025/0005276 A1 | 1/2025 | Bhat et al. |
| 2025/0021842 A1 | 1/2025 | Bernstein et al. |
| 2025/0061307 A1 | 2/2025 | Tran et al. |
| 2025/0068764 A1 | 2/2025 | Joshi et al. |
| 2025/0086170 A1 | 3/2025 | Rumade et al. |
| 2025/0094690 A1 | 3/2025 | DeCharms |
| 2025/0103962 A1 | 3/2025 | Turley et al. |
| 2025/0117665 A1 | 4/2025 | Shukla |
| 2025/0148222 A1 | 5/2025 | Schornig et al. |

FOREIGN PATENT DOCUMENTS

| | | | | |
|---|---|---|---|---|
| EP | 3364342 A1 | 8/2018 | | |
| EP | 3816998 A1 | 5/2021 | | |
| EP | 4016363 A1 * | 6/2022 | ............. G06F 30/12 |
| EP | 4303774 A1 | 1/2024 | | |
| WO | 02088907 A2 | 11/2002 | | |
| WO | 2021022079 A1 | 2/2021 | | |
| WO | 2021178651 A1 | 9/2021 | | |
| WO | 2022211658 A1 | 10/2022 | | |
| WO | 2023278889 A1 | 1/2023 | | |
| WO | 2023086686 A1 | 5/2023 | | |
| WO | 2023139395 A1 | 7/2023 | | |
| WO | 2023237640 A1 | 12/2023 | | |
| WO | 2024080044 A1 | 4/2024 | | |

OTHER PUBLICATIONS

Abhinav Gupta et al. "Generalized neural closure models with interpretability" Nature Scientific Reports 13, Jun. 30, 2023.

Huimin Guo, Haifang Jian, Yequan Wang, Hongchang Wang, Xiaofan Zhao, Wenqi Zhu, Qinghua Cheng, MAMGAN: Multiscale attention metric GAN for monaural speech enhancement in the time domain, Applied Acoustics, vol. 209, 2023, 109385, ISSN 0003-682X, https://doi.org/10.1016/j.apacoust.2023.109385.

Joseph Chamberlain et al. "Graph Neural Networks as Neural Diffusion PDEs" X Engineering, Jul. 23, 2021.

Yolanne Yi Ran Lee "Autoregressive Renaissance in Neural PDE Solvers" Oct. 30, 2023.

International Search Report and Written Opinion dated Jun. 10, 2025 issued by the Korean Intellectual Property Office as Interna-

(56)　　　　　　　　References Cited

OTHER PUBLICATIONS tional Searching Authority in connection with related International Application No. PCT/US2025/017330 (8 Pages).

\* cited by examiner

Stage 2: Pre-processing and FX Processing

Stage 5: Dimensional & Environmental Transforms

Stage 6: Output Modes

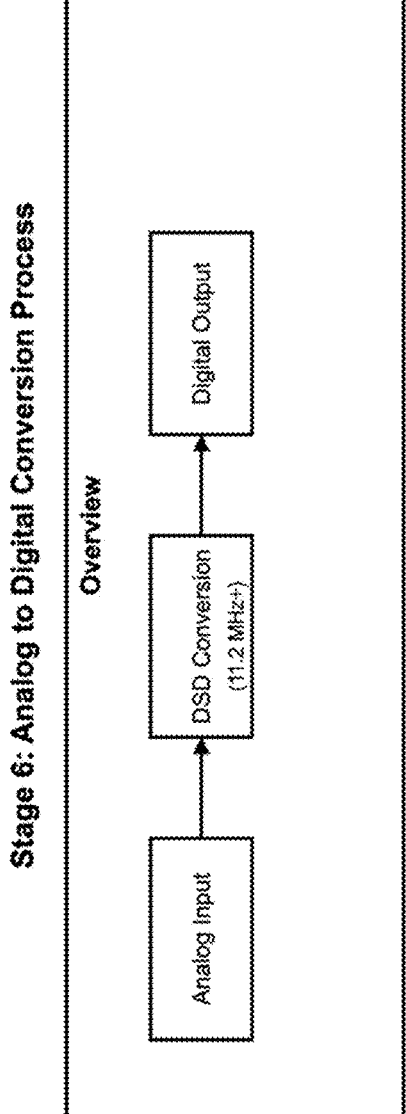

Stage 6: Analog to Digital Conversion Process

Overview

Analog Input → DSD Conversion (11.2 MHz+) → Digital Output

DSD Conversion Components

Decimation Filter (16:1+ ratio) → Quantization (16+ bit depth) → Resampling (Frame aligned) → Encoding (PCM, DXD, etc.)

Normalization & Dithering → Encoding (PCM, DXD, etc.)

• Enables standard digital processing (EQ, delay, reverb, etc.)
• Maintains conversion limits at/above human hearing
• Supports high noise floor and dynamic range

FIG. 19

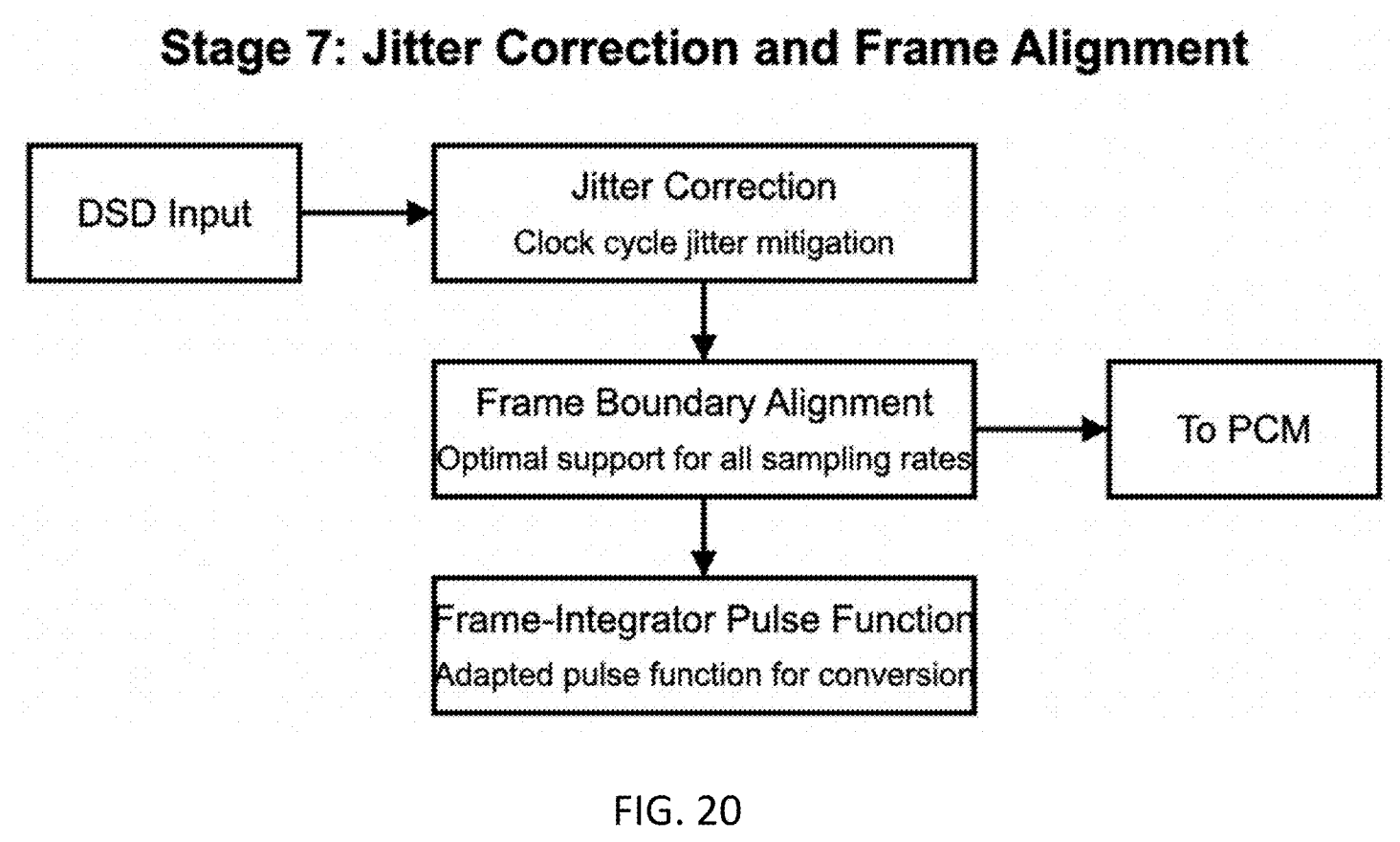

Stage 7: Jitter Correction and Frame Alignment

DSD Input

Jitter Correction
Clock cycle jitter mitigation

Frame Boundary Alignment
Optimal support for all sampling rates

Frame-Integrator Pulse Function
Adapted pulse function for conversion

To PCM

FIG. 20

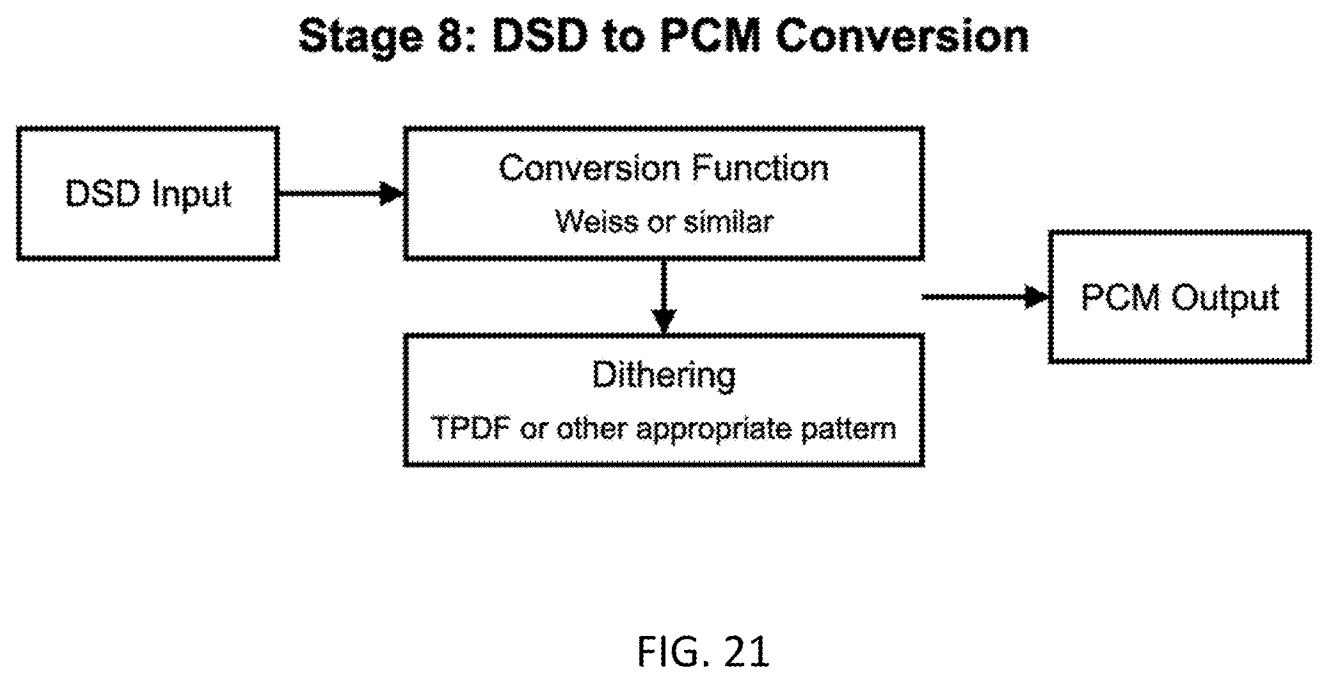

Stage 8: DSD to PCM Conversion

DSD Input

Conversion Function
Weiss or similar

Dithering
TPDF or other appropriate pattern

PCM Output

FIG. 21

DETERMINISTICALLY DEFINED, DIFFERENTIABLE, NEUROMORPHICALLY-INFORMED I/O-MAPPED NEURAL NETWORK

CROSS REFERENCES TO RELATED APPLICATIONS

This application is related to and claims priority from the following U.S. patents and patent applications. This application is a continuation-in-part of U.S. patent application Ser. No. 18/787,514, filed Jul. 29, 2024, which claims priority to and the benefit of U.S. Provisional Patent Application No. 63/529,724, filed Jul. 29, 2023, and U.S. Provisional Patent Application No. 63/541,891, filed Oct. 1, 2023, each of which is incorporated herein by reference in its entirety.

BACKGROUND OF THE INVENTION

1. Field of the Invention

The present invention relates to neural networks, and more specifically to neuromorphic field-defined neural networks.

2. Description of the Prior Art

It is generally known in the prior art to provide neural networks and other forms of deep learning to solve various types of tasks.

Prior art patent documents include the following:

US Patent Pub. No. 2022/0253671 for Graph neural diffusion by inventors Chamberlain et al., filed Feb. 7, 2022 and published Aug. 11, 2022, discloses improved graph neural networks (GNNs) including defining a GNN architecture based on a discretized non-Euclidean diffusion partial differential equation (PDE) such that evolution of feature coordinates represents message passing layers in a GNN and evolution of positional coordinates represents graph rewiring. The GNN being based on both position and feature coordinates has their evolution derived from Beltrami flow. The Beltrami flow is modeled using a Laplace-Beltrami operator, which is a generalization of the Laplace operator to functions defined on submanifolds in Euclidean space and on Riemannian manifolds. The discretization of the spatial component of the Beltrami flow offers a principled view on positional encoding and graph rewiring, whereas the discretization of the temporal component can replace GNN layers with more flexible adaptive numerical schemes. Based on this model, Beltrami Neural Diffusion (BLEND) that generalizes a broad range of GNN architectures is introduced; BLEND shows state-of-the-art performance on many benchmarks.

US Patent Pub. No. 2022/0092413 for Method and system for relation learning by multi-hop attention graph neural network by inventors Wang et al., filed May 24, 2021 and published Mar. 24, 2022, discloses a system and method for completing knowledge graph. The system includes a computing device, the computing device has a processer and a storage device storing computer executable code. The computer executable code is configured to: provide an incomplete knowledge graph comprising a plurality of nodes and a plurality of edges, each of the edges connecting two of the plurality of nodes; calculate an attention matrix of the incomplete knowledge graph based on one-hop attention between any two of the plurality of the nodes that are connected by one of the plurality of the edges; calculate multi-head diffusion attention for any two of the plurality of nodes from the attention matrix; obtain updated embedding of the incomplete knowledge graph using the multi-head diffusion attention; and update the incomplete knowledge graph to obtain updated knowledge graph based on the updated embedding.

US Patent Pub. No. 2022/0198278 for System for continuous update of advection-diffusion models with adversarial networks by inventors O'Donncha et al., filed Dec. 23, 2020 and published Jun. 23, 2022, discloses a computing device configured for automatic selection of model parameters including a processor and a memory coupled to the processor. The memory stores instructions to cause the processor to perform acts including providing an initial set of model parameters and initial condition information to a model based on historical data. A model generates data based on the model parameters and the initial condition information. After determining whether the model-generated data is similar to an observed data, updated model parameters are selected for input to the model based on the determined similarity.

US Patent Pub. No. 2024/0152669 for Physics-enhanced deep surrogate by inventors Pestourie et al., filed Nov. 8, 2022 and published May 9, 2024, discloses surrogate training including receiving a parameterization of a physical system, where the physical system includes real physical components and the parameterization having corresponding target property in the physical system. The parameterization can be input into a neural network, where the neural network generates a different dimensional parameterization based on the input parameterization. The different dimensional parameterization can be input to a physical model that approximates the physical system. The physical model can be run using the different dimensional parameterization, where the physical model generates an output solution based on the different dimensional parameterization input to the physical model. Based on the output solution and the target property, the neural network can be trained to generate the different dimensional parameterization.

U.S. Pat. No. 11,645,356 for Deep learning for partial differential equation (PDE) based models by inventors O'Donncha et al., filed Sep. 4, 2018 and issued May 9, 2023, discloses embodiments for deep learning for partial differential equation (PDE)-based models by a processor. A trained forecasting model and consistency constraints may be generated using a PDE-based model, a discretization of the PDE-based model, historical inputs the of the PDE-based model, and a representation of consistency constraints to generate a predictive output.

U.S. Pat. No. 10,963,540 for Physics informed learning machine by inventors Raissi et al., filed Jun. 2, 2017 and issued Mar. 30, 2021, discloses a method for analyzing an object includes modeling the object with a differential equation, such as a linear partial differential equation (PDE), and sampling data associated with the differential equation. The method uses a probability distribution device to obtain the solution to the differential equation. The method eliminates use of discretization of the differential equation.

Chinese Patent Pub. No. 117521729 for Partial differential equation diffusion attenuation-based graph neural network optimization method and related device, filed Oct. 31, 2023 and published Feb. 6, 2024, discloses a graph neural network optimization method based on partial differential equation diffusion attenuation and a related device, wherein the invention adopts an encoder-decoder (encoder-decoder) structure, uses an encoder to obtain characteristic embedding, and uses a decoder to decode a finally output hidden vector; the depth of the model is controlled by the propagation time, and the time is discretized by introducing super parameters so as to obtain a model of a deep framework; in order to learn the diffusion coefficient in diffusion more effectively and increase the diffusion threshold range, the invention also applies a shared gating attention mechanism to learn the diffusion coefficient effectively according to the characteristics of the adjacent nodes, and increases the diffusion possible threshold range by selecting a proper function.

The article "Graph Neural Networks as Neural Diffusion PDEs" by authors Chamberlain and Bronstein, published Jul. 21, 2021, concerns diffusion PDEs arising in many physical processes involving the transfer of "stuff" (whether energy or matter), or more abstractly, information. In image processing, one can exploit this interpretation of diffusion as linear low-pass filtering for image denoising. However, such a filter, when removing noise, also undesirably blurs transitions between regions of different color or brightness ("edges"). An influential insight of Pietro Perona and Jitendra Malik was to consider an adaptive diffusivity coefficient inversely dependent on the norm of the image gradient $|\nabla x|$. This way, diffusion is strong in "flat" regions (where $|\nabla x| \approx 0$) and weak in the presence of brightness discontinuities (where $|\nabla x|$ is large). The result was a nonlinear filter capable of removing noise from the image while preserving edges.

The article "Generalized neural closure models with interpretability" by authors Gupta and Lermusiaux, published Jun. 30, 2023, concerns improving the predictive capability and computational cost of dynamical models is often at the heart of augmenting computational physics with machine learning (ML). However, most learning results are limited in interpretability and generalization over different computational grid resolutions, initial and boundary conditions, domain geometries, and physical or problem-specific parameters. In the present study, we simultaneously address all these challenges by developing the novel and versatile methodology of unified neural partial delay differential equations. We augment existing/low-fidelity dynamical models directly in their partial differential equation (PDE) forms with both Markovian and non-Markovian neural network (NN) closure parameterizations. The melding of the existing models with NNs in the continuous spatiotemporal space followed by numerical discretization automatically allows for the desired generalizability. The Markovian term is designed to enable extraction of its analytical form and thus provides interpretability. The non-Markovian terms allow accounting for inherently missing time delays needed to represent the real world. The flexible modeling framework provides full autonomy for the design of the unknown closure terms such as using any linear-, shallow-, or deep-NN architectures, selecting the span of the input function libraries, and using either or both Markovian and non-Markovian closure terms, all in accord with prior knowledge. We obtain adjoint PDEs in the continuous form, thus enabling direct implementation across differentiable and non-differentiable computational physics codes, different ML frameworks, and treatment of nonuniformly-spaced spatiotemporal training data. We demonstrate the new generalized neural closure models (gnCMs) framework using four sets of experiments based on advecting nonlinear waves, shocks, and ocean acidification models. The learned gnCMs discover missing physics, find leading numerical error terms, discriminate among candidate functional forms in an interpretable fashion, achieve generalization, and compensate for the lack of complexity in simpler models. Finally, we analyze the computational advantages of the new framework.

The article "Autoregressive Renaissance in Neural PDE Solvers" by author Lee, published May 1, 2023, concerns recent developments in the field of neural partial differential equation (PDE) solvers having placed a strong emphasis on neural operators. However, the paper Message Passing Neural PDE Solver by Brandstetter et al. published in ICLR 2022 revisits autoregressive models and designs a message passing graph neural network that is comparable with or outperforms both the state-of-the-art Fourier Neural Operator and traditional classical PDE solvers in its generalization capabilities and performance. This blog post delves into the key contributions of this work, exploring the strategies used to address the common problem of instability in autoregressive models and the design choices of the message passing graph neural network architecture.

U.S. Pat. No. 12,001,950 for Generative adversarial network based audio restoration by inventors Zhang et al., filed Mar. 12, 2019 and issued Jun. 4, 2024, discloses mechanisms for implementing a generative adversarial network (GAN) based restoration system. A first neural network of a generator of the GAN based restoration system is trained to generate an artificial audio spectrogram having a target damage characteristic based on an input audio spectrogram and a target damage vector. An original audio recording spectrogram is input to the trained generator, where the original audio recording spectrogram corresponds to an original audio recording and an input target damage vector. The trained generator processes the original audio recording spectrogram to generate an artificial audio recording spectrogram having a level of damage corresponding to the input target damage vector. A spectrogram inversion module converts the artificial audio recording spectrogram to an artificial audio recording waveform output.

U.S. Pat. No. 11,514,925 for Using a predictive model to automatically enhance audio having various audio quality issues by inventors Jin et al., filed Apr. 30, 2020 and issued Nov. 29, 2022, discloses operations of a method including receiving a request to enhance a new source audio. Responsive to the request, the new source audio is input into a prediction model that was previously trained. Training the prediction model includes providing a generative adversarial network including the prediction model and a discriminator. Training data is obtained including tuples of source audios and target audios, each tuple including a source audio and a corresponding target audio. During training, the prediction model generates predicted audios based on the source audios. Training further includes applying a loss function to the predicted audios and the target audios, where the loss function incorporates a combination of a spectrogram loss and an adversarial loss. The prediction model is updated to optimize that loss function. After training, based on the new source audio, the prediction model generates a new predicted audio as an enhanced version of the new source audio.

U.S. Pat. No. 11,657,828 for Method and system for speech enhancement by inventor Quillen, filed Jan. 31, 2020 and issued May 23, 2023, discloses improving speech data quality through training a neural network for de-noising audio enhancement. One such embodiment creates simulated noisy speech data from high quality speech data. In turn, training, e.g., deep normalizing flow training, is performed on a neural network using the high quality speech data and the simulated noisy speech data to train the neural network to create de-noised speech data given noisy speech data. Performing the training includes minimizing errors in the neural network according to at least one of (i) a decoding error of an Automatic Speech Recognition (ASR) system processing current de-noised speech data results generated by the neural network during the training and (ii) spectral distance between the high quality speech data and the current de-noised speech data results generated by the neural network during the training.

US Patent Pub. No. 2024/0055006 for Method and apparatus for processing of audio data using a pre-configured generator by inventor Biswas, filed Dec. 15, 2021 and published Feb. 15, 2024, discloses a method for setting up a decoder for generating processed audio data from an audio bitstream, the decoder comprising a Generator of a Generative Adversarial Network, GAN, for processing of the audio data, wherein the method includes the steps of (a) pre-configuring the Generator for processing of audio data with a set of parameters for the Generator, the parameters being determined by training, at training time, the Generator using the full concatenated distribution; and (b) pre-configuring the decoder to determine, at decoding time, a truncation mode for modifying the concatenated distribution and to apply the determined truncation mode to the concatenated distribution. Described are further a method of generating processed audio data from an audio bitstream using a Generator of a Generative Adversarial Network, GAN, for processing of the audio data and a respective apparatus. Moreover, described are also respective systems and computer program products.

US Patent Pub. No. 2024/0203443 for Efficient frequency-based audio resampling for using neural networks by inventors Jjoshi et al., filed Dec. 19, 2022 and published Jun. 20, 2024, discloses systems and methods relating to the enhancement of audio, such as through machine learning-based audio super-resolution processing. An efficient resampling approach can be used for audio data received at a lower frequency than is needed for an audio enhancement neural network. This audio data can be converted into the frequency domain, and once in the frequency domain (e.g., represented using a spectrogram) this lower frequency data can be resampled to provide a frequency-based representation that is at the target input resolution for the neural network. To keep this resampling process lightweight, the upper frequency bands can be padded with zero value entries (or other such padding values). This resampled, higher frequency spectrogram can be provided as input to the neural network, which can perform an enhancement operation such as audio upsampling or super-resolution.

US Patent Pub. No. 2023/0298593 for Method and apparatus for real-time sound enhancement by inventors Ramos et al., filed May 23, 2023 and published Sep. 21, 2023 discloses a system, computer-implemented method and apparatus for training a machine learning, ML, model to perform sound enhancement for a target user in real-time, and a method and apparatus for using the trained ML model to perform sound enhancement of audio signals in real-time. Advantageously, the present techniques are suitable for implementation on resource-constrained devices that capture audio signals, such as smartphones and Internet of Things devices.

U.S. Pat. No. 10,991,379 for Data driven audio enhancement by inventors Hijazi et al., filed Jun. 22, 2018 and issued Apr. 27, 2021, discloses systems and methods for audio enhancement. For example, methods may include accessing audio data; determining a window of audio samples based on the audio data; inputting the window of audio samples to a classifier to obtain a classification, in which the classifier includes a neural network and the classification takes a value from a set of multiple classes of audio; selecting, based on the classification, an audio enhancement network from a set of multiple audio enhancement networks; applying the selected audio enhancement network to the window of audio samples to obtain an enhanced audio segment, in which the selected audio enhancement network includes a neural network that has been trained using audio signals of a type associated with the classification; and storing, playing, or transmitting an enhanced audio signal based on the enhanced audio segment.

U.S. Pat. No. 10,460,747 for Frequency based audio analysis using neural networks by inventors Roblek et al., filed May 10, 2016 and issued Oct. 29, 2019, discloses methods, systems, and apparatus, including computer programs encoded on computer storage media, for frequency based audio analysis using neural networks. One of the methods includes training a neural network that includes a plurality of neural network layers on training data, wherein the neural network is configured to receive frequency domain features of an audio sample and to process the frequency domain features to generate a neural network output for the audio sample, wherein the neural network comprises (i) a convolutional layer that is configured to map frequency domain features to logarithmic scaled frequency domain features, wherein the convolutional layer comprises one or more convolutional layer filters, and (ii) one or more other neural network layers having respective layer parameters that are configured to process the logarithmic scaled frequency domain features to generate the neural network output.

U.S. Pat. No. 11,462,209 for Spectrogram to waveform synthesis using convolutional networks by inventors Arik et al., filed Mar. 27, 2019 and issued Oct. 4, 2022, discloses an efficient neural network architecture, based on transposed convolutions to achieve a high compute intensity and fast inference. In one or more embodiments, for training of the convolutional vocoder architecture, losses are used that are related to perceptual audio quality, as well as a GAN framework to guide with a critic that discerns unrealistic waveforms. While yielding a high-quality audio, embodiments of the model can achieve more than 500 times faster than real-time audio synthesis. Multi-head convolutional neural network (MCNN) embodiments for waveform synthesis from spectrograms are also disclosed. MCNN embodiments enable significantly better utilization of modern multi-core processors than commonly-used iterative algorithms like Griffin-Lim and yield very fast (more than 300× real-time) waveform synthesis. Embodiments herein yield high-quality speech synthesis, without any iterative algorithms or autoregression in computations.

U.S. Pat. No. 11,854,554 for Method and apparatus for combined learning using feature enhancement based on deep neural network and modified loss function for speaker recognition robust to noisy environments by inventors Chang et al., filed Mar. 30, 2020 and issued Dec. 26, 2023, discloses a transformed loss function and feature enhancement based on a deep neural network for speaker recognition that is robust to a noisy environment. The combined learning method using the transformed loss function and the feature enhancement based on the deep neural network for speaker recognition that is robust to the noisy environment, according to an embodiment, may comprise: a preprocessing step for learning to receive, as an input, a speech signal and remove a noise or reverberation component by using at least one of a beamforming algorithm and a dereverberation algorithm using the deep neural network; a speaker embedding step for learning to classify an utterer from the speech signal, from which a noise or reverberation component has been removed, by using a speaker embedding model based on the deep neural network; and a step for, after connecting a deep neural network model included in at least one of the beamforming algorithm and the dereverberation algorithm and the speaker embedding model, for speaker embedding, based on the deep neural network, performing combined learning by using a loss function.

U.S. Pat. No. 12,020,679 for Joint audio interference reduction and frequency band compensation for videoconferencing by inventors Xu et al., filed Aug. 3, 2023 and issued Jun. 25, 2024, discloses a device receiving an audio signal recorded in a physical environment and applying a machine learning model onto the audio signal to generate an enhanced audio signal. The machine learning model is configured to simultaneously remove interference and distortion from the audio signal and is trained via a training process. The training process includes generating a training dataset by generating a clean audio signal and generating a noisy distorted audio signal based on the clean audio signal that includes both an interference and a distortion. The training further includes constructing the machine learning model as a generative adversarial network (GAN) model that includes a generator model and multiple discriminator models, and training the machine learning model using the training dataset to minimize a loss function defined based on the clean audio signal and the noisy distorted audio signal.

US Patent Pub. No. 2023/0267950 for Audio signal generation model and training method using generative adversarial network by inventors Jang et al., filed Jan. 13, 2023 and published Aug. 24, 2023, discloses a generative adversarial network-based audio signal generation model for generating a high quality audio signal comprising: a generator generating an audio signal with an external input; a harmonic-percussive separation model separating the generated audio signal into a harmonic component signal and a percussive component signal; and at least one discriminator evaluating whether each of the harmonic component signal and the percussive component signal is real or fake.

U.S. Pat. No. 11,562,764 for Apparatus, method or computer program for generating a bandwidth-enhanced audio signal using a neural network processor by inventors Schmidt et al., filed Apr. 17, 2020 and issued Jan. 24, 2023, discloses an apparatus for generating a bandwidth enhanced audio signal from an input audio signal having an input audio signal frequency range includes: a raw signal generator configured for generating a raw signal having an enhancement frequency range, wherein the enhancement frequency range is not included in the input audio signal frequency range; a neural network processor configured for generating a parametric representation for the enhancement frequency range using the input audio frequency range of the input audio signal and a trained neural network; and a raw signal processor for processing the raw signal using the parametric representation for the enhancement frequency range to obtain a processed raw signal having frequency components in the enhancement frequency range, wherein the processed raw signal or the processed raw signal and the input audio signal frequency range of the input audio signal represent the bandwidth enhanced audio signal.

US Patent Pub. No. 2023/0245668 for Neural network-based audio packet loss restoration method and apparatus, and system by inventors Xiao et al., filed Sep. 30, 2020 and published Aug. 3, 2023, discloses an audio packet loss repairing method, device and system based on a neural network. The method comprises: obtaining an audio data packet, the audio data packet comprises a plurality of audio data frames, and the plurality of audio data frames at least comprise a plurality of voice signal frames; determining a position of a lost voice signal frame in the plurality of audio data packet to obtain position information of the lost frame, the position comprising a first preset position or a second reset position; selecting, according to the position information of the lost frame, a neural network model for repairing the lost frame, the neural network model comprising a first repairing model and a second repairing model; and sending the plurality of audio data frames to the selected neural network model so as to repair the lost voice signal frame.

WIPO Patent Pub. No. 2024/080044 for Graphical user interface for generative adversarial network music synthesizer by inventors Narita et al., filed Sep. 7, 2023 and published Apr. 18, 2024, discloses an information processing system that receives input sound and pitch information; extracts a timbre feature amount from the input sound; and generates information of a musical instrument sound with a pitch based on the timbre feature amount and the pitch information.

The Article "MAMGAN: Multiscale attention metric GAN for monaural speech enhancement in the time domain" by authors Guo et al., published Jun. 30, 2023 in Applied Acoustics Vol. 209, discloses "In the speech enhancement (SE) task, the mismatch between the objective function used to train the SE model, and the evaluation metric will lead to the low quality of the generated speech. Although existing studies have attempted to use the metric discriminator to learn the alternative function of evaluation metric from data to guide generator updates, the metric discriminator's simple structure cannot better approximate the function of the evaluation metric, thus limiting the performance of SE. This paper proposes a multiscale attention metric generative adversarial network (MAMGAN) to resolve this problem. In the metric discriminator, the attention mechanism is introduced to emphasize the meaningful features of spatial direction and channel direction to avoid the feature loss caused by direct average pooling to better approximate the calculation of the evaluation metric and further improve SE's performance. In addition, driven by the effectiveness of the self-attention mechanism in capturing long-term dependence, we construct a multiscale attention module (MSAM). It fully considers the multiple representations of signals, which can better model the features of long sequences. The ablation experiment verifies the effectiveness of the attention metric discriminator and the MSAM. Quantitative analysis on the Voice Bank+DEMAND dataset shows that MAMGAN outperforms various time-domain SE methods with a 3.30 perceptual evaluation of speech quality score."

SUMMARY OF THE INVENTION

The present invention relates to neural networks, and more specifically to neuromorphic field-defined neural networks.

It is an object of this invention to provide neural networks capable of being used across a wide variety of modalities and having improved interpretability.

In one embodiment, the present invention is directed to a neural network, including an input layer, an output layer, and a neuromorphic field connecting the input layer to the output layer, wherein the neuromorphic field includes a plurality of interconnected artificial neurons whose behaviors are defined and governed by one or more partial differential equations (PDEs).

In another embodiment, the present invention is directed to a method for training a neural network, including initializing partial differential equation (PDE) parameters and sampling points randomly to optimize responsiveness of a neuromorphic field of the neural network to new inputs, converting input data to continuous signals, injecting the continuous signals into the neuromorphic field, solving a PDE for a fixed time interval, sampling the neuromorphic field to produce an output, comparing the output with a desired result, computing a gradient of a loss with respect to the PDE parameters and sampling points, and updating parameters using an optimization algorithm.

In yet another embodiment, the present invention is directed to a neural network, including an input layer, an output layer, and a neuromorphic field connecting the input layer to the output layer, wherein the neuromorphic field is defined by one or more partial differential equations (PDEs) having one or more boundary conditions, and wherein the one or more PDEs includes a reaction-diffusion PDE.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 19 is a schematic diagram of an analog-to-digital conversion stage of a pulse density modulation process according to one embodiment of the present invention.

FIG. 20 is a schematic diagram of a jitter correction and frame alignment stage of a pulse density modulation process according to one embodiment of the present invention.

FIG. 21 is a schematic diagram of a DSD to PCM conversion stage of a pulse density modulation process according to one embodiment of the present invention.

DETAILED DESCRIPTION

Figure 1:
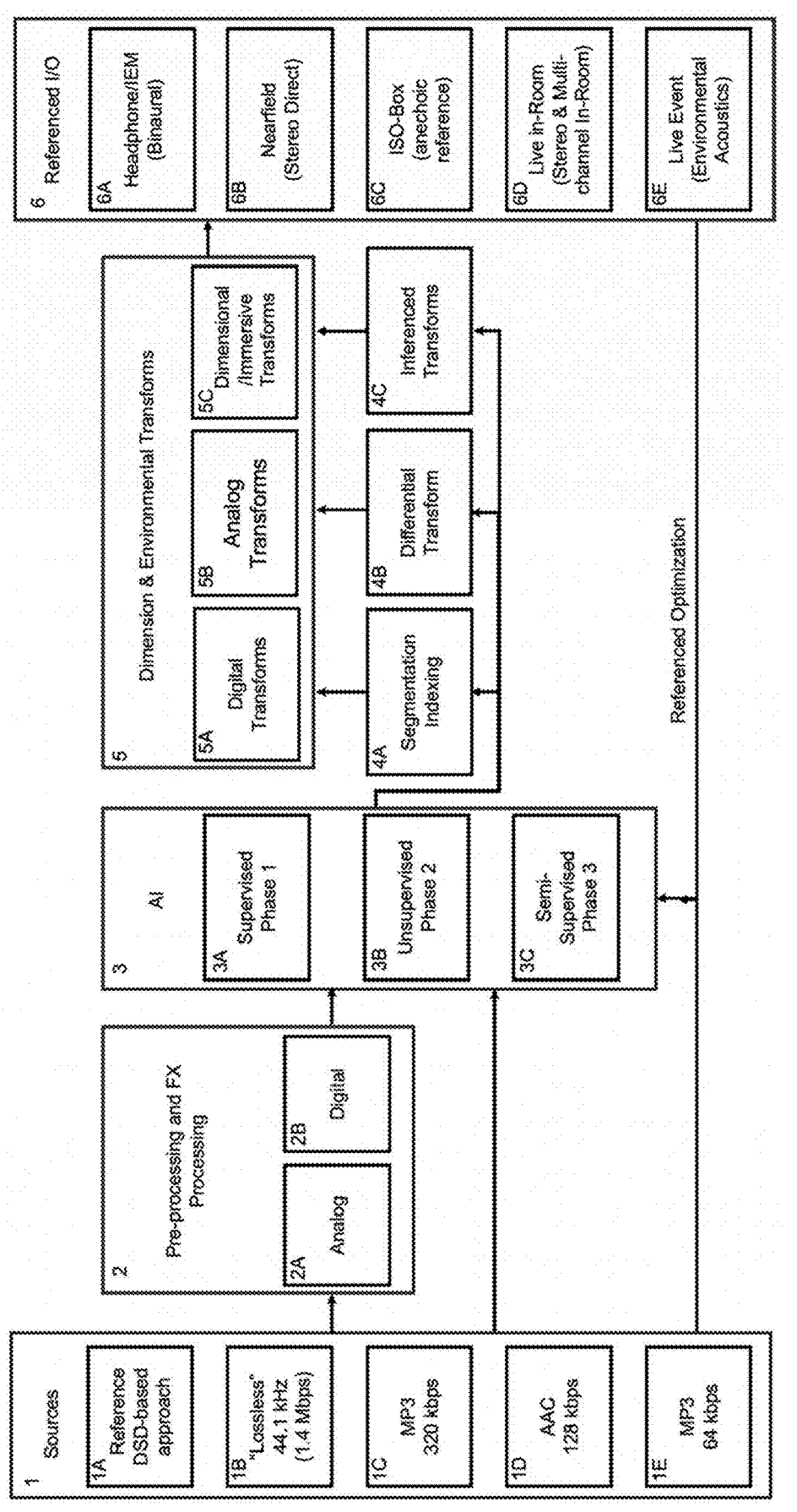
FIG. 1 illustrates a schematic diagram for a system for enhancing an input audio source according to one embodiment of the present invention.

The present invention is generally directed to neural networks, and more specifically to neuromorphic field-defined neural networks.

In one embodiment, the present invention is directed to a neural network, including an input layer, an output layer, and a neuromorphic field connecting the input layer to the output layer, wherein the neuromorphic field includes a plurality of interconnected artificial neurons whose behaviors are defined and governed by one or more partial differential equations (PDEs).

In another embodiment, the present invention is directed to a method for training a neural network, including initializing partial differential equation (PDE) parameters and sampling points randomly to optimize responsiveness of a neuromorphic field of the neural network to new inputs, converting input data to continuous signals, injecting the continuous signals into the neuromorphic field, solving a PDE for a fixed time interval, sampling the neuromorphic field to produce an output, comparing the output with a desired result, computing a gradient of a loss with respect to the PDE parameters and sampling points, and updating parameters using an optimization algorithm.

In yet another embodiment, the present invention is directed to a neural network, including an input layer, an output layer, and a neuromorphic field connecting the input layer to the output layer, wherein the neuromorphic field is defined by one or more partial differential equations (PDEs) having one or more boundary conditions, and wherein the one or more PDEs includes a reaction-diffusion PDE.

There are numerous components and processing methods widely used in the recording and playback chain of audio that collectively affect the perceived quality and other characteristics of the sound. Every type of digital recording is based on numerous assumptions, derived from a combination of engineering approximations, trial and error methods, technological constraints and limitations, prior beliefs and available knowledge at a given time that define the extents of the ability of audio engineers to support the recording, processing, distribution, and playback of audio.

Because the collection of knowledge together with beliefs and assumptions are taught as the basis for audio engineering and related theory, these beliefs and assumptions generally define the accuracy and extent of the capabilities of the industry. As a result, this collective base of understanding has historically limited the ability to engineer hardware and software solutions related to audio. In its most fundamental terms, the limitations of the accuracy and extent of the collective knowledge and understanding related to audio and the processes described have always constrained the ability of the prior art to define more optimal algorithms, methods, and associated processes using traditional, non-AI-based software and related engineering methods.

The advent of artificial intelligence coupled with the evolution of digital and analog technologies available to record, transform and play audio are allowing engineers to bypass limited and otherwise imperfect knowledge and poorly supported assumptions that limit audio fidelity and processing capabilities, in favor of an AI-enabled approach built upon ground truth data supporting a foundation model derived using a combination of source disparity recognition and related methods. As evidenced over the past several years across numerous medical, gaming, and other fields, the ability of key AI architectures to derive new capabilities has resulted in entirely new levels and types of capabilities beyond what was possible via traditional human and pre-AI computing methods.

The process of engineering and development using AI is very different from traditional, non-AI software development on a fundamental level, which enables the creation of previously impossible solutions. Using AI based development, the effective algorithms and related processes become the output created by the AI itself. When ground truth data is provided as part of the training process, it enables the neural network to become representative of a "foundation model." For the purposes of this application, ground truth data refers to reference data, which preferably includes, for the purposes of the present invention, audio information at or beyond the average human physical and perceptual limits of hearing, and a foundational model refers to a resulting AI-enabled audio algorithm that takes as input the ground truth data to perform a range of extension, enhancement and restoration of the audio, yielding a level of presence, tonal quality, dynamics and/or resulting realism that is beyond the input source quality, even where the input includes original master tapes.

As a result, the use of AI-based systems, and more specifically a level of processing power and capabilities that support the approach described herein, allows for the avoidance of traditional assumptions and beliefs in audio processing, and the resulting implicit and explicit limits of understanding associated with those assumptions and beliefs. Instead, a benchmarked standard is used based on the disparities inherent to any type of recorded music relative to reference standards by using the approach described herein.

The present invention includes a modular, software-driven system and associated hardware-enabled methodology for improving and/or otherwise enhancing the sound quality and associated characteristics of audio to a level of acoustic realism, perceptual quality and sense of depth, tonality, dynamics and presence beyond the limits of prior art systems and methods, even exceeding the original master tapes.

The system of the present invention employs a combination of deep learning models and machine learning methods, together with a unique process for acquiring, ingesting, indexing, and applying media-related transforms. The invention enables the use of resulting output data to train a deep learning neural network and direct a modular workflow to selectively modify the audio via a novel inference-based recovery, transformation, and restoration chain. These deep learning algorithms further allow the system to enhance, adapt, and/or recover audio quality lost during the acquisition, recording, or playback processes, due to a combination of hardware limitations, artifacts, compression, and/or other sources of loss, change, and degradation. Furthermore, the system of the present invention employs a deep neural network to analyze differences between an original audio source or recording and a degraded or changed audio signal or file and, based on knowledge obtained via the training process, distinguish categories and specific types of differences from specific reference standards. This enables a novel application of both new and existing methods to be used to recover and bring the quality and nature of the audio to a level of acoustic realism, perceptual quality, sense of depth, tonality, dynamics, and presence beyond any existing method, even including original master tapes.

The system and method for improving and enhancing audio quality of analog and digital audio as described herein provides for an improvement in the ability to listen to and enjoy music and other audio. By utilizing the deep learning algorithms of the present invention, as well as the advanced recovery and transformation workflow, the system is able to effectively restore lost audio quality in both live and recorded audio, and in both digital and analog audio, to bring audiences closer to a non-diminished audio experience.

The present invention covers various uses of generative deep-learning algorithms that employ indexing, analysis, transforms, and segmentation to derive a ground truth-based foundation model to recover the differences between the highest possible representative quality audio recorded, both analog and digitally recorded, including comparisons with bandwidth-constrained, noise-diminished, dynamic range limited, and noise-shaped files of various formats (e.g., MP3, AAC, WAV, FLAC, etc.) and of various encoding types, delivery methods, and sample rates.

Because of the modular design of the system and the directive workflow and output of the artificial intelligence module, a wide range of hardware, software and related options are able to be introduced at different stages, as explained below, supporting a virtually unlimited range of creative, restoration, transfer, and related purposes. Unlike other methods of audio modification or restoration, the system of the present invention leverages approaches that were formerly not cost or time viable prior to the current level of processing power and scalability enabled by the use of AI-based systems. One of ordinary skill in the art will understand that the present invention is not intended to be limited to any particular analog or digital format, sampling rate, bandwidth, data rate, encoding type, bit depth, or variation of audio, and that variations of each parameter are able to be accepted according to the present invention.

The system is able to operate independently of the format of the input audio and the particular use case, meaning it supports applications including, but not limited to, delivery and/or playback using various means (e.g., headphones, mono playback, stereo playback, live event delivery, multi-channel delivery, dimensionally enhanced, and extended channel formats delivered via car stereos, as well as other types, uses and environments). While a primary use case of the present invention is for enhancing music, the system is able to be extended to optimization of other forms of audio as well, via the sequence of stages and available options as described herein. To support the extensibility to various forms of audio, the system provides for media workflow and control options, and associated interfaces (e.g., Application Programming Interfaces (APIs)).

Furthermore, the system of the present invention also includes software-enabled methodology that leverages uniquely integrated audio hardware and related digital systems to capture and encode full spectrum lossless audio, as defined by physical and perception limits of human audiology. This approach uses a uniquely integrated AI-assisted methodology as described to bypass several long-standing limits based on beliefs and assumptions related to the frequency range, transients, phase, and related limits of human hearing, in favor of results obtained via leading-edge research in sound, neurology, perception, and related fields.

The system is able to be used in isolation or in combination with other audio streaming, delivery, effects, recording, encoding or other approaches, whether identified herein or otherwise. AI is employed to support brain-computer-interface (BCI) and related brain activity monitoring and analytics, to determine physically derived perceptual human hearing limits in terms of transient, phase, frequency, harmonic content, and related factors. Current "lossless" audio formats and methods are missing over 90% of the frequency range, as well as much of the transient detail and phase accuracy necessary to be lossless, as defined by no audible signals within the limits of human hearing have been discarded, compressed, or bypassed.

Prior limits of human hearing were defined to be, at best, between 20 cycles (Hz) and 20,000 Hz using a basic pass/fail sine wave hearing test. While this is useful in a gross sense for human hearing of only sine waves, those approaches disregard the reality that virtually all sound in the real world is composed of a wide range of complex harmonic, timbral, transient, and other details. Further, virtually all hearing related tests ignore a wide range of other methods of testing and validation, including using brain pattern-based signal perception testing to ensure parity with human brain and related hearing function.

Numerous studies have begun to verify the fact that hearing extends across a much wider range of frequencies and has a much more extensive set of perceptually relevant biophysical affects. To determine the actual frequency range of human hearing, studies have been done to take such details into account, finding that human hearing extends much further when integrating those noted acoustic factors. In reality, an extended range of frequencies that are actually able to be perceived extends from 2 Hz to about 70,000 Hz. Between approximately, 2 Hz and 350 Hz, the primary part of the body able to perceive the sound is the skin or chest of a listener, while the ear is able to perceive qualities such as frequency, timbre, and intonation for sounds between approximately 350 Hz and 16,000 Hz. Between about 16,000 Hz and 70,000 Hz, the inner ear is predominant in the perception of the sound.

In addition, there are numerous other physiological and related considerations in determining how to optimally record, encode, and define analog and digital sounds. For example, the idea that humans are able to hear low frequency information solely as a frequency via our ears alone is erroneous, given the size of the tympanic membrane, which is incapable of sympathetic oscillation at frequencies much below 225 Hz. Instead, transient, harmonic, and other associated detail that provides the critical sonic information enables the ear, brain, and body to decode much of the sound enabling us to, for example, differentiate a tom-tom from a finger tap on some other surface. Further, the body acts to help us perceive audio down to a few cycles per second. As such, differential AI driven brain activity analytics are commonly employed as part of the testing to ensure definition of the actual physiological and perceptual hearing limits using complex, real world audio signals across transient, harmonics, timbral, and other detail, rather than using common frequency based and other audiology and related testing.

Similarly, as some studies have moved away from simple sine wave data used in testing hearing sensitivity and limits, to audio test sources with a range of transient, harmonic, phase and timbral complexity, those studies have begun to see that hearing and perception are a whole brain plus body experience, meaning that engineering and related methods need to take these factors into account in order to be reflective of real world human hearing.

Numerous other capabilities include the ability to dramatically improve the perceived quality of the sound even when compressed. This is due to the fact that the system starts with a significantly higher resolution sonic landscape that more accurately reflects the limits of human hearing, rather than an already diminished and compromised one that does not include much of the sonic image to begin with. Among other things, this results in increased perceived quality with significantly reduced audio file sizes, along with commensurately reduced resulting bandwidths and storage requirements.

The unique inventive method of the present invention employs a hybrid digital-analog format that uses a type of Pulse Density Modulation (PDM) and process that interoperates with traditional Pulse Code Modulation (PCM) systems. Because of the unique implementation described in the preferred embodiment, the system is able to bypass the requirement of a digital to analog conversion stage (DAC) and the associated jitter, sampling distortion, quantization noise, intermodulation distortion, phase distortion, and various nonlinear issues created by a DAC stage. It is able to bypass these issues because the system enables the ability to output the digital equivalent of an analog signal, hence the labeling of a hybrid digital-analog format.

Referring now to the drawings in general, the illustrations are for the purpose of describing one or more preferred embodiments of the invention and are not intended to limit the invention thereto.

FIG. 1 illustrates a schematic diagram for a system for enhancing an input audio source according to one embodiment of the present invention. As shown in FIG. 1, there are six main stages of the system of the present invention, defined as stages 1 through 6. Beginning with the input source, and proceeding to the final output, the following stages define the steps of a system able to be used for various types of input source and for various types of audio processing. The system is able to be used for two general purposes: (1) training and transfer learning, and (2) inferenced transcoding and processing operations. In both modes, the same stages are implemented, although the specific contents of each stage shift, as described below.

The first step of the system is sourcing. While any analog or digital audio source type, format, sample rate, or bit-depth is able to be used for training or inference, having a range of relative quality levels facilitates the training by enabling the deep learning neural network to derive differential, associative, and other patterns inherent to each source type (and the related quality levels of each source type) to establish pattern recognition and discrimination within a neural network model. The sourcing for the system is able to derive from any analog or digital source, whether locally provided as a digital file, introduced as an analog source, streamed or otherwise, and the subsequent stages of the system process the sourced data further. Examples of comparative sources able to be acquired and organized according to the present invention are shown as items 1A-1E in FIG. 1, but one of ordinary skill in the art will understand that other types of audio data are also able to be used in place of those shown.

In one embodiment, a Direct Stream Digital source, or other high quality audio source, as indicated in 1A, is used as a reference, or ground truth source. Within the set of data constituting the ground truth source, the system is able to include a unique set of audio sourcing across many types of audio examples, including, but not limited to, a range of: musical instrument types, musical styles, ambient/room interactions, compression levels, dynamics, timbres, overtones, harmonics, and/or other types of audio source types. The use of ground truth source data allows for the system to train on audio data, including content below the noise floor that is eliminated in prior art systems. In one embodiment, the audio data includes information at least 1 dB below the noise floor. In one embodiment, the audio data includes information at least 5 dB below the noise floor. In one embodiment, the audio data includes information at least 10 dB below the noise floor. In one embodiment, the audio data includes information at least 25 dB below the noise floor. In one embodiment, the audio data includes information at least 50 dB below the noise floor. In one embodiment, the audio data includes information at least 70 dB below the noise floor.

In one preferred embodiment, the system is able to use, for example, sources including one or more pristine sources of analog and digital recordings, such as high sample rate DSD audio recording acquired using high quality gear. Together with any limits, improvements, and/or enhancements made in the acquisition and recording process as described herein, the source in 1A effectively provides an exemplary upper quality limit for the available source examples. As described herein, there are a range of improvements made via artificial intelligence module and other related subcomponents of the system, which further elevate the capabilities of this source type and thereby the invention. This improvement is possible due to AI-identified inherent noise and related patterns even in high quality audio data, together with human perceptual adaptations where such perception is possible.

In one embodiment, source 1B includes the most widely available high quality source type used in recording, and is often referred to as lossless, "CD quality" or by the specific sampling rate and bit depth commonly used, such as 44.1 kHz at 16 bits, 96 kHz at 24 bits or another similar specification. As with 1A described above, source 1B is able to be supplied across a wide range of source types.

Fidelity relative to the original source material is diminished proceeding from 1C (e.g., MP3 at 320 kbps), to 1D (e.g., Apple AAC at 128 kbps), and ultimately to 1E (e.g., MP3 at 64 kbps). While the source types depicted in FIG. 1 represent one preferred embodiment of the present invention, the actual specific levels of quality and source types are not limited to these, just as the specific audio source types and the ways in which they differ are also able to vary. These variations and options are useful in training, transfer learning and other adaptations for different purposes.

The next stage, stage 2, is a pre-processing and FX processing stage, including data aggregation and augmentation. In the training mode of operation, stage 2 is where the system employs standard types of audio processing variations, including compression, equalization, and/or other processes, and then turns the pre-processed and post-processed examples of these transformed audio files into digital spectrographs able to be used for AI training in stage 3. Stage 2 provides for representative training examples in the formats most efficiently usable for AI training.

The AI module utilized and trained in stage 3 is able to include supervised learning models (3A), unsupervised learning models (3B), and/or semi-supervised learning models (3C). In one embodiment, the machine learning module utilizes grokking to understand the source data provided and to therefore train the model. In this stage, the system both trains the deep learning models, and secondarily derives the abilities to: (a) segment audio data by character, quality/fidelity, genre, compression rate, styles and other attributes, enabling derivation of further training, workflow processing and output control options; and (b) create workflow and related indexes to be used for determining settings and step related variations to be used in the later stages for various restoration and/or transforms and/or effects as described herein. One of ordinary skill in the art will understand that the term "segmentation" in this case is not limited to its use in the prior art as meaning dividing the audio data into particular tracks or segments, but includes grouping multiple sources of audio data by particular traits or qualities, including those mentioned above. Further, this is able to be used to extend an API for other operational and deployment purposes, such as a Platform as a Service, to enter a transfer learning mode (e.g., for other markets and industries), and/or other uses.

The system is also able to provide AI-enabled direct processing transforms to be used to enhance, extend, or otherwise modify audio files directly for an intended purpose. This is based on applying the associative and differential factors across the audio data types to a range of transform options as described herein. Providing enough examples of the right types to enable the AI in stage 3 to derive weights, biases, activation settings, and associated transforms for the deep learning model to be used in stage 4 is essential.

Stage 4 is the indexing and transform optimization stage, enabling a user to selectively employ the information and capabilities derived from the earlier stages to set and employ the necessary transforms. Standard interface dashboards and related controls enable user selective choices, which are able to be intelligently automated via a scripting API. Specifically, the API is able to receive user selection to leverage a prior input and processing for remastering an audio file more optimally for a particular format or modality (e.g., DOLBY ATMOS), or recover information lost as a result of, for example, compression or other factors. In summary, this stage provides for specific deployment that affects how the audio is transformed, and thus the form and qualities of the final output.

In step 4A, the system is able to employ AI-derived segmentation analysis, deriving and determining which subsequent transform options and settings best suit the input audio given its state, style, or other characteristics, and given the desired delivery modality (e.g., live, studio, headphones, etc.). In step 4B, the artificial intelligence module of the system is able to choose whether to apply differential processing to the audio to achieve a restoration, improvement, modification, or creative function, beyond any mastering grade restoration. Transforms able to be applied by the artificial intelligence module in the system of the present invention include, but are not limited to, recovering information of reduced quality audio, removing unwanted acoustics or noise, and/or other functions. In step 4C, automated AI inferencing is able to be employed to automatically achieve a selected objective, based on inherent limits of the source material in comparison to patterned references inherent in the trained neural network. In step 4C, due to the inherent support for transfer learning, the system is also able to use differential examples to creatively direct style, level, equalization, or other transformations.

In stage 5, the system selectively employs one or more transforms (e.g., analog (5A), digital (5B) or dimensional (5C) transforms) for the audio, based on the creative or specific usage or other objectives. In one embodiment, it is at this stage where the system is able to employ transforms suitable for specific formats (e.g., DOLBY ATMOS) or have a glue-pass (i.e., a purpose-directed compression step) execute a compression or other function. Stage 5 provides the necessary controls to apply temporal-spatial, encoding/transcoding, and channel related bridging and transforms to interface with any real-world application, while providing mitigation and enhancement support for environmental, output/playback devices, and other environmental factors. Together with the segmentation and related indexing enabled in stage 4, and associated transform control options in stage 5, this collectively enables flexible output interfacing that constitutes an important benefit of the present invention.

Stage 6 is selectively employed in one of two primary modes. The first mode generates real-world based output used to optimize the training of the AI for a particular purpose. This stage uniquely enables the AI to employ generative processes and other means for deep levels of realism or other desired effects. Unlike prior approaches that used synthetic means to introduce ambience, dynamics, channelization, and immersion and other factors, humans are extremely sensitive to even minor relative quantization, equalization, phase, and other differences, which destroy a sense of accuracy and realism. The application of this stage, together with the use of a 1A reference standard, lesser quality examples of 1B-1E, and associated constraints, ensures that the described levels of fundamental realism, fidelity and creative objectives are supported.

The second mode of operation is to apply desired optimization for a given target purpose, such as for binaural audio (6A), for stereo mastering (6B), for style/sound/timbral character purposes such as by impulse response generation (6C), for ATMOS or other multichannel purposes (6D), for live event purposes such as transfer control (6E), and for other targeted purposes.

While the referenced I/O types listed in stage 6 as part of the preferred embodiment noted herein are supportive of the purpose of this invention, it must be noted that this invention is very specifically designed to be modularly adaptive, such that other types of I/O, even ones not related to audio/music, are easily able to be inserted within the architecture of the present invention. In fact, the architecture of this invention is very specifically architected to inherently support such options. Therefore, the diagram shown in FIG. 1 should not be read as limiting with regard to the output forms and modalities able to be supported by the present invention.

This capability is able to be used to enable the AI and supporting subsystems and phases to optimize and support a wide range of interfacing with other software or hardware for other purposes. It is an inherent part of this design to be able to selectively leverage other analog, digital and related hardware, and software together with the core system.

FIGS. 2-7 illustrate sequential flow diagrams for select stages described in the foregoing.

Figure 2:
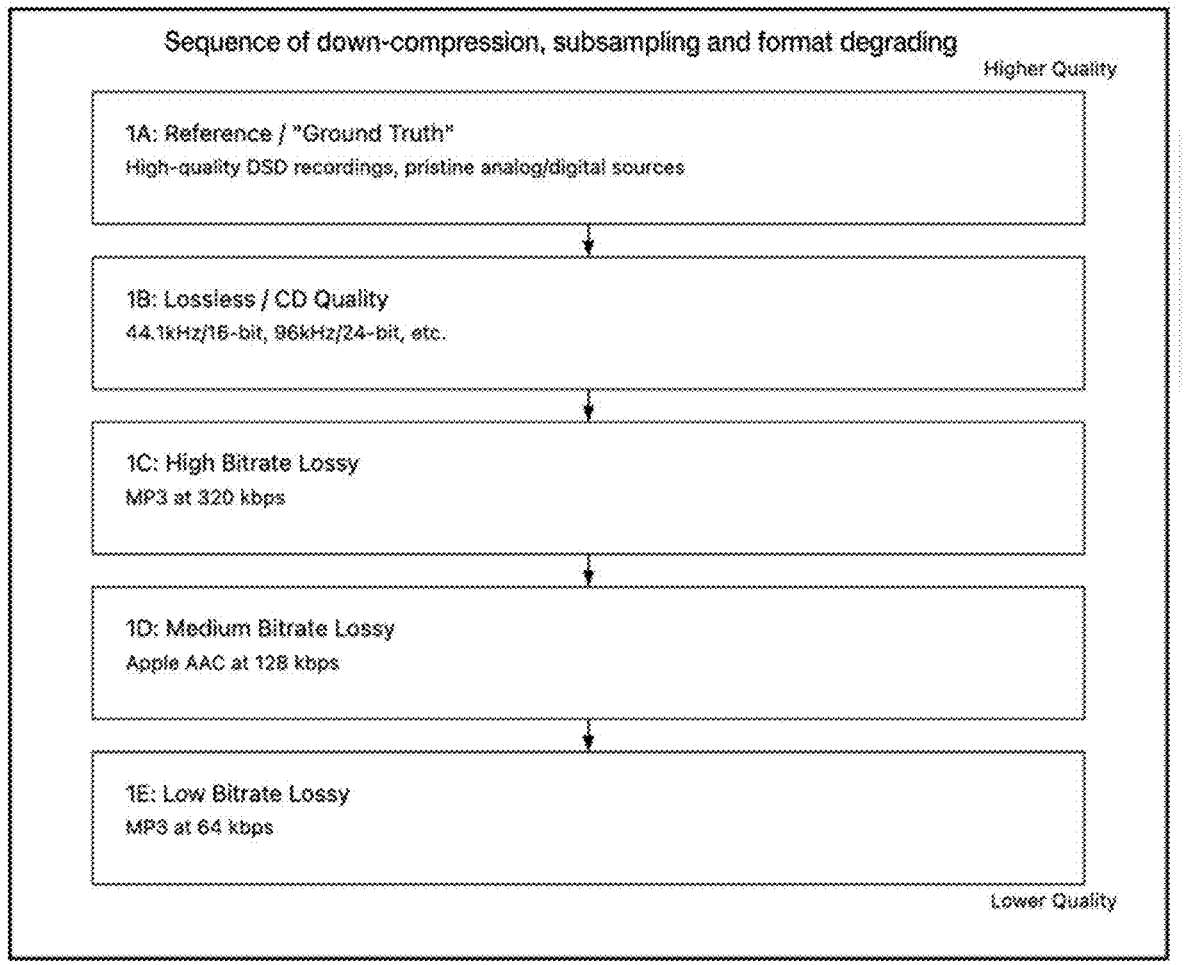
FIG. 2 is a flow diagram for an audio sourcing stage of an audio restoration or enhancement process according to one embodiment of the present invention.

FIG. 2 is a flow diagram for an audio sourcing stage of an audio restoration or enhancement process according to one embodiment of the present invention. FIG. 2 shows typical levels and types of example training data for enabling the model's training based on the differential factors between the levels of accuracy and fidelity between the ground truth (1A) Reference Ground Truth and each level of truncation, compression, artifact-induction, and related factors for sources 1B through 1E. Utilizing a wide variety of levels of example training types and levels helps to make the model of the present invention more effective and robust.

Figure 3:
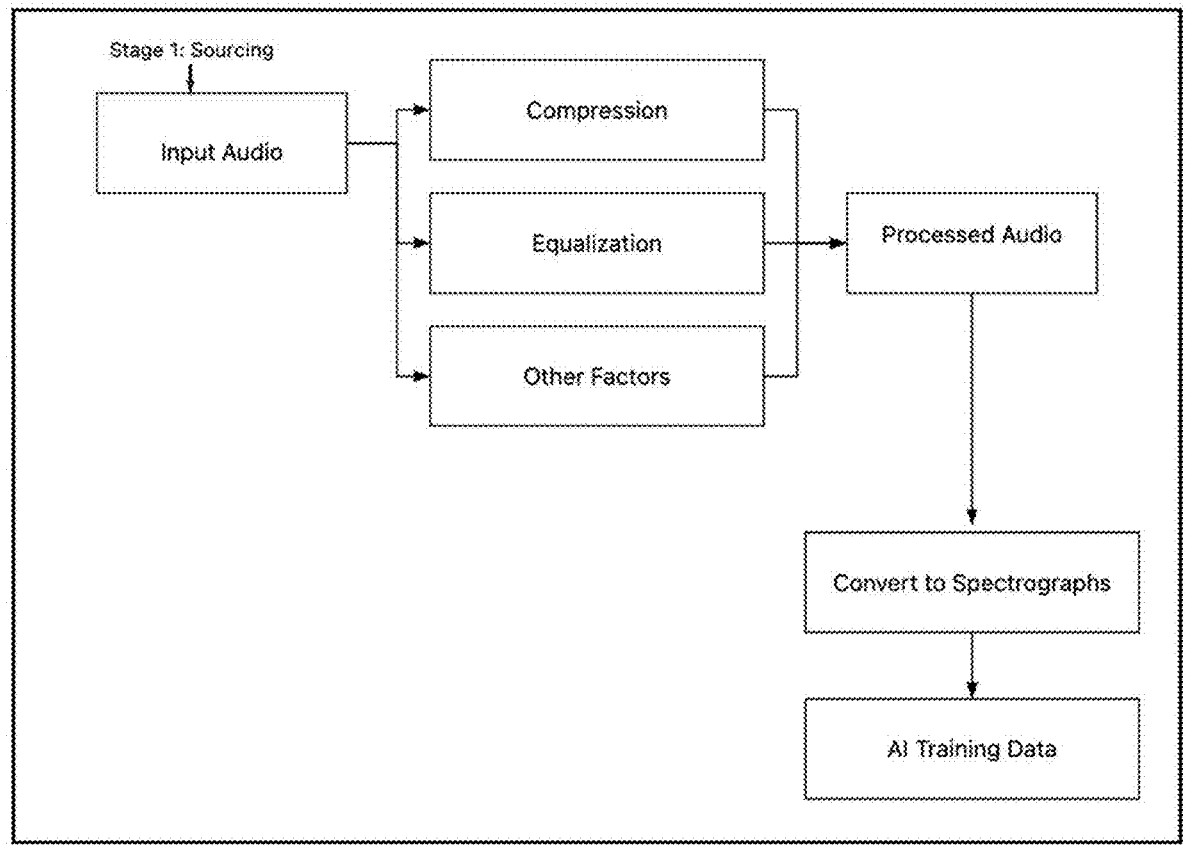
FIG. 3 is a flow diagram for a preprocessing and FX processing stage of an audio restoration or enhancement process according to one embodiment of the present invention.

FIG. 3 is a flow diagram for a preprocessing and FX processing stage of an audio restoration or enhancement process, according to one embodiment of the present invention. FIG. 3 diagrams how the system of the present invention preprocesses input/source audio data to create additional levels of synthetic training media/data, by transforming synthetically created ground truth training media/data into various levels of bandwidth-degraded, compression-degraded, sampling rate and format-degraded training examples.

Figure 4:
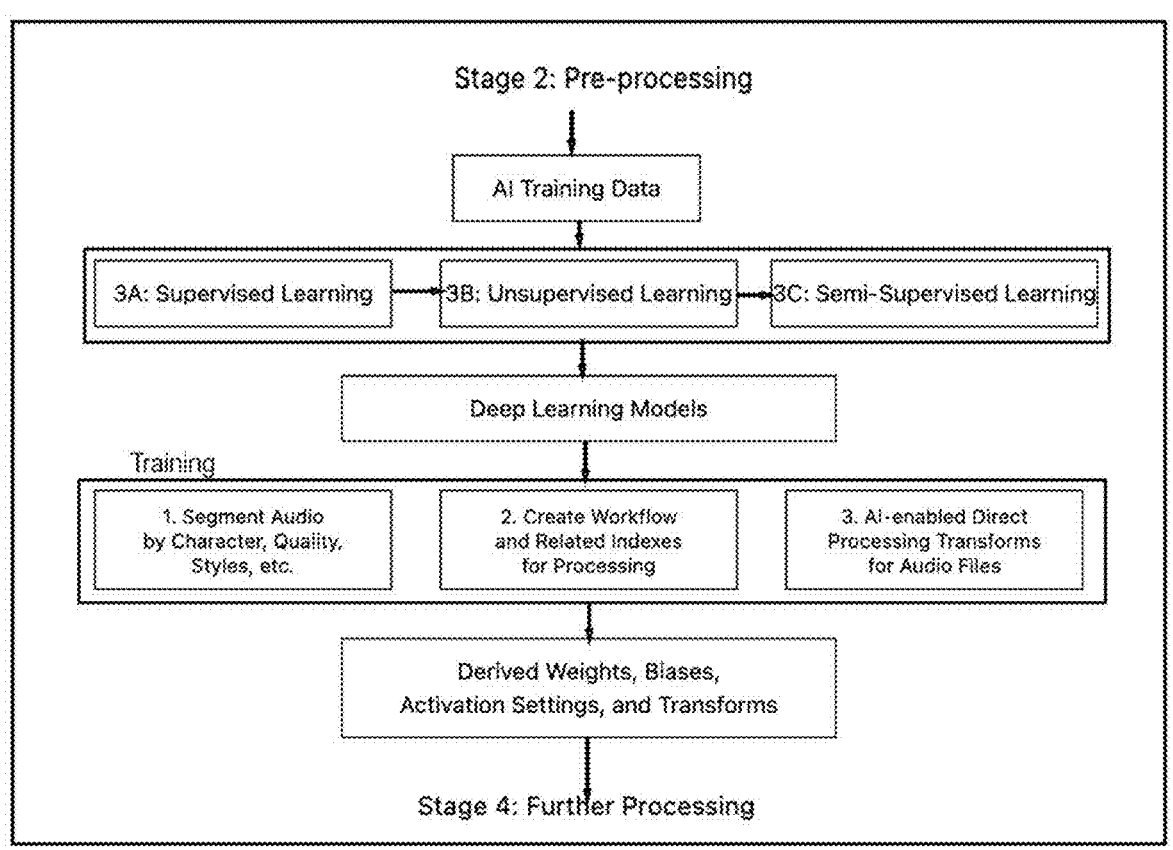
FIG. 4 is a flow diagram for an artificial intelligence (AI) training and deep learning model stage of an audio restoration or enhancement process according to one embodiment of the present invention.

FIG. 4 is a flow diagram for an artificial intelligence (AI) training and deep learning model stage of an audio restoration or enhancement process according to one embodiment of the present invention. FIG. 4 is a depiction of the training and deriving of optimized training results by the present system. The system leverages an encoder-decoder architecture, including using a Swin Transformer in a U-Net style architecture, and employs a multi-scale transformer architecture with a series of transformer blocks that are applied at different levels of the feature hierarchy. The system therefore leverages a transformer-based attention head that extracts scale-independent and related feature details from the media/data examples as defined.

The system trains the network to map from low-quality inputs to high-quality outputs by employing a curriculum learning approach: starting with easier restoration examples using supervised learning of structured example data, and gradually increasing complexity as the system moves to substantially unsupervised learning of largely unstructured data. The system combines multiple loss terms, including, by way of example and not limitation: a) element-wise loss (e.g., L1 or L2) for defining overall structure based on the highest quality data/media option examples; b) perceptual loss using AI models capable of processing spectrographic image and similar options (e.g., Vision Transformer (ViT) and its scale-independent AI network variants such as Pyramid Vision Transformer (PVT)) to capture features at various levels); and c) adversarial loss (generative adversarial network (GAN)-based) to identify and map to highest perceptual quality media/data with the highest fidelity details.

The model is trained progressively on different levels of degradation and limitations, starting with mild degradations (e.g., CD-Quality) and gradually introducing progressively more severe degradations as indicated in FIG. 2 (e.g., low bit rate MP3).

The system implements extensive data synthesis and augmentation to increase the model's generalization ability and provide a greater range and number of examples, including randomized bandwidth truncations, phase shifts, and related transforms, at varying levels of degradation. The model is modular, such that the system is able to support future training options including and beyond grokking.

The system pre-trains on a large set of diverse audio-spectrogram conversions (e.g., MEL spectrograms, etc.) before doing any fine-tuned training, leveraging principles of transfer learning.

To evaluate the model, the system uses both quantitative metrics (PSNR, identified/restored bandwidth, compression, and dynamics) and qualitative assessments based on typical Human Reinforcement Learning feedback. Additional metrics able to be used include, but are not limited to, signal-to-noise ratio (SNR) (indicating level of desired signal relative to background noise, with higher values indicating better quality), total harmonic distortion (THD) (quantifying the presence of harmonic distortion in the signal, with lower values indicating less distortion and higher fidelity), perceptual evaluation of audio quality (PEAQ) (based on an ITU-R BS.1387 standard for objective measurement of perceived audio quality with a score from 0 (poor) to 5 (excellent)), mean opinion score (MOS) (a subjective measure with listeners rating audio quality on a scale of 1 to 5), frequency response (measuring how well the system reproduces different frequencies, which is ideally flat across a spectrum of 2 Hz to 100 kHz), intermodulation distortion (IMD) (measuring distortion caused by interaction between different frequencies, with lower values indicating better fidelity), dynamic range (i.e., the ratio between the loudest and quietest sounds in the audio, with higher values usually indicating better quality), spectral flatness (measuring how noise-like or tone-like a signal is in comparison to ground truth data, which is useful for accessing the presence of unwanted tonal components and phase anomalies), cepstral distance (measuring the difference between two audio signals in the cepstral acoustic domain, with smaller distances indicating higher similarity and, typically, better fidelity), perceptual evaluation of speech/vocal quality (PESQ) (an ITU-T standard for assessing speech quality with scores from −0.5 to 4.5, with higher scores indicating better quality), perceptual objective listening quality analysis (POLQA) (i.e., un updated version of PESQ able to be used for super wideband audio and evaluated between 1 and 5), articulation index (AI) or speech/vocal intelligibility index (SII) (measuring the intelligibility of speech in the presence of noise, with scores from 0 to 1, and with higher values indicating better intelligibility), modulation transfer function (MTF) (assessing how well a system preserves amplitude modulations across frequencies, which is important for maintaining clarity and definition in complex audio), noise criteria (NC) or noise rating (NR) curves (used to assess background noise levels in different environments, with lower numbers indicating quieter environments), loudness (e.g., measured in loudness units relative to full scale (LUFS), which is useful for ensuring consistent loudness across different audio materials), short-time objective intelligibility (STOI) (measuring intelligibility of speech signals in noise conditions, with scores from 0 to 1 and with higher values indicating better intelligibility), binaural room impulse response (BRIR) metrics (i.e., various metrics derived from BRIR measurements to assess spatial audio quality including interaural cross correlation (IACC) and early decay time (EDT)), spectral centroid (indicating where the "center of mass" of the spectrum is located for assessing brightness or dullness of a sound), weighted spectral slope (WSS) (measuring the difference in spectral slopes between original and processed speech, with lower values indicating higher similarity), and log likelihood ratio (LLR) (comparing differences between linear predictive coding (LPC) coefficients of the original and processed speech, with lower values indicating higher similarity).

Figure 5:
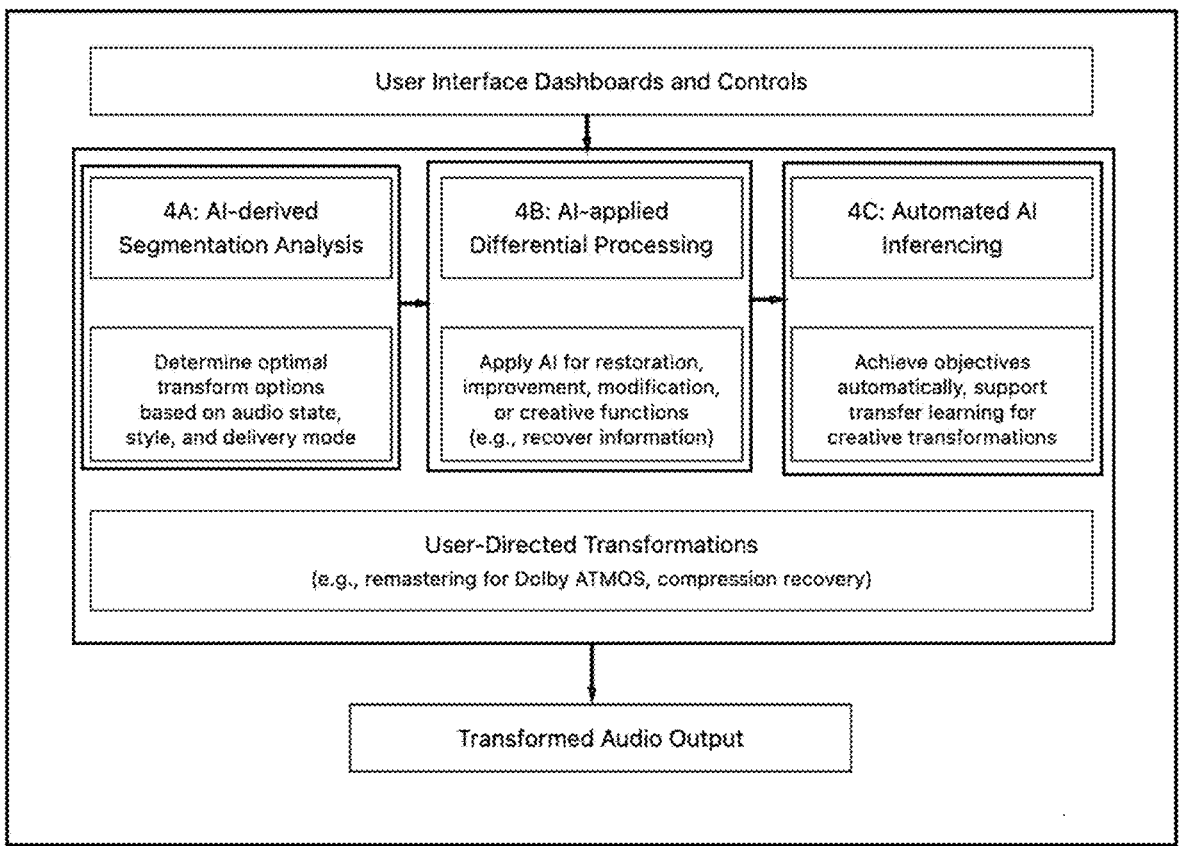
FIG. 5 is a flow diagram for an indexing and transform optimization stage of an audio restoration or enhancement process according to one embodiment of the present invention.

The system is able to train the model using degradation type/level as an additional input to the transformers taken in sequence and in-parallel, and apply a cascaded approach where the output is iteratively refined through multiple stages as described in FIG. 5.

FIG. 5 is a flow diagram for an indexing and transform optimization stage of an audio restoration or enhancement process according to one embodiment of the present invention. FIG. 5 further delineates the processing and related handling of the media based on a segmented set of styles, delivery/output formats, and related options. The system also allows for selective control of the system based on directed input and selection of options by human and/or AI-automated processes. For example, in one embodiment, the indexing and transform optimization stage includes a first AI-based segmentation analysis substage, in which optimal transform options are determined based on audio state, style, and delivery mode. This segmentation analysis then leads to an AI-based differential processing substage, in which the AI is applied for restoration, improvement, modification, or for creative functions (e.g., recovering information). After the differential processing, the audio data is then able to be put through an automated AI-based inferencing substage, in which objectives are achieved automatically, with support for transfer learning for other creative transformations. This stage is able to operate based on user-directed transformations for particular known types of conversion (e.g., remasters for DOLBY ATMOS, compression, recovery, etc.).

Figure 6:
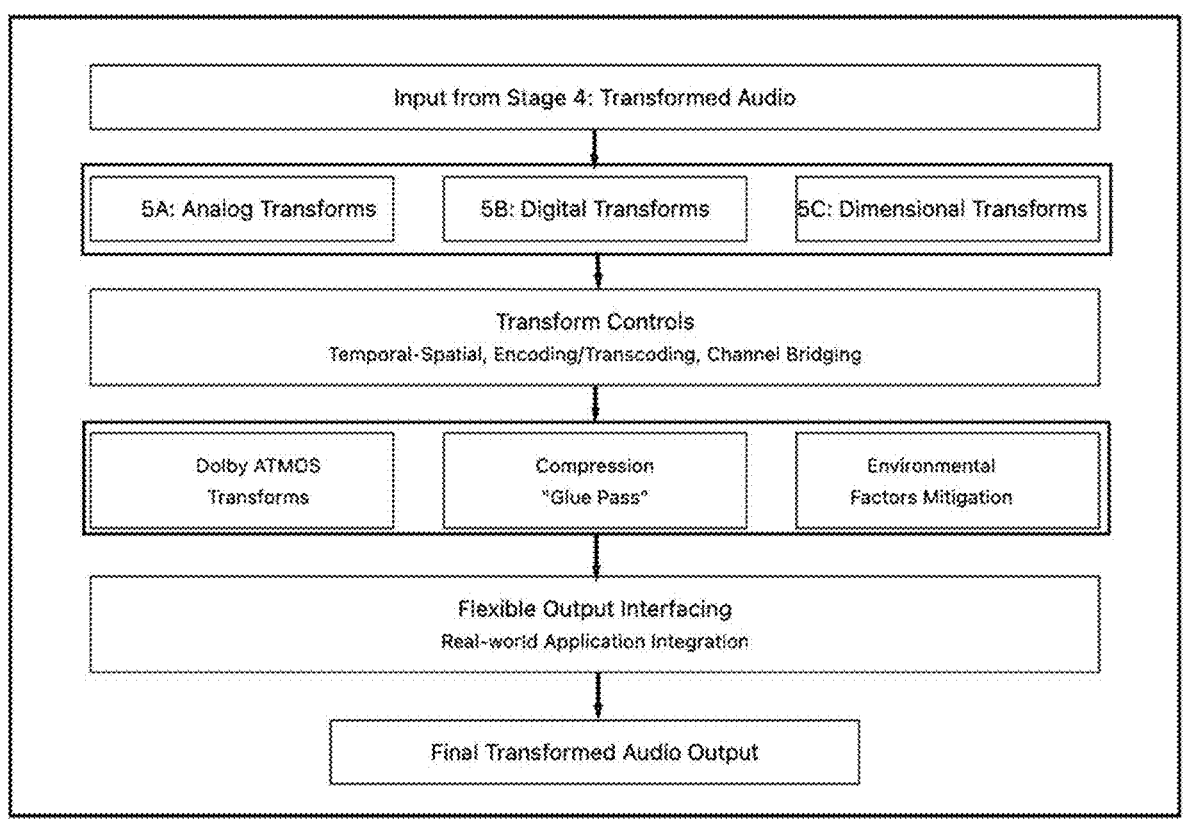
FIG. 6 is a flow diagram for a dimensional and environmental transform stage of an audio restoration or enhancement process according to one embodiment of the present invention.

FIG. 6 is a flow diagram for a dimensional and environmental transform stage of an audio restoration or enhancement process according to one embodiment of the present invention. FIG. 6 provides additional sets of important transforms able to be applied to support the range of typical analog and digital formats and standards, such as immersive, multi-channel, stereo, and related real-world applications and usage that must be handled. These transforms are able to include analog, digital and dimensional transforms, with controls for each transform, including temporal-spatial, encoding/transcoding, and channel bridging. Additional specific transforms are also able to be applied, including but not limited to those associated with particular formats (e.g., DOLBY ATMOS), a compression "glue pass," and/or environmental factors mitigation. The transformed data is able to then pass through a flexible output interface for a real-world application to produce a final transformed audio output.

Figure 7:
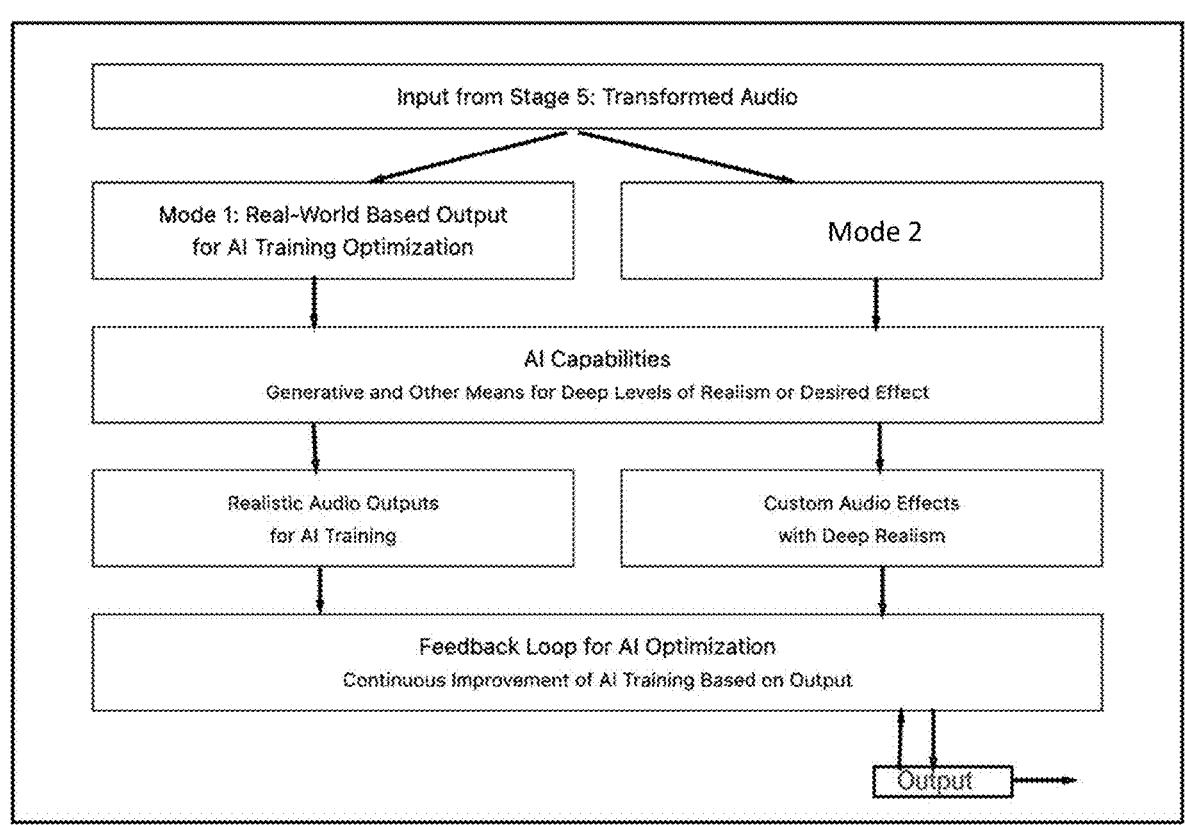
FIG. 7 is a flow diagram for an output mode stage of an audio restoration or enhancement process according to one embodiment of the present invention.

FIG. 7 is a flow diagram for an output mode stage of an audio restoration or enhancement process according to one embodiment of the present invention. FIG. 7 diagrams the modular approach of the present invention for supporting currently defined standards and supported uses for various use cases. The modular approach also allows the system to support integration of new or otherwise additional formats. FIG. 7 illustrates that Stage 6 of the audio restoration or enhancement process provides for support for other optional use cases, such as gaming, immersive realism such as in mixed reality, hyper-realism, BCI-enabled deep realism, and other such applications. Finally, the architecture supports feedback into the system for progressive optimization based on AI-driven processes.

Figures 8, 9:
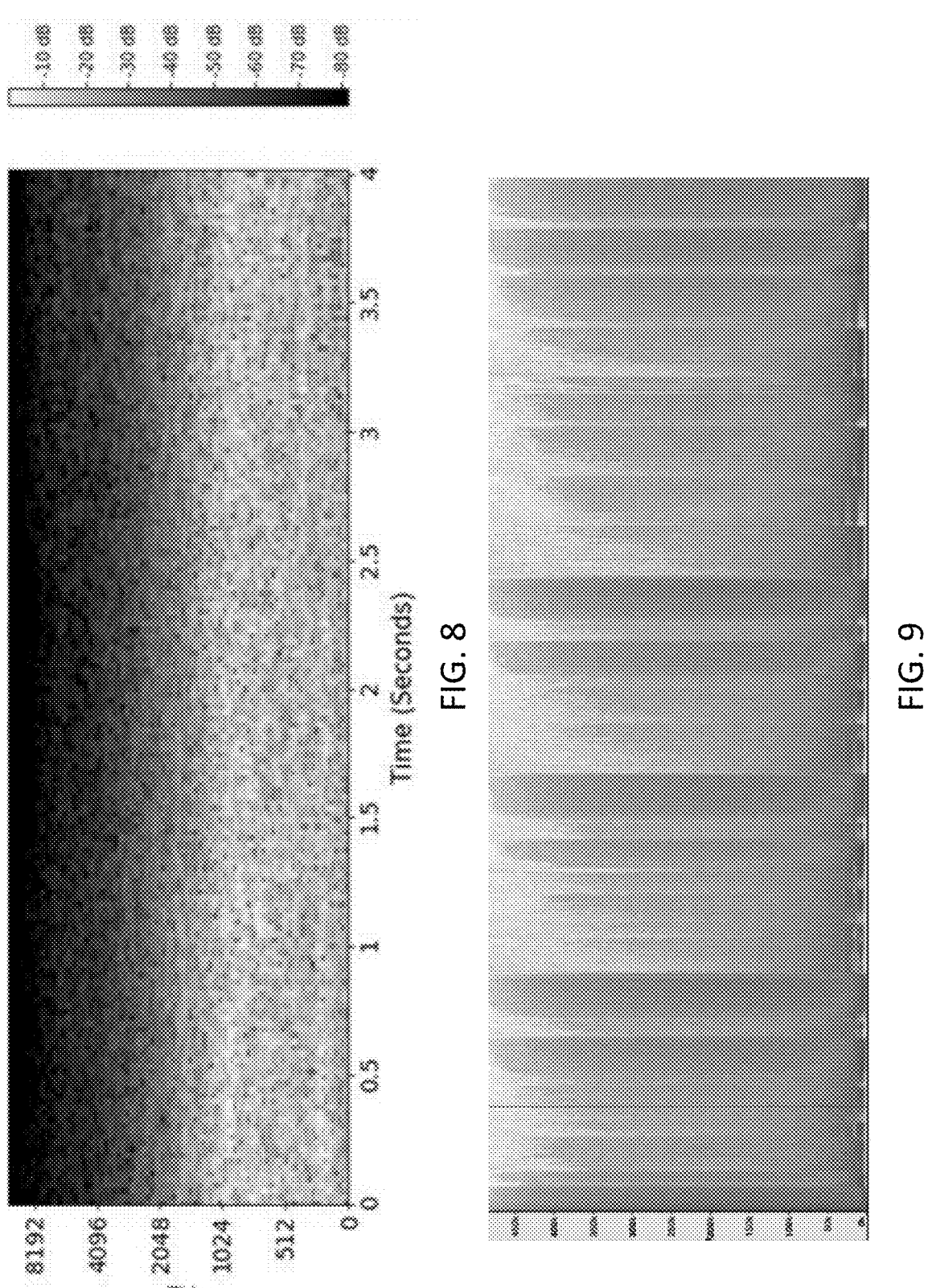
FIG. 8 is a signal diagram for a signal formatted with Pulse Code Modulation without application of improvements provided by the present invention.
FIG. 9 is a signal diagram for a Pulse Density Modulated Signal according to one embodiment of the present invention.

Turning the attention now to the PDM method of lossless processing capability of the system of the present invention, FIG. 8 depicts a signal format traditionally used via Pulse Code Modulation (PCM) without any improvements enabled by the present system. Alternatively, FIG. 9 shows a version of the spectrum with PDM sampled at 5000,000 Hz as part of the present system, showing the spectrum devoid of aliasing, phase, distortion, and other artifacts.

Without the ability to eliminate phase, quantization, transient, frequency, and sampling-related artifacts and distortion, which is enabled by the present invention, the benefits and capabilities described herein would not be possible.

Figure 10:
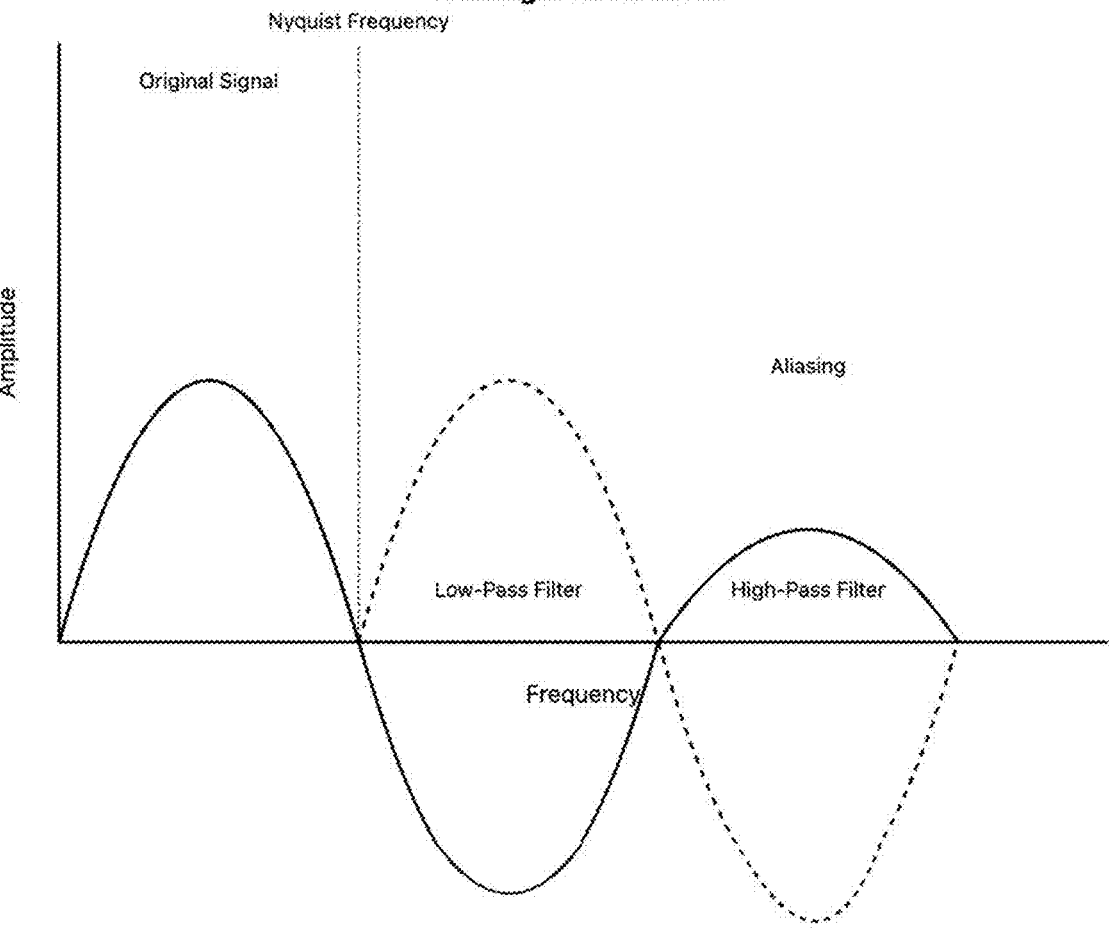
FIG. 10 is a graph showing aliasing in the use of low-pass or high-pass filters for audio data.
Figure 11:
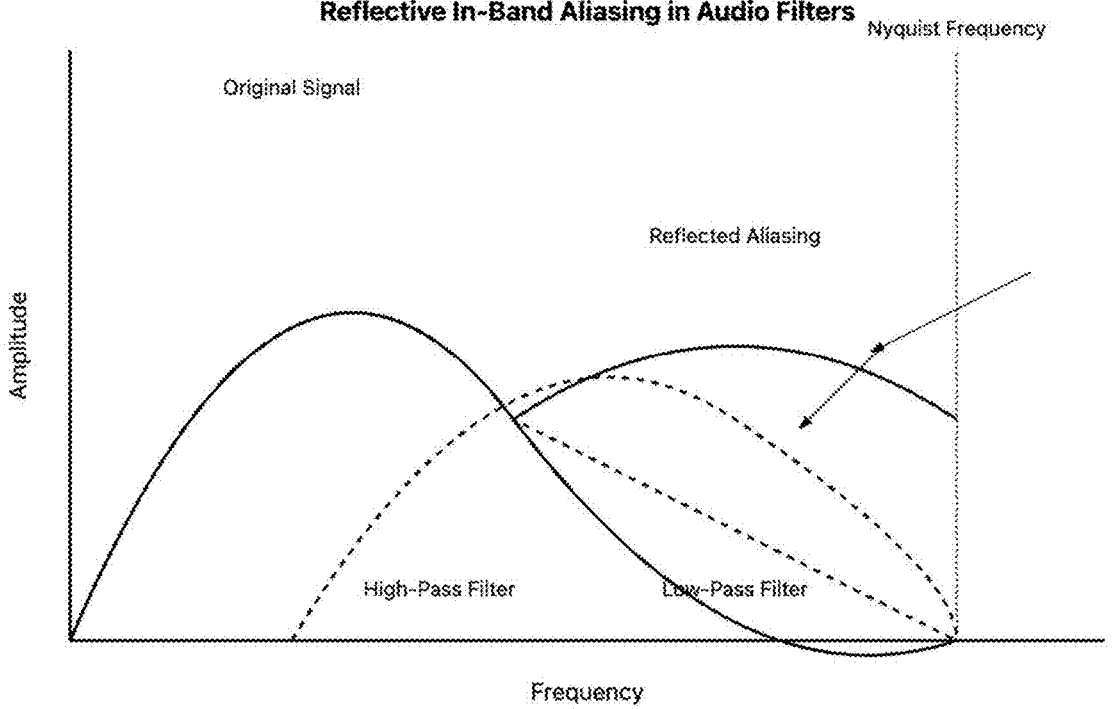
FIG. 11 is a graph showing reflective in-band aliasing for high-pass and low-pass audio filters.

FIG. 10 is a graph showing aliasing in the use of low-pass or high-pass filters for audio data. As shown in FIG. 10, traditional PCM causes aliasing and therefore artifacts appear above the Nyquist frequency. While many systems employing PCM assume 20 Hz to 20 kHz to be the range of perceptible audio and design filters accordingly, as previously noted, such assumptions are faulty and therefore the artifacts induced in such PCM methods are perceptible. Furthermore, as shown in FIG. 11, even below the Nyquist frequency (i.e., below 20 kHz), reflected in-band aliasing occurs, affecting perceptible qualities of the sound, such as frequency, timbre, imaging, and other qualities. The ability to eliminate the need for low pass and high pass filtering in ground truth training and reference samples, as well as in the output generation workflow allows for the elimination of reflected in-band aliasing under the Nyquist frequency.

In addition to bypassing the frequency related effects, and the resulting tonal, timbral and intonation-related impact on the sound, the system therefore also enables the elimination of phase anomalous effects that all prior and currently available methods introduce to analog and digitized audio. The result of this is that imaging, dimensional characteristics, and the localization and positional representations of the original emitting elements will not be impacted during new recording and output. Also, the ability to apply the AI-driven semantic pattern identification of phase effects allows the system to eliminate them from existing recordings, resulting in the first and only system capable of such recovery and restoration.

Figure 13:
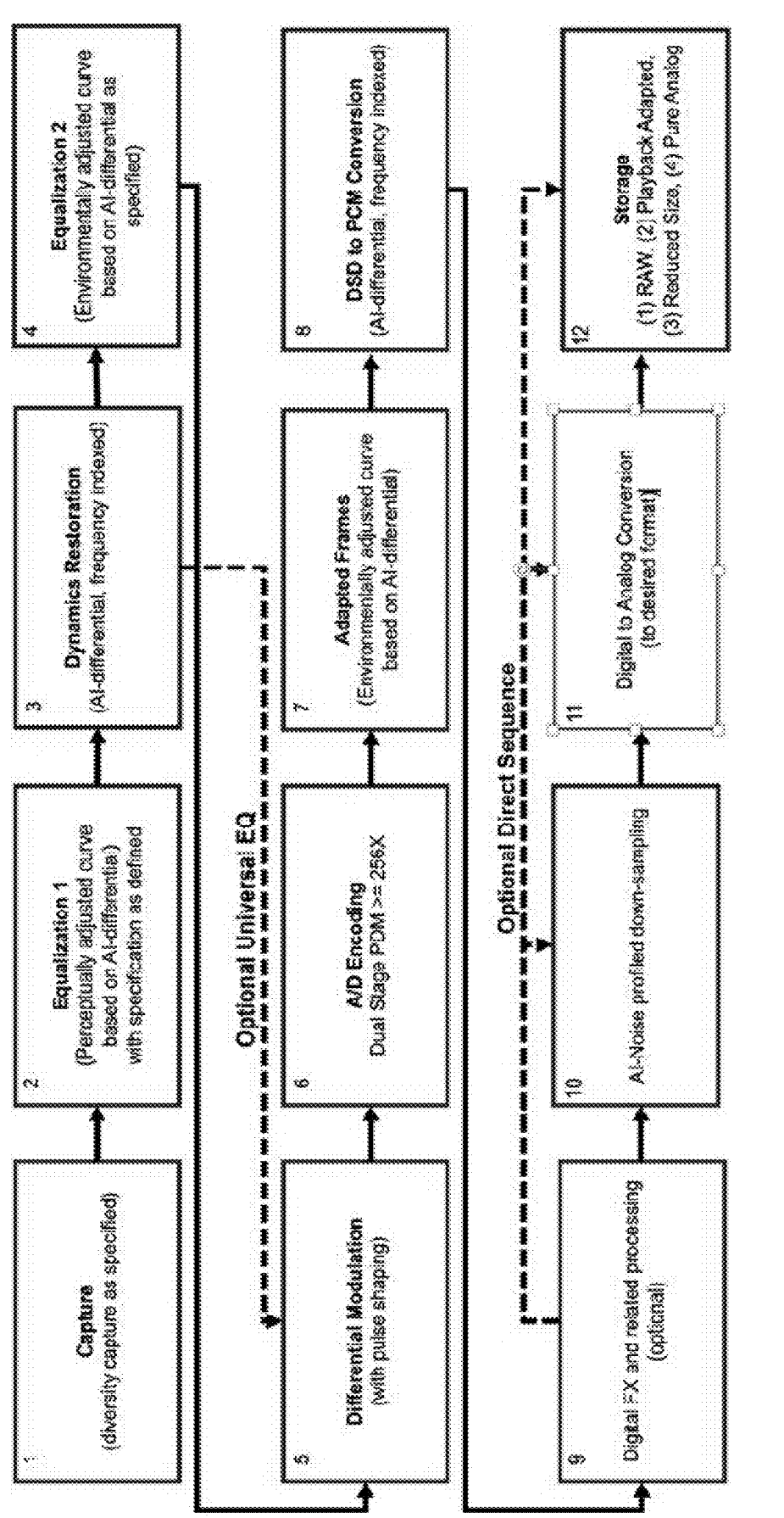
FIG. 13 is a schematic diagram of a pulse density modulation process for capturing and encoding lossless audio according to one embodiment of the present invention.

FIG. 13 is a schematic diagram of a pulse density modulation process for capturing and encoding lossless audio according to one embodiment of the present invention. In embodiments of the present invention there are 12 stages to the system and method, defined as stages 1 through 12 identified in FIG. 13 as 1-12. One of ordinary skill in the art will understand that the stages provided with reference to FIG. 13 are distinct from those described in FIG. 1, as the processes depicted in the diagrams of each figure are distinct. In embodiments of the present invention stages 1-8, along with one or more of stages 9-12 are required. Which of the stages 9-12 are chosen depends on the specific output format and usage that is required as described below.

Operational Sequence of System and Method

Figure 14:
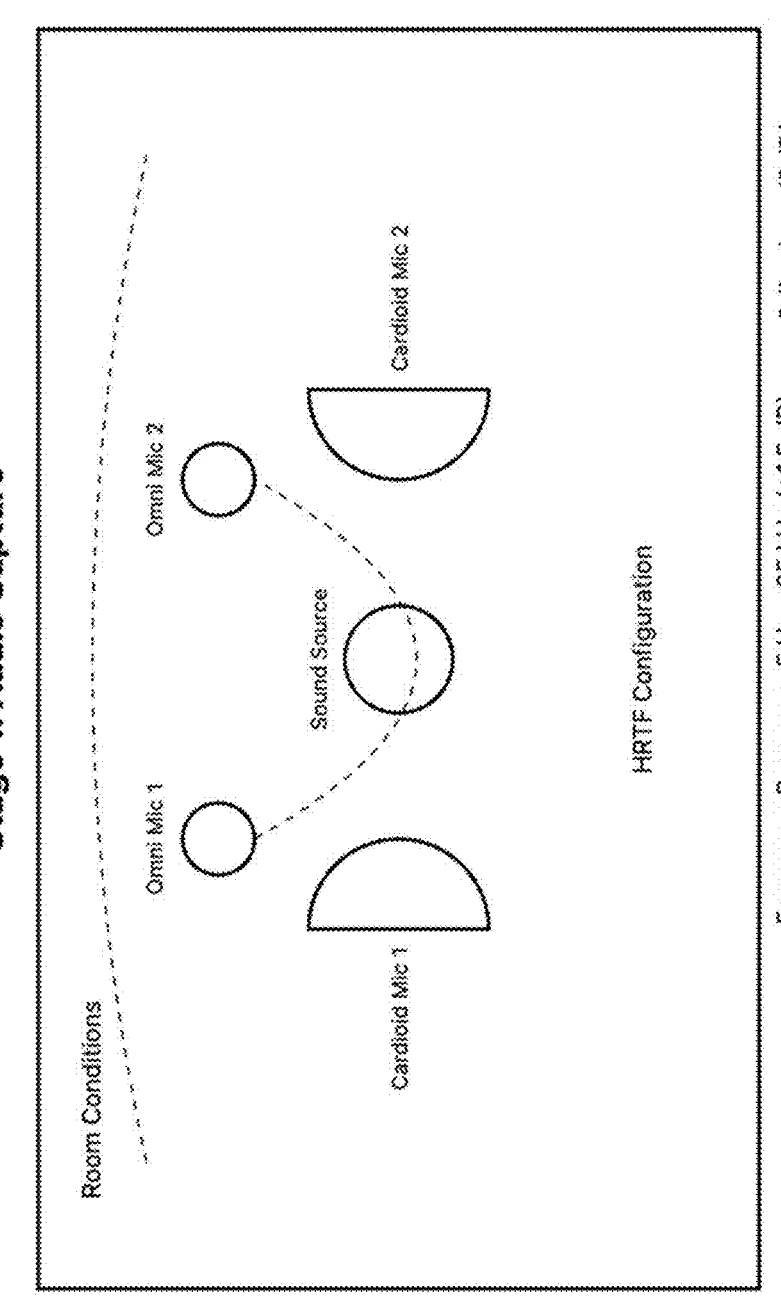
FIG. 14 is a schematic diagram of an audio capture stage of a pulse density modulation process according to one embodiment of the present invention.

As shown in FIG. 13 and more particularly in FIG. 14, stage 1 is the capture phase, which requires a minimum of the following configuration and enabling capabilities. A diversity microphone set of two (2) omni directional and two (2) cardioid microphones capable of being equalized to −1.5 dB and +1.5 dB, between <=5 Hz and >=65 kHz, and having a self-noise of no more than 15 dBA is used. First, the set is established for diversity capture using a stereo pair of cardioid pattern microphones as appropriate for the given distance, application, and recording purpose. Secondarily, for the same source, the microphone set includes a head related transfer function (HRTF)-configured omni-directional microphones complying with the above specification. The defined two or more sets of microphones enable the invention to be able to differentiate between the room conditions and related frequency, phase, delay, and other responses and the sound source itself. While other numbers of sets of microphones are able to be used to enable a diversity recording capability, to be faithful to the extent and capabilities of human hearing and perception, the microphones need to, at a minimum, have the specifications and capabilities defined herein. Furthermore, while the microphone configuration described supports the necessary capture requirements as described, other configurations that support these requirements are also able to be used if available.

Figure 15:
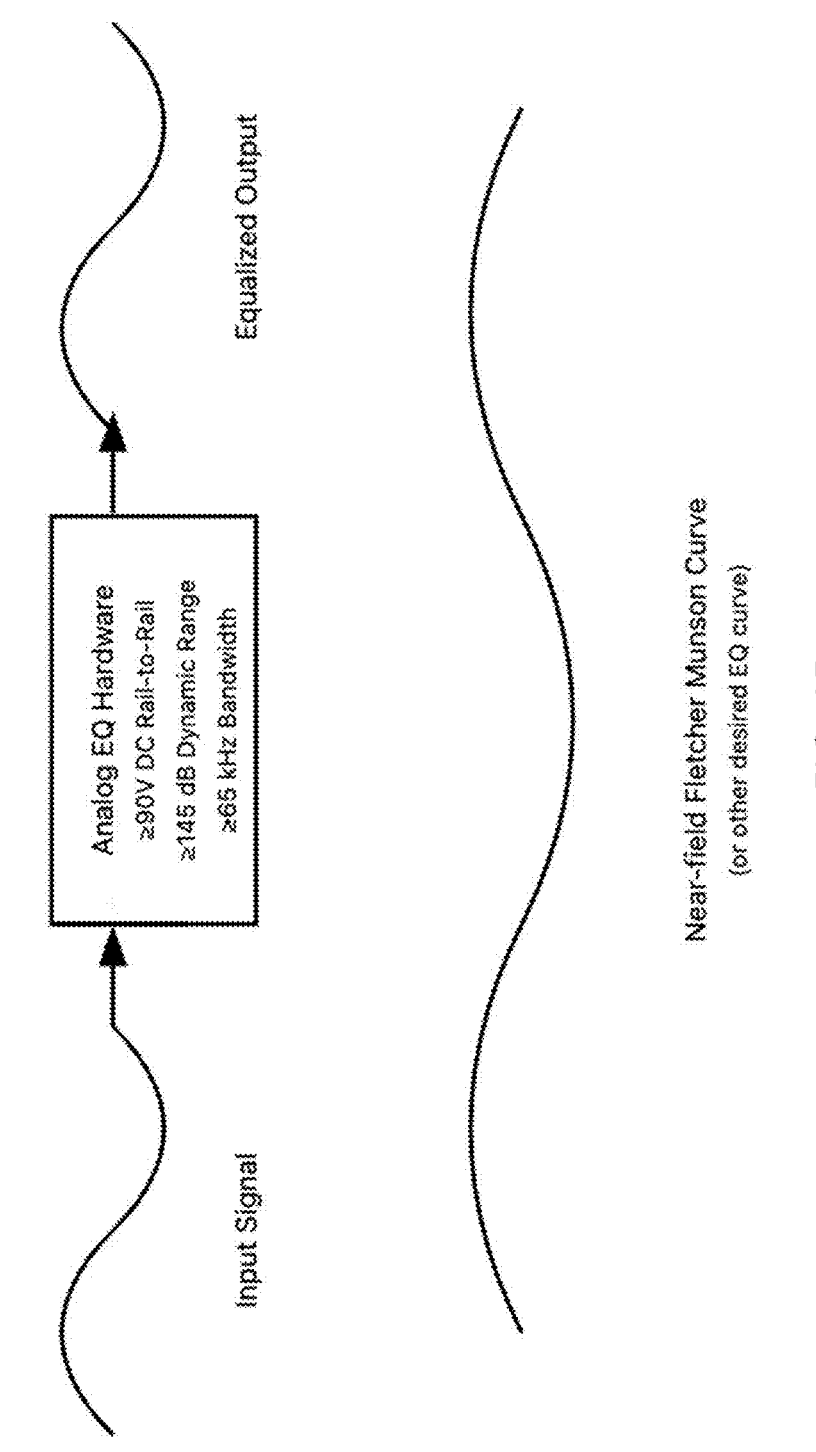
FIG. 15 is a schematic diagram of an analog equalization stage of a pulse density modulation process according to one embodiment of the present invention.

As shown in FIG. 15, stage 2 is an analog equalization stage using analog audio equalization hardware or similarly purposed devices appropriate to enable capture at 90V or greater rail to rail Direct Current (DC) voltage, to ensure support for a dynamic range of at least 145 dB at a slew rate that supports fundamental and partial harmonics through the entire capture range of 65 kHz or greater. The purpose is to ensure that the bandwidth is ideally at least 65 kHz, and that the inherent signal-to-noise ratio (SNR) and associated dynamic range supported is commensurate with Stage 6 and its requirements as described below. The goal of the equalization at this stage is to provide support for what is referred to in the industry as a near field Fletcher Munson or other desired equalization curve that is compliant with the final audio preference and related requirements, if any, prior to the final playback method, medium, or environment related requirements as further described below.

Figure 16:
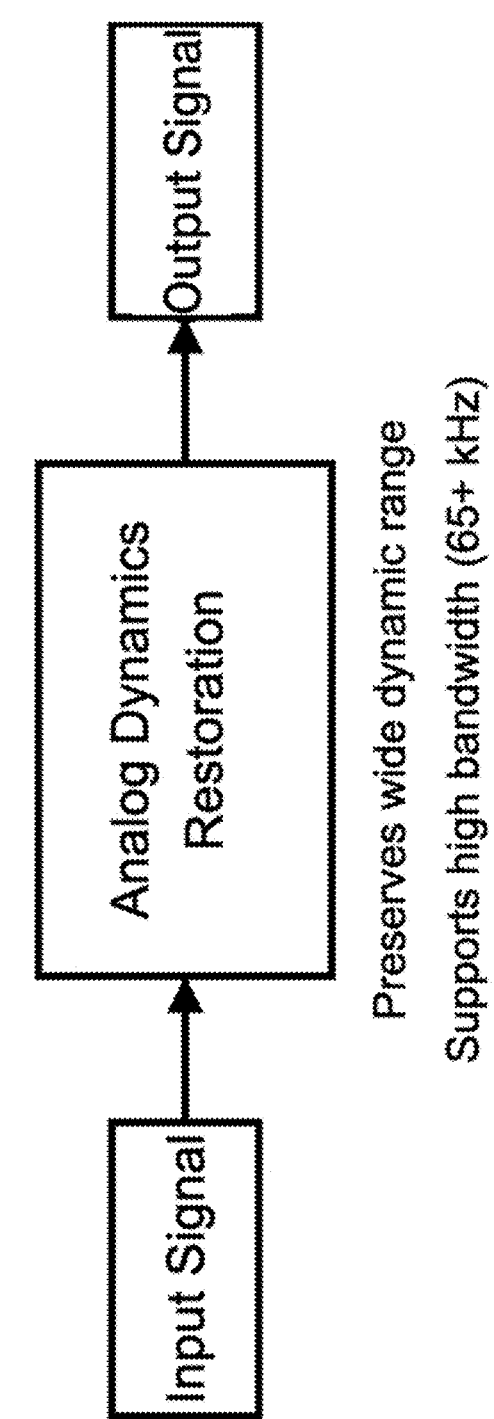
FIG. 16 is a schematic diagram of an analog dynamics restoration stage of a pulse density modulation process according to one embodiment of the present invention.

As shown in FIG. 16, stage 3 is an analog dynamics restoration stage via an analog audio compressor, or similarly purposed devices that do analog dynamics restoration appropriate to ensure capture at 90V or greater rail to rail DC voltage, to provide support for an SNR enabling a dynamic range of at least 145 dB at a slew rate that supports fundamental and partial harmonics through the entire capture range of 65 kHz or greater. The purpose is to ensure that the bandwidth is at least 65 kHz and that the inherent signal to noise ratio and associated dynamic range supported is commensurate with the analogous limits of Stage 6 as described below.

Figure 17:
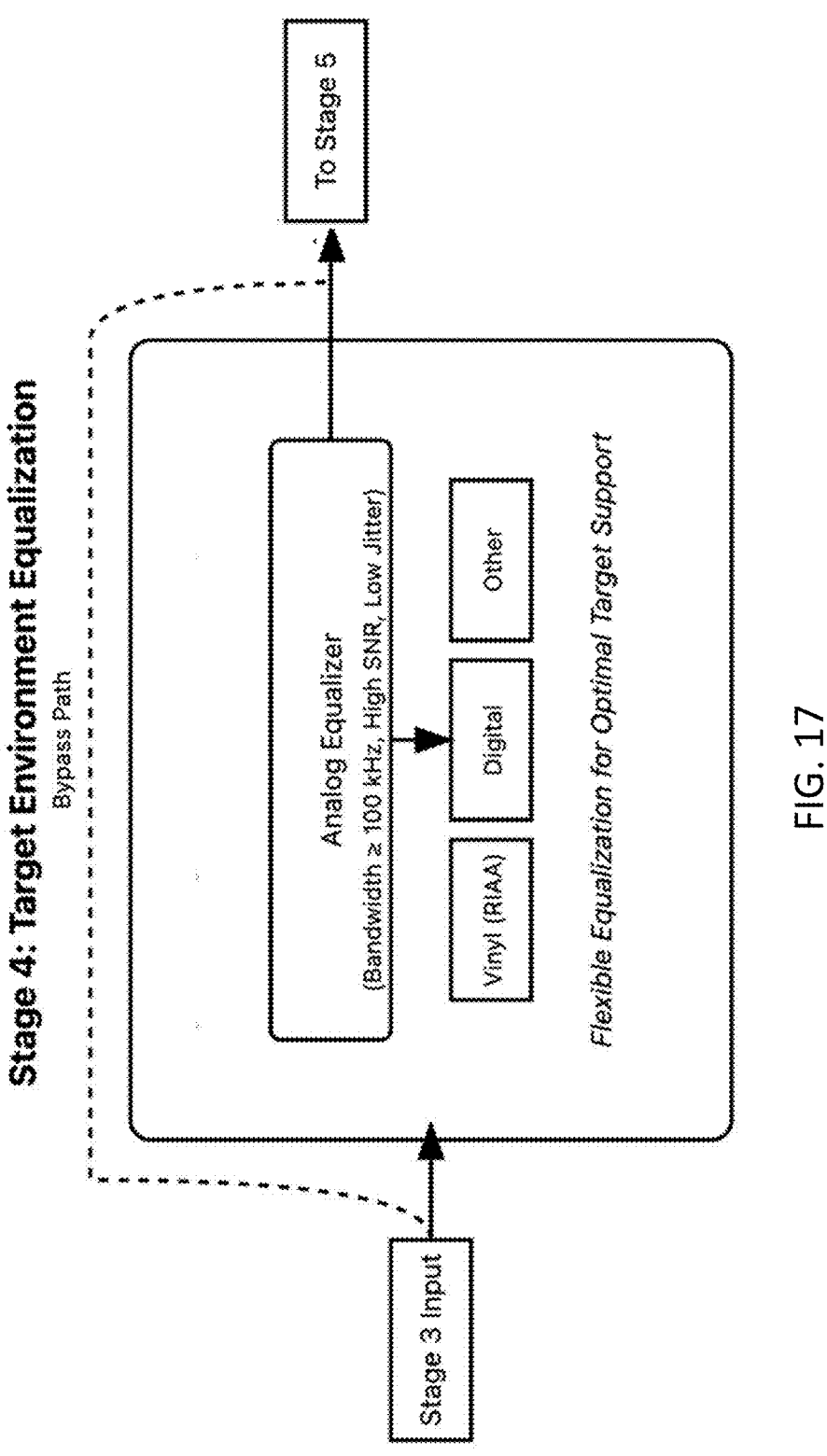
FIG. 17 is a schematic diagram of a target environment equalization stage of a pulse density modulation process according to one embodiment of the present invention.

As shown in FIG. 17, stage 4 uses either the same or a different equalizer, or another audio device that is able to serve the same purpose to enable analog audio equalization necessary for target playback medium and/or environment. In contrast to stage 2, stage 4 provides the optimal support for a particular target recording medium, purpose or environment. For example, if the final output of this stage 4 is to be optimal for mastering to vinyl, a Recording Industry Association (RIAA) or comparable curve is able to be implemented at this stage to allow for required results compatible with the usage requirements. For example, an RIAA curve is important to ensure that the resulting audio is able to be properly used for mastering and creating vinyl records.

Stage 4 supports the creation of one or more target environment compliant equalizations, the output of which then may continue to stage 5 for differential modulation and related transform as described. Stage 4 is able to be bypassed by having the output of stage 3 proceed directly to stage 5. The purpose of stage 4 is to provide a flexible option to support the specific requirements most optimally, rather than leaving such optimization to others at some point in the future. Further, the fact that, as part of the system, Stage 4 supports 100 kHz or greater bandwidth, with a slew rate, SNR, and associated dynamic range at or above the perceptual and related limits of human hearing in the analog domain, allows the invention to mitigate any digital jitter, noise, and related factors that reduce the audible accuracy when compared to what a person would hear if at the original location of the audio event.

Figure 18:
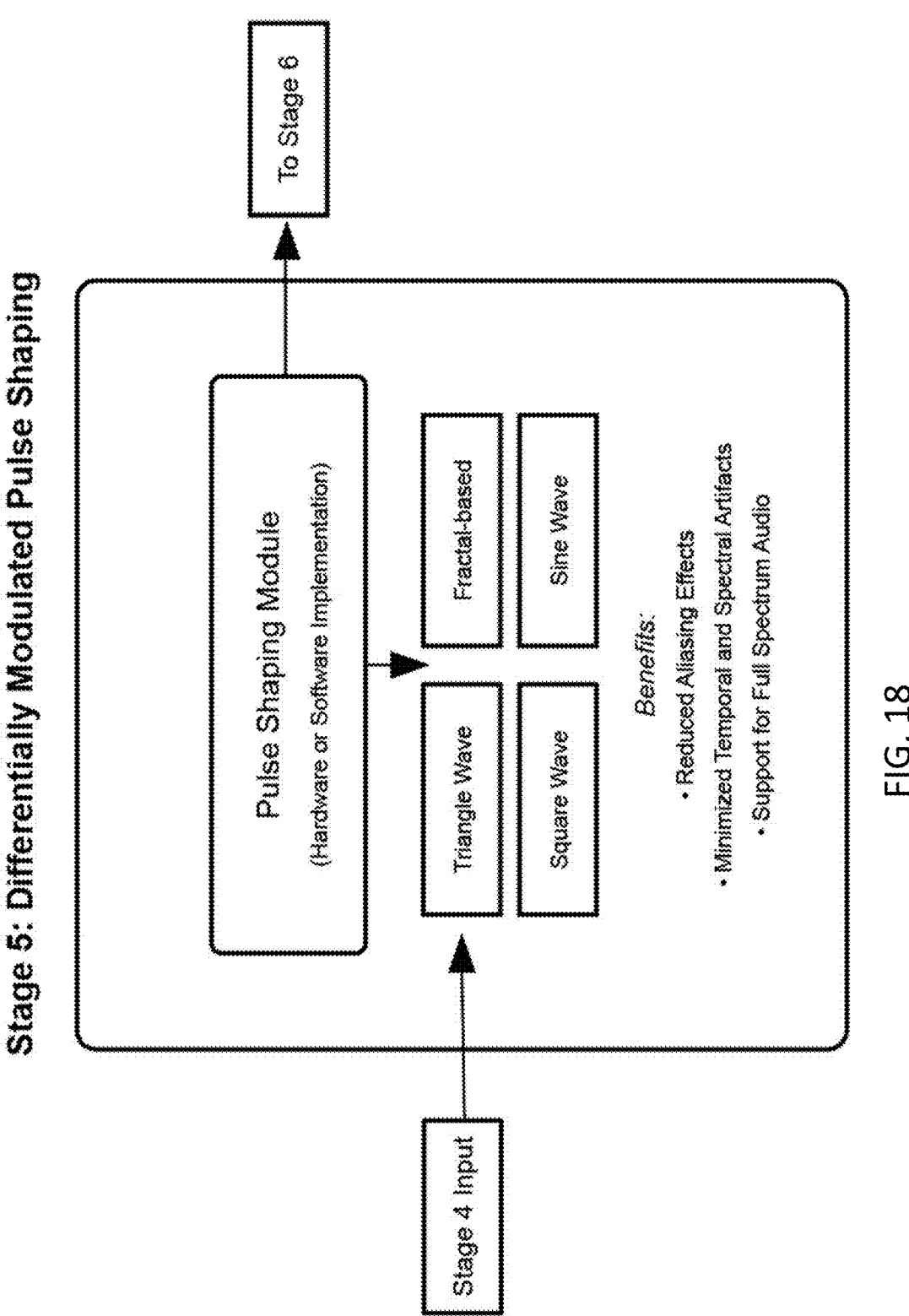
FIG. 18 is a schematic diagram of a differentially modulated pulse shaping stage of a pulse density modulation process according to one embodiment of the present invention.

As shown in FIG. 18, stage 5 employs differentially modulated pulse shaping using hardware or software that reduces aliasing effects throughout the subsequent band-limited stages and reducing temporal and spectral artifacts that otherwise are introduced in the analog-to-digital and related conversion processing. The pulse shaping is able to be based on any standard or purpose-specific nonlinear or linear-based implementation, including triangle, square wave, fractal, or sine wave based. As is commonly known by many in the field, each approach has its own benefits and related considerations, in terms of optimal usage cases and constraints. As such, a unique aspect of the system is that it has an architecture and signal and processing flow to support any one or more of them, while obtaining maximal benefit of their use case, due to the unique full spectrum and related perceptual human hearing factors driven capabilities.

Figure 12:
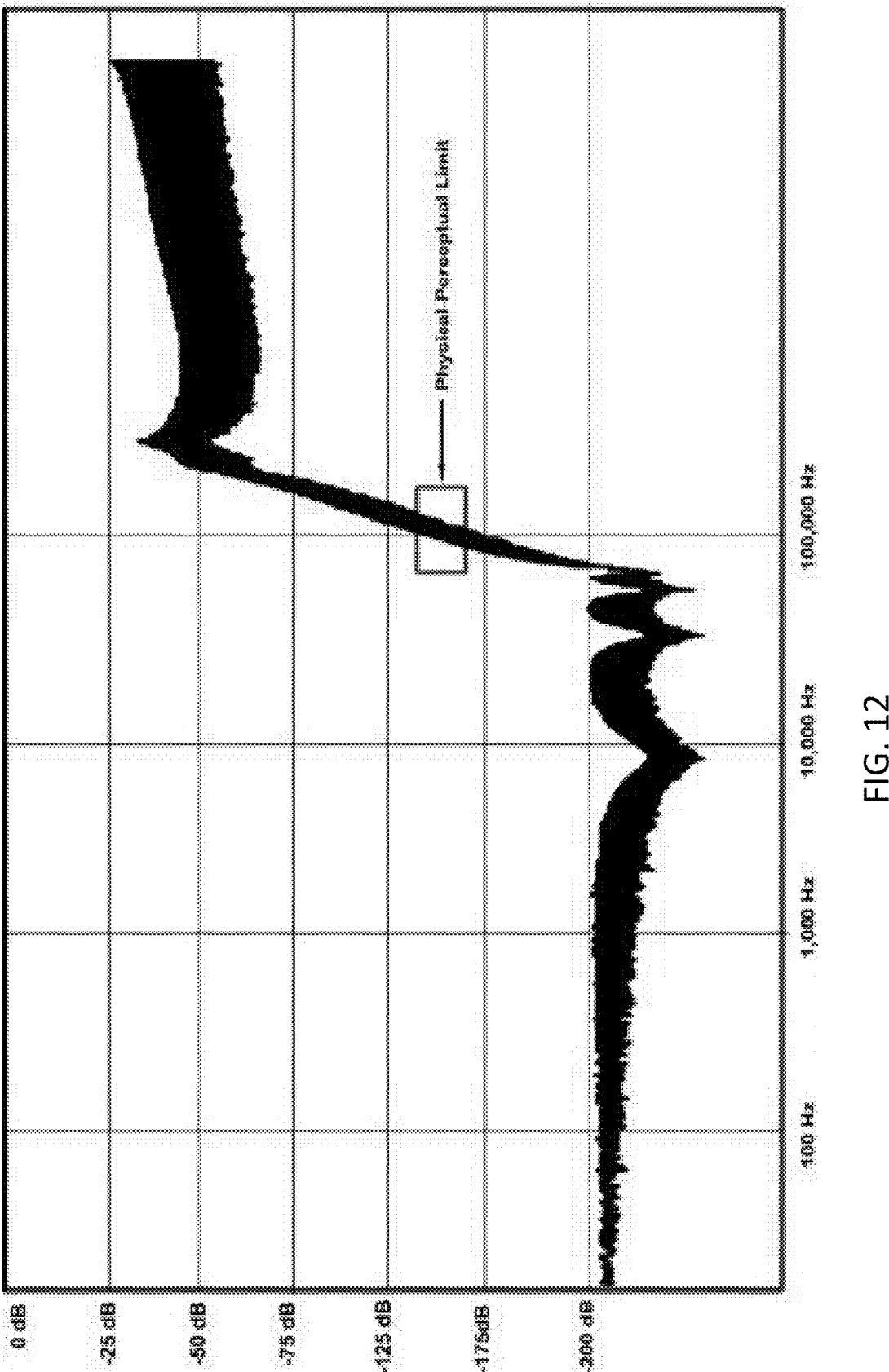
FIG. 12 is a graph showing limits for noise-constrained conversion.

As shown in FIG. 19, stage 6 is the analog to digital conversion process, which is able to employ, for example, the Direct Stream Digital (DSD) audio format-based encoding at an ideal, though not fixed, sampling rate of 11.2 MHz or above. The sampling rate is chosen in the analog to digital (A/D) conversion stage to maintain conversion limits at or above the physical and perceptual limits of human hearing as indicated in FIG. 12. While other existing standard or proprietary methods are able to be substituted for this in stage 6, such methods must be able to meet or exceed the noise, dynamics and other limits supported in stage 1-4 and optimized via stage 5. Standard Pulse Code Modulation (PCM)-based methods are not capable of supporting this level of audio performance and associated requirements, due to phase and aliasing anomalies and artifacts, anomalies and noise introduced via PCM functional requirements.

Stage 9 is an adaptive stage that serves to optimize for specific environments and usage. Stage 10 is designed to provide the highest available quality at the lowest possible bandwidth and file size as described herein. Stage 11 is a required stage for playback or storage of the unique audio in analog format. The last optional stage, stage 12, supports analog or digital storage in one or more of the four modes described herein.

The following are the core hardware and software components and requirements within the selected Direct Stream Digital (DSD) conversion: Decimation Filter: Sample rate conversion, optimally at a ratio of 16:1 or greater, such as from 11.2 MHz to a typical range of higher-end PCM bandwidths; Quantization: To a higher bit depth of at least 16:1, from 1-bit samples to 16 bit or higher PCM samples, to support an increase in the dynamic range and allow for complex digital routing and signal processing; Resampling: Frame boundary aligned sample rates, reducing any previously audible jitter, and enabling digital math to be executed as required with support of solid frame boundary alignment and tracking; Normalization & Dithering: Options such as TPDF or other dither are able to be used for lower quantized sample depth PCM rates of 16 bits or less; and Encoding: the data into a fully compliant PCM, Digital eXtreme Definition (DXD) or other digitally editable format, capable of standard digital processing, such as equalization, delay, reverb, compression, or other processing commonly, although not always, implemented via plugin, firmware, or other code.

Preferably, the DSD data that constitutes the ground truth data in one embodiment of the present invention is not processed by any high pass filter or low pass filter (with the possible exception of only a DC offset filter), such that no data is lost during the preprocessing of the data and the otherwise-filtered portions of the source audio are still able to be used to train the audio restoration and enhancement system as described herein.

As shown in FIG. 20, stage 7 uses software or an embedded hardware or related approach to provide the jitter-corrected frame boundary and related alignment necessary to optimally support any possible data and associated sampling rate and related conversion to PCM as desired. A frame-integrator pulse function conversion using an adapted pulse function as described above supports a unique lossless PCM conversion in subsequent stages. This is necessitated because there is a difference between the natural integer multiples of PCM frequencies versus DSD, as well as to allow for clock cycle jitter that must be corrected for. This effectively mitigates the truncation or other irrecoverably discarded information that represents perceptually or otherwise audible detail (i.e., "lossy") decimation that are otherwise necessary and part of all current implementations.

As shown in FIG. 21, stage 8 defines the use of a Weiss or other DSD to PCM conversion function, with appropriate Triangular Probability Density Function (TPDF) or other dither pattern as most appropriate to the output and intended use as would generally be known by audio and music recording professionals. The purpose of this is to enable support for standards-based digital audio tools and methods, rather than having to introduce new, propriety or other non-standard approaches that potentially confound usage and adoption.

Figure 22:
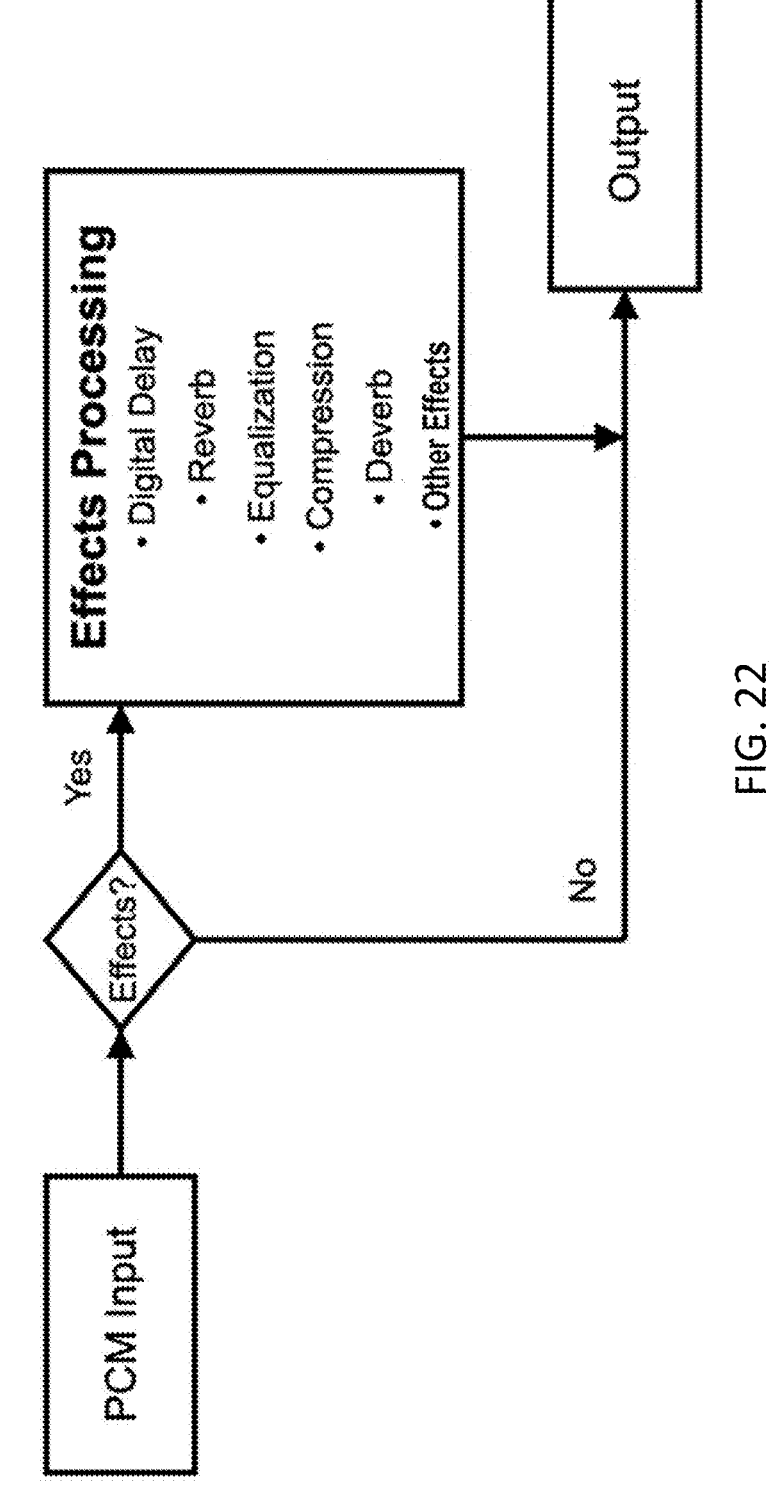
FIG. 22 is a schematic diagram of a digital effects processing stage of a pulse density modulation process according to one embodiment of the present invention.

As shown in FIG. 22, stage 9 is the first of four optional stages of the overall system shown in FIG. 13. Stage 9 uses software or its hardware-based equivalent for digital effects processing, such as digital delay, reverb, equalization, compression, deverb, or any other effects processing. The purpose of this is to provide for a user or other requirements of those using this type of system for typical music or related audio purposes.

Figure 23:
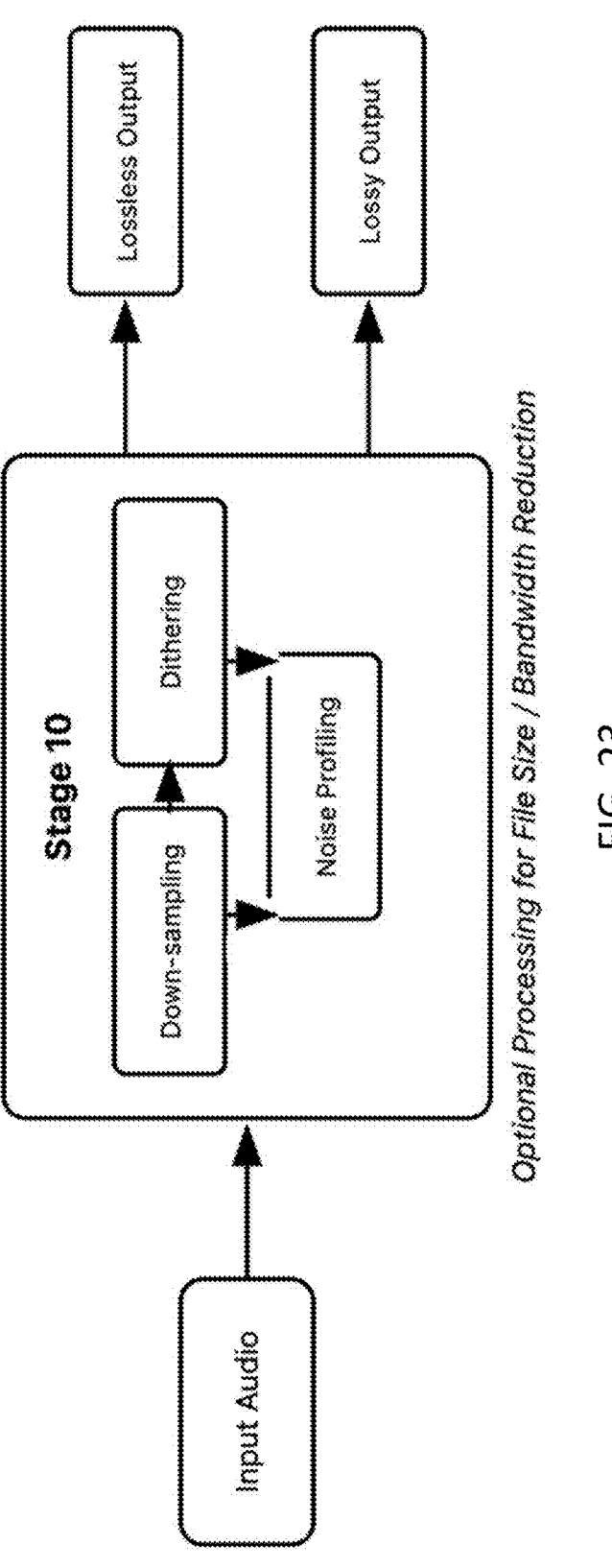
FIG. 23 is a schematic diagram of a file size and bandwidth reduction processing stage of a pulse density modulation process according to one embodiment of the present invention.

As shown in FIG. 23, stage 10 uses software or a hardware-based equivalent that provides optional support for down-sampling of any standard or other types of resampling often employed in music and other audio professions, along with any associated dithering or requisite noise profiling desired. This is useful to reduce the requisite file sizes and associated bandwidth, while minimizing any audible artifacts. While the core nature of this system supports true perceptually lossless audio, it also enables support for "lossy" (i.e., non-full spectrum and otherwise reduced audible detail based) implementation. However, even in lossy use cases, the perceptually and otherwise relevant characteristics provides distinct, audible enhancement and associated fidelity compared to other approaches, meaning there is more perceptually and otherwise relevant audible information provided by the system, even after lossy or lossless compression, than any existing prior art system.

Figure 24:
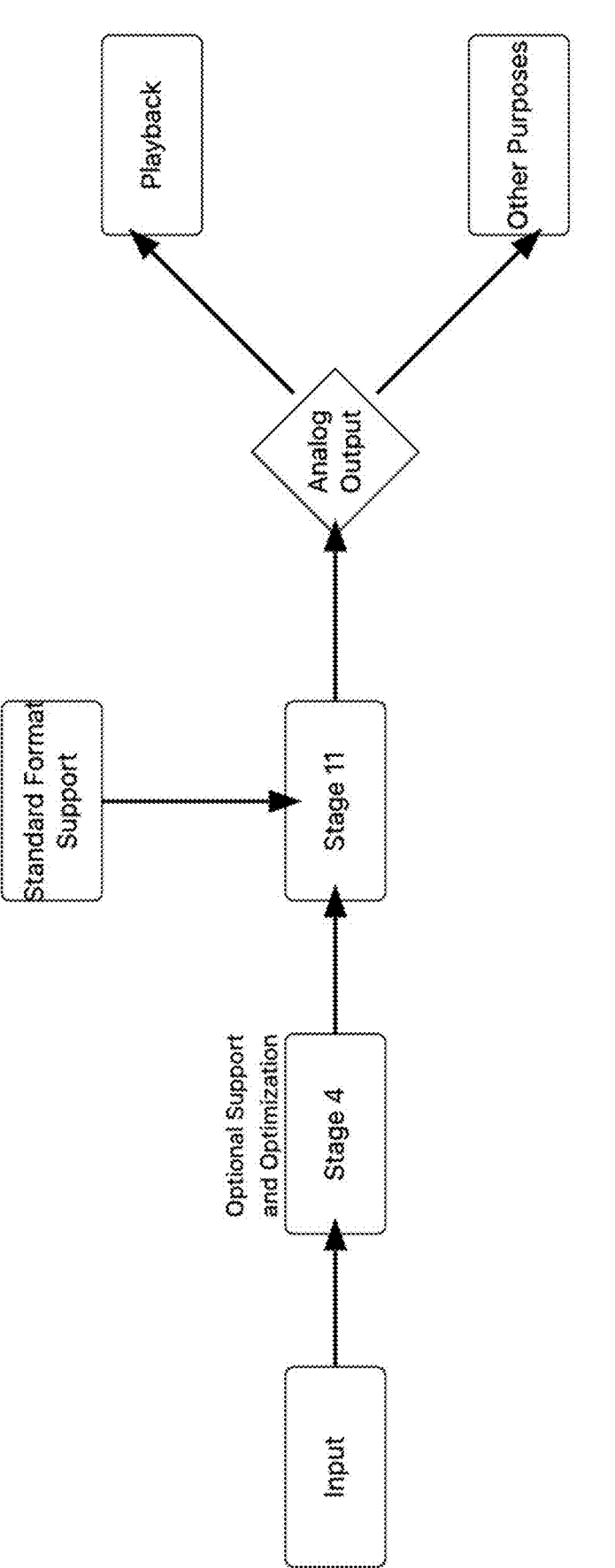
FIG. 24 is a schematic diagram of a digital-to-analog conversion stage of a pulse density modulation process according to one embodiment of the present invention.

As shown in FIG. 24, stage 11 provides optional support for analog output for playback or other purpose. Any standard format is supported, and support of stage 4 is able to be combined to facilitate and otherwise optimize for this stage.

Figure 25:
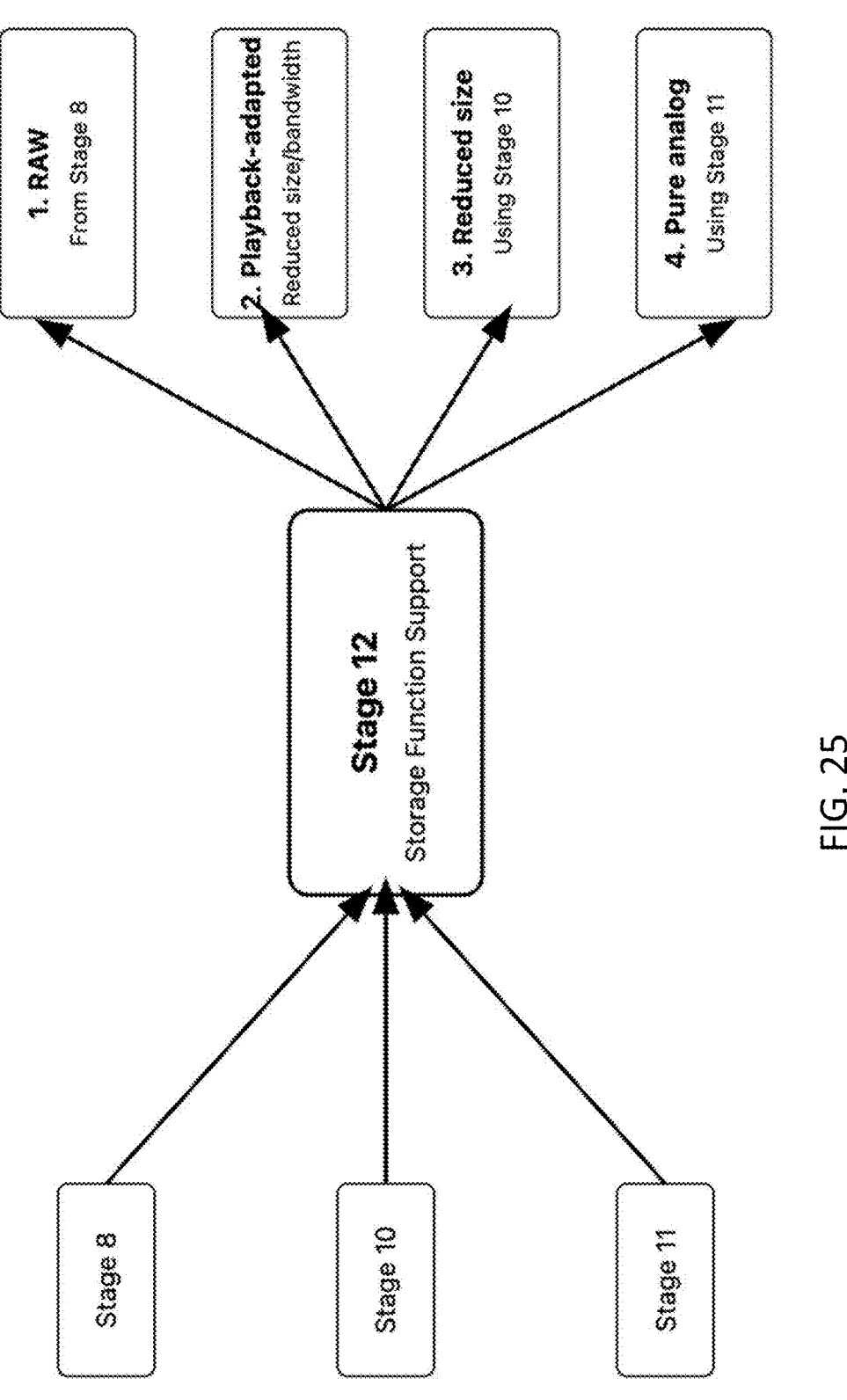
FIG. 25 is a schematic diagram of a storage function support stage of a pulse density modulation process according to one embodiment of the present invention.

As shown in FIG. 25, stage 12 provides storage function support for any of the following 4 types of storage: 1. Raw, directly from stage 8 with none of the processing of stages 9-11 employed; 2. Playback-adapted storage, employing reduced size and bandwidth requirements; 3. Reduced size storage, using stage 10 processing as defined herein; and 4. Pure analog storage, employing stage 11 analog output conversion.

As defined herein, the system employs an advanced hardware-enabled capture approach, together with uniquely integrated and configured audio capture hardware and software that drives the conversion sequence and supporting algorithms as described herein. Further, leveraging differential AI enabled analysis, the system integrates the results of Brain Computer Interface (BCI) or other comparably sourced data to optimize for actual perception and related results in those areas as noted. The result is a new and unique process to capture/record, represent, convert, and store sound to and from a digital or analog source or medium, which dramatically reduces size, bandwidth, and related overhead at any level of perceived audio quality. Analog components are selected and configured in a manner designed to avoid any need for low pass filtering and noise profiling within the boundaries of human hearing.

Together with the AI-assisted approach described herein, the system avoids all aliasing and phase skew back into the perceptual and physiological ranges of human hearing. The result of this is the first acoustically lossless inventive method to capture, store and transfer audible information for human hearing. The resulting capabilities go beyond simply improving sound to effectively match the limits of human hearing and perception. The audio output of the system is also able to be used to provide a reference audio standard for training AI via, among other things, providing a universal reference standard, or ground truth.

The audio processing techniques described herein are able to be used for a variety of purposes for improving the field of the art, including but not limited to those described below:

Fidelity Enhancement:

The AI-driven fidelity enhancement capabilities of the present invention represent a large improvement in audio quality enhancement not possible in prior art systems and methods owing to the use of the unique generative AI and training of the present invention. By leveraging advanced machine learning algorithms and training approaches, the system is able to analyze audio content across multiple dimensions (e.g., frequency spectrum, temporal characteristics, and spatial attributes) to identify and correct imperfections that detract from the original artistic intent as defined by actual ground truth perfection.

The system employs a unique neural network trained on vast custom datasets of ultra-high through low quality audio, allowing the system to recognize and rectify issues, such as frequency issues, phase anomalies, and various types of modulation, aliasing and other distortion types, resulting in a dramatically clearer, more detailed, and more engaging listening experience across all types of audio content.

For music and sound in a range of applications, the system therefore brings out the nuances of instruments and vocals that are generally masked in the original recording. For speech, it ensures every word is crisp and intelligible, even in challenging acoustic environments. The end result is audio that approaches the previously unobtainable ground truth (i.e., a perfect representation of the sound as it was intended to be heard).

Bandwidth Optimization:

The bandwidth optimization technology of the present invention represents a significant improvement for streaming services, and content delivery networks. By employing a unique set of AI training and optimization methods, the system is able to intelligently analyze and adapt audio content to make optimal use of available bandwidth without compromising on lossless files standards, or perceptually defined quality.

The system works by identifying all perceptually and audibly relevant information in the audio signal and prioritizing its optimization based on transmission and data rate constraints. The significant amount of noise, compression artifacts, and aliasing related masking elements that often account for 50% or more of the size of many recordings are eliminated. The actual information is intelligently compressed and recast into the desired standard format using the advanced AI models of the present invention, allowing for significant reductions in data usage—generally up to 50% or more—while maintaining, and in many cases improving, the perceived audio quality.

Unlike present compression means, the lossless audio produced by the present invention stays not only lossless, but is also able to remain in the same standard lossless formats, with the same being true with lossy formats like MP3 and others. This avoids the need to distribute new types of players, encoder/decoders and other technologies, enabling immediate usability and global deployment. Moreover, the system is able to adapt in real-time to changing network conditions, ensuring a consistent, high-quality listening experience even in challenging connectivity scenarios. This not only enhances user satisfaction but also reduces infrastructure costs for service providers.

Imaging Correction:

Imaging correction capabilities of the system of the present invention improves the spatial perception of audio, particularly for stereo and multi-channel content. Using advanced AI algorithms, the system is able to identify and correct issues in the stereo field or surround sound image, resulting in a more immersive and realistic audio experience.

The system analyzes the phase relationships between channels, corrects phase and intermodulation anomalies, and perfects the separation and placement of audio elements within the soundstage based on ground truth training and related definitions, resulting in a wider, deeper, and more precisely defined spatial image and associated sound stage, bringing new life to everything from classic stereo recordings to modern surround sound mixes. Unlike prior approaches, this works with both traditional speakers as well as headphones and in-ear monitors.

For stereo content, this means a more expansive and engaging soundstage, with instruments and vocals precisely placed and clearly separated. In surround sound applications, it ensures that each channel contributes accurately to the overall immersive experience, enhancing the sense of being "there" in the acoustic space.

Noise Reduction:

The AI-powered noise reduction capabilities of the present invention provide a notable improvement in audio cleanup and restoration. Unlike traditional noise reduction methods that often introduce artifacts or affect the quality of the desired signal, the system of the present invention uses advanced machine learning to intelligently separate noise from the primary audio content.

The AI model is trained on a vast array of noise types—from compression and digital encoding artifacts and background hum, to intermittent types of spurious noise, allowing the system to identify and remove these unwanted elements with unprecedented accuracy. Additionally, the system is able to adapt to novel noise profiles in real-time, making it effective even in unpredictable acoustic environments.

The result is clean, clear audio that preserves all the details and dynamics of the original signal. This technology is particularly valuable in applications ranging from audio restoration of historical recordings to real-time noise cancellation in telecommunication systems and hearing aids.

Dynamic Range Optimization:

The dynamic range optimization capabilities of the present invention represent a paradigm shift in audio dynamics. Using sophisticated AI algorithms, the system analyzes the dynamic structure of audio content and intelligently adjusts it to suit different playback scenarios and devices based on a range of ground truth examples beyond current recording methods and approach, all while preserving the original artistic intent.

The system goes beyond simple compression or expansion by understanding the contextual importance of dynamic changes, preserving impactful transients and dramatic silences where such elements are crucial to the content, while subtly adjusting less critical variations to ensure clarity across different listening environments.

This intelligent approach ensures that audio remains impactful on high-end audio systems, while still being fully enjoyable on mobile devices or in noisy environments, which is particularly valuable for broadcast applications, streaming services, and in-car audio systems, where maintaining audio quality across a wide range of listening conditions is crucial.

Spectral Balance Correction:

The spectral balance correction capabilities of the system of the present invention utilize the AI to achieve ground truth-perfected tonal balance in any form of audio content. By analyzing the frequency content of audio in relation to vast databases of beyond master-quality references, the system identifies and corrects spectral imbalances that detract from the natural and pleasing quality of the sound.

The AI does not simply apply broad, one-size-fits-all equalization. Instead, the system understands the spectral relationships within the audio, preserving the unique character of instruments and voices while correcting problematic resonances, harshness, or dullness, resulting in audio that sounds natural and balanced across all playback systems. The system is therefore invaluable in mastering applications, broadcast environments, and consumer devices, ensuring that audio always sounds its best, regardless of the original production quality or the playback system.

Transient Enhancement:

The transient enhancement capabilities of the present invention provide a higher level of clarity and impact to audio content. Leveraging advanced AI algorithms, the system identifies and enhances transient audio events (i.e., split-second bursts of sound that characterize percussive elements like the attack of a drum hit or the pluck of a guitar string). Furthermore, by using an extensive amount of custom-created ground truth examples in training, the system is able to define and restore the sonic character based on frequency vs. phase over time and related partial harmonics relationships, resulting in a ground truth defined level of temporally accurate transient accuracy.

By intelligently optimizing these transients without negatively affecting the underlying sustained sounds by disregarding their temporal context, the system is able to dramatically improve the perceived clarity and definition of the audio. This process does not only make the input audio louder, but also helps to reveal the subtle details that make the audio sound physically present.

The system is particularly effective in music production, live sound reinforcement, and audio post-production for film and TV, as it is able to provide additional character to flat or dull recordings, enhance the impact of sound effects, and ensure that every nuance of a performance is clearly audible.

Mono to Stereo Conversion:

The mono to stereo conversion capabilities of the system of the present invention provide an improvement beyond traditional up-mixing techniques, which is impossible prior to the AI-enabled system and technique of the present invention. Using advanced AI models trained on vast libraries of ground truth defined stereo content and other related custom audio data, the system is able to transform mono recordings into real, spatially accurate stereo soundscapes.

The system analyzes the spectral and temporal characteristics of the mono signal to intelligently reconstruct audio elements across the dimensional stereo field. This process does not add artificial reverb or delay, rather creating a ground truth-defined, real-sounding stereo imaging that respects the original character of the audio while restoring innate width, depth, and immersion that was collapsed in mono source material. The system therefore has particular use in remastering historical recordings, enhancing mono content for modern stereo playback systems, and improving the listener experience for any mono source material, with the results often rivalling true stereo recordings in their spatial quality and realism.

Stereo to Surround Sound Up-Mixing:

The stereo to surround sound up-mixing capabilities of the present invention take two-channel audio to new dimensional levels or realism and presence. Powered by advanced AI algorithms, the system analyzes stereo content and intelligently distributes it across multiple channels to create a uniquely accurate immersive surround sound experience.

Unlike traditional up-mixing methods that typically result in artificial, phase-incoherent surround fields, the AI-enabled system understands the spatial cues inherent in the stereo mix. The system is able to identify individual elements within the mix and localize and distribute them naturally in the surround field based on ground truth training examples, creating a sense of envelopment that respects the original stereo image, and expanding it into three-dimensional space.

The system has particular use for home theater systems, broadcasting, and remastering applications, allowing vast libraries of stereo content to be experienced in rich, immersive surround sound, dramatically enhancing the listening experience without requiring access to original multi-track recordings.

Legacy Format to Immersive Audio Conversion:

The legacy format to immersive audio conversion capability of the system of the present invention bridges the gap between traditional audio formats and cutting-edge immersive audio experiences. Using state-of-the-art AI training and physics informed and optimized approaches, the system transforms content from any legacy format (e.g., mono, stereo, or traditional surround) into fully immersive audio experiences compatible with formats such as DOLBY ATMOS, SONY 360 REALITY AUDIO, as well as other current and future standards.

The AI does not only distribute audio to more channels, but rather understands the spatial relationships within the original audio and extrapolates them to create a ground truth accurate, phase and frequency-coherent three-dimensional soundscape. Individual elements within the mix are able to be identified and placed as discrete objects in 3D space, allowing for a level of immersion previously impossible with legacy content.

The system provides for additional opportunities for content owners, allowing entire back catalogs to be remastered for immersive audio playback using fully AI-automated generative transforms trained on custom-created ground truth libraries. This also provides a benefit in broadcast and streaming applications, enabling the delivery of immersive audio experiences even when only legacy format masters are available.

Adaptive Format Transcoding:

The adaptive format transcoding capability of the system represents the cutting edge of audio format conversion. Powered by sophisticated AI algorithms and unique ground truth reference constraints, the system dynamically converts audio between various formats and standards, optimizing the output based on the target playback system and environmental conditions.

The AI-based system does not merely perform a straight conversion, but also understands the strengths and limitations of each format and adapts the audio and associated requirements accordingly. For instance, when converting from a high-channel-count format to one with fewer channels, the system intelligently down-mixes in a way that preserves spatial cues and maintains the overall balance of the mix, considering phase vs frequency and the interplay of the format with those and related constraints.

Moreover, the system is able to be set to adapt in real-time to changing playback conditions. In a smart home environment, for example, the system is able to seamlessly adjust the audio format as a listener moves between rooms with different speaker setups. This ensures the best possible listening experience across all devices and environments.

Dialogue Intelligibility Enhancement:

The dialogue intelligibility enhancement capability of the system addresses one of the most common complaints in modern audio content, namely unclear or hard-to-hear dialogue. Using advanced AI models trained on vast datasets of clear speech, the system is able to identify and enhance dialogue within complex audio mixes without affecting other elements of the soundtrack.

The system goes beyond simple frequency boosting or compression and understands the characteristics of human speech and perceptual hearing factors and limitations, and separates it from background music, sound effects, and ambient noise. The system then enhances the clarity and prominence of the dialogue in a way that sounds natural and preserves the overall balance of the mix.

The system provides a benefit in broadcast, streaming, and home theater applications. It ensures that dialogue is always clear and intelligible, regardless of the viewing environment or playback system, dramatically enhancing the viewer experience for all types of content.

Audio Restoration:

The audio restoration capabilities of the system of the present invention represent an improvement in the ability to recover and enhance degraded audio recordings. Leveraging powerful AI algorithms, ground truth data, and associated training methods, the system is able to analyze damaged or low-quality audio and reconstruct it to a level of quality that often surpasses the original recording, while maintaining frequency vs phase, format-specific and other key constraints while doing so. Without this unique set of AI capabilities that govern the process, a significant amount of articulation and realism previously had to be sacrificed. Similarly, the ground truth reference sources that are trained on enable a level of perfect standards reference that did not exist before, and therefore were not able to be applied as restoration and optimization constraints to any process.

The system is trained on a vast array of audio imperfections—from the wow and flutter of old tape recordings to a range of digital artifacts in CDs and other digital audio formats. This is able to identify hundreds of primary, secondary, and other issues, and not only remove them but also reconstruct the sample level and temporally defined audio that should have been there, thereby going far beyond traditional noise reduction or editing techniques.

The system is therefore particularly valuable for archivists, music labels, and anyone dealing with historical audio content and is able to breathe new life into recordings that were previously considered beyond repair, preserving audio heritage for future generations.

Personalized Audio Optimization:

The personalized audio optimization capabilities of the system of the present invention bring a new level of customization to the listening experience. Using generative and related machine learning approaches, coupled with unique ground truth training and reference data sets defined within the requirements of human hearing and perception using a broad frequency range, the system is able to analyze a listener's preferences, hearing capabilities, and even current environment to dynamically adjust audio content for optimal delivery.

The system is able to produce a personalized hearing profile for each user, understanding their frequency, phase and related sensitivities and limitations, dynamic range profile and preferences, and includes subjective tastes in aspects such as frequency accentuation/amelioration, timbral characteristics, and imaging vs soundstage characteristics. It is then able to apply these constraints to any audio content in real-time, ensuring that everything sounds its best for that specific listener.

Moreover, the AI is able to adapt to changing conditions. If the listener moves from a quiet room to a noisy environment, or a room with a different damping profile for instance, the system automatically adjusts to maintain intelligibility and enjoyment based on the listening device and criteria. The system has applications ranging from personal audio devices to car sound systems and home theaters, ensuring the first ground truth defined listening across virtually any situation.

Acoustic Environment Compensation:

The acoustic environment compensation capability of the system of the present invention brings studio-quality sound to any listening environment. Using advanced AI algorithms and custom ground truth defined training and reference/constraint data, the system analyzes the acoustic characteristics of a space in the context of a massive set of interrelated constraints that were impossible to consider prior to these AI enabled methods, and apply real-time corrections to the audio signal, effectively neutralizing the negative impacts of the room.

The system goes beyond traditional room correction systems by, first, not just adjusting frequency response, but also understanding complex room interactions, early reflections, and resonances, partial harmonics vs. listener perception interactions and preferences, and applying corrections that make the room 'disappear' acoustically as much as desired. The result is a listening experience that is as close to the original studio mix as possible, or even leverages ground truth references to go beyond that level of perfected sound, regardless of the actual physical space. Further, most systems employ frequency equalization as a primary goal. In contrast, the present system addresses inter-related factors such as frequency vs. phase, and perception vs. playback device nonlinearities, while ensuring intonation, partial harmonics and other key elements are maintained or recovered based on ground truth.

The system has applications ranging from home audio and home theaters to professional studio environments and ensures consistent, high-quality audio playback across different rooms and spaces, which is particularly valuable for professionals who need to work in various environments. Future Format Adaptation:

The future format adaptation capabilities of the system of the present invention allow for future-proofing audio content and systems. Using highly flexible AI models, the system is able to learn and adapt to new audio formats and standards as they emerge, ensuring that today's content and hardware investments remain viable well into the future.

As new audio formats are developed, the system is able to be quickly trained to understand and work with these formats without requiring a complete overhaul, meaning that content created or processed with the system today is easily able to be adapted for the playback systems of tomorrow. Because the heavy lifting is done prior to playback, the approach enables existing and future playback hardware and related devices to continue to function. No special playback hardware, software or related decoding elements are required. However, rather than being locked-into a given hardware set, playback chain, or formats/standards, this approach is able to address the strengths, capabilities and weaknesses of new formats and related options using the same AI architecture.

For content creators and distributors, this means their archives remain perpetually relevant. For hardware manufacturers, it offers the potential for devices that are able to be updated to support new formats long after purchase.

The current technology of utilizing graphics processing units (GPUs) for AI spends 99% of the energy on training utilizing fully connected hidden layers. However, this process is both wasteful and does not accurately mimic the way physical brains process information.

The present invention changes the system of hidden layers to utilizing partial differential equations (PDEs) as a sort of pre-pre-training for the system, which helps in mimicking the nonlinearity seen in physical white matter and grey matter, thereby more effectively mimicking biological systems. The majority of the mapping in this case is from inputs to outputs with correlated mappings defined. The system utilizes PDEs that are both nonlinear and bounded to prevent chaotic dynamics, with boundary conditions keeping the model in localized trajectories and pilot functions used for initial training. The pilot function utilized by the present invention allows the system to ensure that it references the mapping equations, with the pilot function serving as the primary foundation for the system.

The use of nonlinearities for activation functions in the present invention provides for increased efficiency when combined with linear functions. The system does not require the use of washing or backpropagation to tweak weights and biases, which is a highly inefficient process. Limited pre-pre-training is utilized to create texture within the system, edges, contours, and to create nonlinear complexity. A pattern emerges over time from input to output with the texture held constant. In this way, the present system does not require training of hidden layers and instead uses mapping function relationships to avoid propagation of the weights and biases and deal with the volume of modifications.

The system of the present invention is advantageous over prior art systems in various manners. For example, the present invention demonstrates a high degree of adaptability, as the neuromorphic field is able to form complex patterns in response to different inputs or input types. This also allows for high versatility of the system, as the system design allowed it to be applied to various different domains, from robotics and IoT devices to complex industrial systems, without significant changes in the architecture of the system. The system also exhibits a high degree of fault Tolerance, as the distributed nature of the neuromorphic field helps the system remain operational even if parts of it fail or are compromised, ensuring high reliability. The ability of the system to process and filter out noisy data further contributes to the robustness of the system, especially in environments where sensor data is imperfect or incomplete.

The system is naturally equipped to handle time-dependent data, which enables a continuous representation that allows for infinite-dimensional Artificial Cognitive Nodes (ACNs). The continuous nature of the ACN makes the system scalable, and capable of handling large amounts of data, which means that, as the complexity of tasks increases, the system scales the neuromorphic field to accommodate more data points and interactions without a significant drop in performance. The ability of the neuromorphic field to evolve based on incoming data allows the system to continuously improve its performance without the need for frequent manual updates. The system of the present invention is able to learn and utilize spatial relationships in data, and offer context-aware processing, which enhances and evolves predictive analytic capabilities.

The PDE used in the present invention encapsulates complex dynamics with relatively few parameters to process complex inputs in a distributed and efficient manner, while the PDE Solver enables continuous evolution of the field, allowing the system to adapt to changing inputs without requiring extensive retraining, and while avoiding the need to train hidden layers. Thus, the PDE-based system allows for fine-grained control over the system's behavior, leading to more accurate and reliable outputs.

An additional advantage to the present invention includes the ability to adapt to more specialized applications, including embodiments based on doped-photonic and hybrid photonic components that allow the system to process a wider range of inputs, including light-based signals, and operate at higher processing and power efficiencies, enhancing versatility, and providing a better input match for biological, analog and related systems for high-precision, real-time diagnostics. The system also has the potential for even greater interpretability through the integration of Physics Informed Neural Network (PINNs) input and related support.

Neuromorphic Field

A neuromorphic field, as defined herein, is a continuous tensor-definable field able to be implemented using current means, as interconnected Artificial Cognitive Nodes' activity in a continuous space represented by a field of partial differential equations (PDEs). The neuromorphic field, or dynamic grid, is designed to emulate the interconnectedness and adaptability found in natural systems where information is distributed and evolves over time, and supports both traditional discrete ANNs as well as continuous signal propagation and data representations.

ACNs interact with each other based on their inputs and both statically defined and dynamically sequenced states. These ACNs behave as a high-dimensional, continuously propagating dynamic system, where each node is governed by PDEs that represent and simulate the spatiotemporal dynamics of complex inputs (e.g., continuous analog, time sequenced biologically-driven, and/or digitally defined signals), thereby supporting a range of discrete statically, as well as dynamically, defined input types.

One goal of the system is to achieve a level of efficiency, dynamism and adaptability akin to biological systems, for the purpose of proactively adapting and optimizing sets of data within changing conditions and parameters to push the capabilities of artificial systems, by allowing the architecture to replace the explicit need for deep network training with a system supporting fully differentiable, bounded field propagation. Therefore, the present invention, in utilizing the neuromorphic field aims to improve current paradigms of predictive analytics, behavioral modeling, enriched contextual and spatial awareness, adaptive real-time responses, response optimization, enhanced operational capacities.

The neuromorphic field in this system is a complex, deterministic subsystem that remains unchanged throughout the training and operation of the network, which is a continuous, deterministically-bounded function over a spatial domain (Subfield; Resonant ACNs) and time. The neuromorphic field is able to be conceptualized as a vast, multidimensional field of interconnected ACNs, governed by a set of partial differential equations (PDEs) that define their behavior, interactions, and external influences.

The neuromorphic field is described by a system of reaction-diffusion PDEs, such with respect to equation 1 below, where $u_i(x, t)$ is the activation of neuron type i at position x and time t, $D_i$ is the diffusion coefficient for neuron type i, $f_i$ is a nonlinear function representing the interactions between neurons, and n is the number of different neuron types in the neuromorphic field.

$$\partial u_i / \partial t = D_i \nabla^2 u_i + f_i(u_1, \ldots, u_n, x, t) \qquad \text{(Equation 1)}$$

The neuromorphic field includes multiple types of Artificial Cognitive Nodes. While the field is continuous, it exhibits localized regions of activity analogous to "Subfields," which contain clustered resonant "nodes" that interact through spatial coupling terms in the governing PDEs. Each node has its own characteristics.

For example, excitatory nodes tend to increase the activation of neighboring nodes. Excitatory nodes are responsible for propagating electrical signals to other nodes, which increases likelihood of the subsequent and neighboring nodes being activated, which overall represents and promotes action potential. The activation of nodes and propagation of signals across the network facilitates forward transmission or information and activation patterns.

Inhibitory nodes tend to decrease the activation of neighboring nodes. Inhibitory nodes serve to control and refine signaling, which helps to prevent overexcitation and helps to maintain neural circuit stability by reducing activity of non-relevant nodes. This is helpful for feedback mechanisms, which prevent runaway reactions, ensure noise resistance, and support system stability.

Modulatory nodes, or dimensional weights, influence the strength and effectiveness of electrical signal transmission. Modulatory nodes help to adjust the overall responsiveness of nodal circuit activity to inputs, and helps to simulate learning or other adaptation mechanisms by adjusting the strength of connections based on reinforcement signals received. This mimics long-term potentiation, modulating responses to inputs over longer timescales. Modulatory nodes interact through various mechanisms such as local interactions (i.e., nodes that influence immediate neighbors), learning (i.e., strength of connection based on correlation of pre- and post-nodal activation or deactivation), long-range connections (i.e., nodes influencing distant parts of the neuromorphic field), and electrical diffusion (i.e., neurotransmitter-like function of electrical signals that diffuse through the neuromorphic field, influencing node behavior). Analogies for the functioning of modulatory nodes include those grounded in photonics, such as "light that flows together, grows together" or general signals, such as "signals that sync together, link together."

Other types of nodes include oscillatory nodes, which exhibit periodic behavior, creating rhythmic patterns in the neuromorphic field, and adaptive nodes, which change behavior based on the recent history of their activation.

The neuromorphic field has specific boundary conditions that define its behavior at the edges. These boundary conditions are able to include periodic boundaries, where the neuromorphic field wraps around, creating a toroidal topology, reflective boundaries, where node activations are reflected at the edges, absorbing boundaries, where node activations decay at the edges, Robin boundaries, which are influenced by both the state of the neuromorphic field and its rate of change and which allows for a controlled interaction with the environment factoring into how the system interfaces with its surroundings, and, finally, mixed boundaries, applying different types of boundary conditions at different parts of the boundary or for different variables or equations within a multi-field or multi-modal system.

In one embodiment, the neuromorphic field is pretrained with a carefully well-defined pattern of activation that ensures rich dynamics, allowing the neuromorphic field to exhibit complex, deterministic, non-chaotic behavior. The field also demonstrates stability such that the overall activity of the neuromorphic field remains bounded. The field also exhibits sensitivity, allowing small perturbations to lead to significant, but deterministic changes. The pretraining also provides for quick convergence, where the system reaches optimal performance more quickly, reducing the time and resources spent during the training phase, while both avoiding local minima (preventing the system from getting stuck in suboptimal local minima) and preventing divergence (preventing the system from exhibiting runaway behaviors where errors or activations escalate uncontrollably).

The behavior of the neuromorphic field is able to be analogized to ripples on a water surface, where information propagates as waves, interacts, and creates complex patterns, providing an intuitive understanding of the system's dynamics. To provide an analogy to help clarify the purpose of the neuromorphic field, it is metaphorically analogous on some level to propagating signals within a musical instrument, such as a drum, guitar, or violin or other instrument. When an input is introduced like one or more strings are plucked, it creates a complex pattern of energetic activations (signals or "signatures") that propagate through the neuromorphic field. These signatures interact with each other and the underlying dynamics of the neuromorphic field, creating a rich, time-varying pattern of activity.

For systems using light signals, the analogy is literal, as the photonic signals involve the propagation of light waves, which are able to be directed, reflected, and modulated within the system, much like water waves are reflected off barriers or pass through different mediums.

Input Layer

The input layer of the neural network included in the present invention is responsible for capturing and processing the incoming electrical signals, bio-signatures, photonic data, and other multi-modal types (enabling multi-modal processing and the integration of diverse input sources), then maps these signals into a format compatible with the neuromorphic field as described above, ensuring that the data is effectively processed by the PDE-based system. The input layer converts discrete and time-sampled input data selectively into continuous and/or discrete signals based on the pilot function, as described below, and injects these signals into the neuromorphic field. The signals are then able to be transformed into time vs. frequency-based inputs to be used as input to output mapped across the neuromorphic field.

Input-to-Output Mapping Function

The input-to-output mapping function is the core component of the system that exhibits learning. The mapping function takes the input signals and the sampled outputs from the neuromorphic field to produce the final output of the network.

In order to process the inputs, the mapping function is able to perform various tasks including input encoding, which converts raw input data into a format suitable for the neuromorphic field, spatial mapping, which determines how inputs are spatially distributed across the input nodes, enhancing data quality, which reduces noise especially with precision applications, temporal encoding for time series-data and encoding temporal aspects of the input, real-time data handling, input scaling, which normalizes input values to match the operating range of the neuromorphic field, and source integration, allowing data to come from a variety of sources such as sensors, digital feeds, user inputs, or databases. Integrating these diverse data streams in a cohesive manner is essential.

The mapping function induces such interactions with the neuromorphic field as input injection (i.e., applying the encoded input to the appropriate locations in the neuromorphic field) with multi-modal signal integration in case multiple inputs affect the field simultaneously, PDE solving (i.e., running the PDE Solver for a specified time interval) with the field evolving according to its governing PDEs and processing input information through the dynamics of the field, state sampling (i.e., sampling the state of the neuromorphic field at predetermined locations and times), learning and adaptive responses, where feedback from the output and the real-world effects of the system's actions are used to fine-tune the field's response to similar future inputs, enhancing the system's learning and adaptation capabilities, signal propagation (i.e., inputs causing signals to propagate throughout the field, like waves spreading across a surface), diffusion mechanisms (i.e., to help in spreading the influence of inputs across a wider area, optimizing effectiveness of tasks that require a global perspective from local inputs), and nodal synchronization across different parts of the field, leading to coherent behaviors in response to inputs, mimicking how biological brains achieve functional synchronization between distant regions.

The mapping function utilizes feature extraction to process the sampled states to extract relevant features and functional mapping of the high-dimensional data from the field to a lower-dimensional output space that accurately reflects the results of computations, as well as increases fidelity of relevance to the task at hand. The mapping function is able to take advantage of temporal integration to combine samples from different time points.

Processes such as dimensionality reduction, nonlinear transformation, data synthesis (e.g., summarizing data trends and anomalies into a diagnostic report), and output scaling further assist in the mapping function generating output based on the input data. These techniques are able to be optimized for speed, with techniques streamlining the data pipeline, optimizing algorithms for speed, and/or utilizing hardware acceleration to enhance real-time responsiveness.

The mapping function can be represented according to equation 2 below, where x is the input, P(x) is the result of applying x to the neuromorphic field, S is the sampling function, and M is the learnable mapping function, and where M is able to be implemented as a neural network, a polynomial function, or any other suitable approximator.

$$y = M(x, S(P(x)))$$ (Equation 2)

In order to train the mapping function, in a forward pass, an input is applied to the neuromorphic field, the neuromorphic field state is sampled, and the output is computed using the current mapping function. Differences between the produced output and the desired output are then calculated. Backpropagation is used, wherein gradients of the loss are computed with respect to the parameters of the mapping function, and then optimization techniques (e.g., Adam, RMSprop, etc.) are used to minimize the loss function. These optimization techniques update parameters of the mapping function and adjust weights and biases in the model to minimize error. This training process is able to iterate for a plurality of epochs over an entire training dataset.

Advantages

The mapping function of the present invention allows for several advantages of the present invention. First, it provides for separation of concerns, with complex dynamics handled by the fixed neuromorphic field, and learning focusing on the mapping function. The system also improves noise handling by using the neuromorphic field to filter out irrelevant or spurious data to focus on relevant patterns, and efficiency, with the neuromorphic field providing complex transformations.

The mapping function is more easily able to be interpreted independently of the neuromorphic field dynamics, allowing for improved transparency and is more adaptable to new tasks, as only the mapping function needs to be retrained, as opposed to the neuromorphic field. The mapping function is able to continuously learn and improve over time based on new data and experiences, without needing explicit reprogramming.

Additionally, the system provides for improved modeling and predicting future states based on historical data is enhanced by the system's dynamic learning and adaptability, useful in predictive maintenance, and other predictive analytics applications.

This enhanced system leverages the complex, deterministic dynamics of the neuromorphic field to create a rich representation of the input, while concentrating all learning in the input-to-output mapping function. This approach combines the power of PDEs for creating complex transformations with the flexibility and trainability of traditional machine learning models.

Further, entirely new functionality and modes of operation is able to be deployed, enabled, upgraded on the fly by switching between different mapping functions, which are leveraged via enabling different Pilot functions as defined herein, or other such means.

Output Layer

The output layer of the neural network of the present invention serves as the interface between the processed data within the system and the external environment where this data is utilized. The output layer is responsible for converting the mapping function logits of the inputs across the neuromorphic field into accessible, practical, understandable, useful, and actionable outputs as needed for a given training, inference and related purposes. The output layer translates complex neural computations into intelligence and insight for taking autonomous actions based on input to output mapping of the PDE driven computations. The output layer also includes feedback mechanisms where the outputs are used to refine and retrain the system such that there it supports Pilot function enabled modes as described herein.

The present invention is able to sample the input to output mapping across the neuromorphic field at specific points in time vs frequency to produce the output. Insights are able to be pooled together from relevant "subfields" (resonant signatures of ACNs) found within the neuromorphic field. For clarity, the neuromorphic field represents the dynamic system's continuous representation and ever-evolving interpretations of responses to inputs, so the data process is highly dimensional and interconnected. Therefore, the output layer works to synthesize this data into coherent subfields as a function of the inputs (relevant resonant ACNs) for discrete outputs. For example, in the application of diagnostic, preventative or prevision healthcare, the system is able to interpret the input to output mapping functions across the field of various physiological data streams to output comprehensive health status, precision diagnostics, or precision treatments in a highly energy and processing-efficient manner.

The output layer is further able to apply a transformation to match the desired output format and time-sampling function. This allows the neural network of the present invention to translate complex patterns of mapped nodal activity into digital signals, text, commands, or visual outputs, depending on the application. The transformation applied ensures compatibility and usability of the data produced by the input to output mapping across the neuromorphic field via correctly matching outputs to interface with other digital systems, databases, format or related requirements.

PDE Solver

The PDE Solver helps to compute the evolution of the neuromorphic field at any point in time, as well as over time as determined via the Pilot function. The accuracy and timeliness of the computations of the PDE Solver directly impact the effectiveness of the spatiotemporal dynamic insights of the subsystem, which is the result of evaluating interactions between the input and output over time. The PDE Solver does this by numerically solving the governing PDE of the neuromorphic field. In addition, the PDE Solver is responsible for defining the required multi-dimensional manifold mapping as a function of the inputs to the outputs. The PDE Solver updates the mapped input-output state of the neuromorphic field at discrete points in time, as well as providing function of time (F (t)) transform mapping.

Training Module

The training module of the present invention optimizes the system's input to output mapping parameters to improve performance on given tasks. The system of the present invention uses adapted Pilot Function-defined static and continuous fields and their representative PDEs, allowing the system to learn both the field dynamics and the input/output transformations, which enables the system to handle the complexities of training a system. To avoid introducing instability into the learning process, the system of the present invention employs well-defined regularization, scaled dot product attenuation, and gating structures to ensure stability of the fields mapping functions. The system optimizes the input-to-output mapping function based on machine learning methods as defined herein through one of many possible machine learning network configurations, and adjusts the PDE hyperparameters and sampling points based on the training. In one embodiment, hyperparameters are chosen for a given PDE-driven field based on pre-training such that the field presents a rich set of deterministic mapping of inputs to outputs.

Mathematical Formulation

The neuromorphic field is described by a reaction-diffusion PDE, as shown below as Equation 3, where u is a function representing the ACN activation and represents the state of the neuromorphic field at position x and time t, D is the diffusion coefficient and reflects signal propagation, speed, and interaction strength, $\nabla^2$ indicates spatial diffusion (meaning $D\nabla^2 u$ models the spread or dispersion of the state across a function of time), f is a nonlinear function representing ACN dynamics (representing local interactions and behavior of inputs-to-outputs vs. subfields), meaning f(u, x, t) nonlinear interactions with the neuromorphic field depending on the state, position, and time that later translates into actionable intelligence, and θ are learnable parameters:

$$\partial u/\partial t = D\nabla^2 u + f(u, x, t, \theta) \qquad \text{(Equation 3)}$$

By solving above equation, the system is able to account for time-dependent changes in the field, enabling real-time adaptation. Furthermore, Equation 3 helps to recognize complex patterns and simulate future scenarios.

Training Process

The training process for the neural network of the present invention begins by initializing the PDE parameters and sampling points randomly to optimize the field's responsiveness to new inputs. For each training example, the system converts the inputs to continuous signals, injects the signals into the neuromorphic field, solves the PDE for a fixed time interval, samples the neuromorphic field to produce one or more outputs, compares the one or more outputs with one or more desired results, computes the gradient of the loss with respect to PDE parameters and sampling points, and updates the parameters using an optimization algorithm (e.g., Adam, AdaGrad, etc.). This process is able to be repeated until convergence or for a fixed number of epochs, such that the training process is iterative and includes feedback mechanisms that ensure continuous improvement of the system's overall performance, while accounting for the continuous nature and evolution of the field.

Operational Process

The process employed by the system of the present invention begins with receiving input data and preprocessing the data to normalize and pipeline the data into the system. The input is then converted to continuous signals, which are injected into the neuromorphic field. The system solves the PDE (e.g., Equation 3 above) for a fixed time interval or until equilibrium achieved as appropriate to application. The neuromorphic field is then sampled at learned sampling points, and as defined by the Pilot Function, after which an output transformation is applied to produce a final result.

Addressing Challenges and Considerations

Solving PDE's numerically is often computationally intensive, but much less so than typical Deep Neural Networks and associated Fully Connected and related hidden layers. Ensuring numerical stability of the PDE solver is crucial, which is mitigated through the incorporation of well-defined regularization, scaled dot product attenuation, and gating structures as described herein. The dynamics of the neuromorphic field are sometimes difficult to interpret, represent, and visualize, which is why the present invention employs Pilot Function-defined input-output mapping functions rather than trying to explicitly solve for the PDE's comprising the Neuromorphic Field.

Potential Applications

The system of the present invention has application with regard to numerous different fields as well as having different applications with those fields. Examples of uses of the present invention include time series prediction, multi-scale analysis and forecasting of complex systems, music recommendation systems based on real-time user's mood, location, and activity, dynamic soundscapes, predictive health monitoring, personalized medicine, personalized learning paths, performance prediction, predictive maintenance, spatial-temporal data analysis, continuous control and planning in high-dimensional state spaces with application in robotics, interactive concert experiences that adjust lighting, sound, and visuals to adapt to environment responding to audience movement patterns or sonic/bio-signals (frequency and energy levels), patient movement and behavior analysis, epidemiological tracking, pollution tracking and climate change analysis, control systems for continuous processes, automated music production, robotic surgery, continuous glucose monitoring systems, market conditions and risk management, automated effort-grading learning system adjusting levels of exercises or lessons based on real-time performance data, static solutions, image classification, speech recognition, machine translation, sentiment analysis, handwriting recognition, anomaly detection, time series forecasting, recommendation systems, playing board games, facial recognition, natural language processing with context-dependent relationships, AI songwriting assistants, voice-activated music systems, customer behavior analysis, smart cities, patient interaction system, medical documentation automation, AI tutors, personalized assistants and adaptive learning platforms, language learning systems, computer vision tasks involving motion or temporal evolution, music video generation, live motion capture for performance taking real-time movements and synchronization with visual effects or music to increase engagement, advanced analysis and interpretation of multi-modal medical data, AI-powered diagnostics, rehabilitation monitoring, and/or other applications.

This system represents a novel approach to neural network design, leveraging the power of PDEs to create a flexible, adaptive architecture that bypasses the major training and inference inefficiencies of Deep Learning Neural Networks and their huge number of parameters that must be trained. In addition to providing three or more orders of magnitude of time, power and related efficiency gains, enabled by bypassing the majority of overhead inherent to DL/NN training, the system offers unique advantages in handling of discrete, continuous and spatial-temporal data.

Exemplary System

The subsystem includes a neuromorphic field evolving in space and time, coupled with input encoding and output decoding functions. This structure allows for processing of diverse data types within a unified continuous framework:

Consider a large, recurrent neural network that serves as a neuromorphic field of neurons as referenced herein. This network is designed to mimic the complex, non-linear behavior of a physical material. The neurons in this network are interconnected in a way that allows for rich, dynamic signal propagation as further described.

Multiple input sources introduce signals into this neuromorphic field. These inputs are able to be concurrent (activating different parts of the network simultaneously) or sequential (occurring in a specific order over time). Each input creates a unique pattern of activations that propagates through the network, interacting with existing patterns in complex, but deterministically defined, ways meaning that given the same set or sequence of input as a function of time, the same outputs will be defined based on bounded constraints as described.

At various points in the network, the network includes output nodes. These nodes sample the state of the network at specific times or over specific time intervals. The activations of these output nodes form raw output data. To interpret this raw output data and produce meaningful results, the system employs one or more mapping functions, which model different discrete or time-sequenced behaviors. These functions take as input both the original input signals and the sampled output data and then produce the final output of the system.

The mapping functions are the only trainable part of this system. They have adjustable hyperparameters that control how the functions interpret the relationship between inputs and outputs. In one embodiment, the hyperparameters include, for example, the complexity of the function, the time scale, and/or the weight given to different types of patterns in the network.

Finally, while the currently defined preferred embodiment is designed to support existing AI means of representing the system, such as software-enabled machine learning using traditional silicon-based computers, the nature of the system is both modularly and systematically defined such that it is also able to be implemented via other organic, photonic or other means that provide for the functional input, output and nonlinear and related subsystem propagation.

Let the state of the neuromorphic field be described by a vector function u(t)∈ $\mathbb{R}^N$, where N is the number of neurons in the field, t is a time constant, W∈ $\mathbb{R}^{N\times N}$ is the recurrent weight matrix, Win∈ $\mathbb{R}^{N\times M}$ is the input weight matrix, $g_i(t)\in \mathbb{R}$ is the i-th input signal, and b∈ $\mathbb{R}^N$ is a bias vector. The evolution of u is governed by a non-linear differential equation (Equation 4 shown below).

$$du/dt = -u/\tau + \tanh\left(Wu + Win\sum_i g_i(t) + b\right) \quad \text{(Equation 4)}$$

Each input i is represented by a time-dependent function $g_i(t)$. For a point input at time $t_i$, the function is able to be described as shown below in Equation 5, where $A_i$ is the amplitude of the input, and δ is the Dirac delta function.

$$g_i(t) = A_i\delta(t - t_i) \quad \text{(Equation 5)}$$

Similarly, the output is able to be represented by a time-dependent function. Let $\{y_j(t)\}_{j=1}^K$ be a set of K output nodes. Each node samples the neuromorphic field state as shown in equation 6 below, where $W_{out,j}\in \mathbb{R}^{1\times N}$ is the output weight vector for the $j^{th}$ output node, and $\eta_j(t)$ represents measurement noise.

$$y_j(t) = W_{out,j}u(t) + \eta_j(t) \quad \text{(Equation 6)}$$

The mapping function M in this embodiment takes as input the original input signals $\{g_i\}_{i=1}^M$ and the sampled outputs $\{y_j\}_{j=1}^K$, and produces the final output z, according to Equation 7 shown below, where θ represents the hyperparameters of the mapping function.

$$z = M\left(\{g_i\}_{i=1}^M, \{y_j\}_{j=1}^K; \theta\right) \quad \text{(Equation 7)}$$

For a time-dependent mapping, a variation of Equation 7, designated as Equation 8 below, is able to be used.

$$z(t) = M\left(\{g_i(\tau)\}_{i=1}^M, \{y_j(\tau)\}_{j=1}^K, \tau \in [0, t]; \theta\right) \quad \text{(Equation 8)}$$

In this one preferred embodiment, the hyperparameters θ are able to include λ (a parameter controlling the complexity of M (e.g., degree of a polynomial, number of layers in a neural network)), τ (A time scale parameter determining how far back in time M considers), and $\{w_i\}_{i=1}^M$, $\{v_j\}_{j=1}^K$ (Weight parameters for different inputs and outputs).

The training process involves finding the optimal hyperparameters θ* that minimize some loss function L according to Equation 9 below, where $z_{target}$ is the desired output for a given set of inputs.

$$\theta^* = \arg\min_\theta L(z, z_{target}) \quad \text{(Equation 9)}$$

The neuromorphic field is initialized with random or other weights that satisfy certain conditions. In one embodiment, conditions to be satisfied include, but are not limited to, spectral radius (i.e., the largest absolute eigenvalue of W is set to a value slightly less than 1 to ensure stable dynamics), sparsity, where W is typically sparse, with only a small fraction of possible connections realized, and input scaling, where win is scaled to control the strength of input perturbations.

This initialization ensures that the neuromorphic field exhibits rich, non-linear dynamics without becoming chaotic or unstable. This mathematical framework provides a rigorous description of a system where a complex neuromorphic field transforms inputs, and trainable mapping functions interpret these transformations to produce meaningful outputs. The separation of the fixed, non-linear dynamics of the neuromorphic field from the trainable mapping function allows for a flexible system able to adapt to various tasks without changing its underlying network structure.

Figure 26:
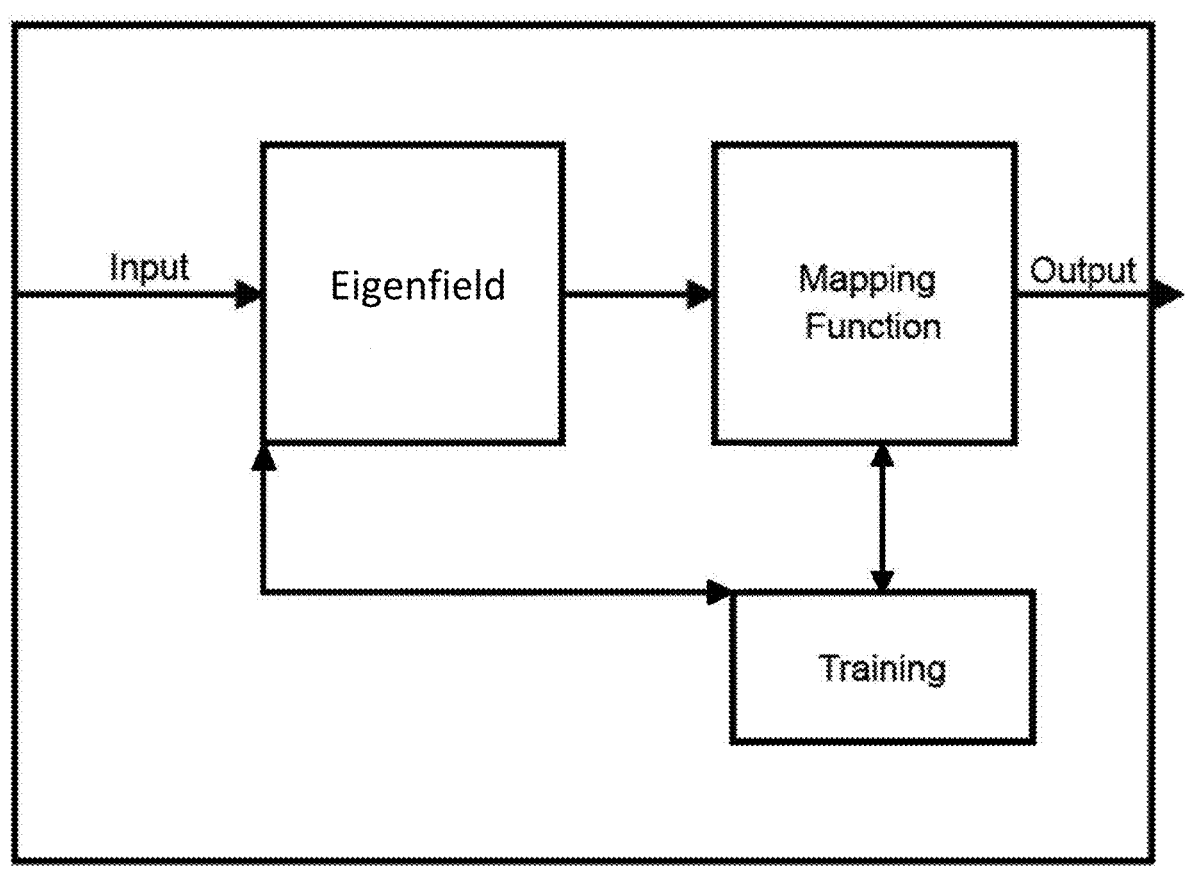
FIG. 26 illustrates a representation of a mapping function for a neural network, including training according to one embodiment of the present invention.

FIG. 26 illustrates a representation of a mapping function for a neural network, including training according to one embodiment of the present invention. The process flow in FIG. 26 goes from left to right, with an input being provided to an eigenfield and the eigenfield providing information to a mapping function, which then provides an output. In one embodiment, the eigenfield is a neuromorphic substrate. Advantageously, the mapping function and training process of the present invention require less power and is more efficient than traditional neural network mapping and training. Mapping is operable to include processes, including synaptic pruning, to eliminate extra synapses and mapping between hidden layers of a neural network, including forward mapping and backward mapping. In one embodiment, the mapping function and training process include a defined set of partial differential equations and pre-pre-training as described herein.

Figure 27:
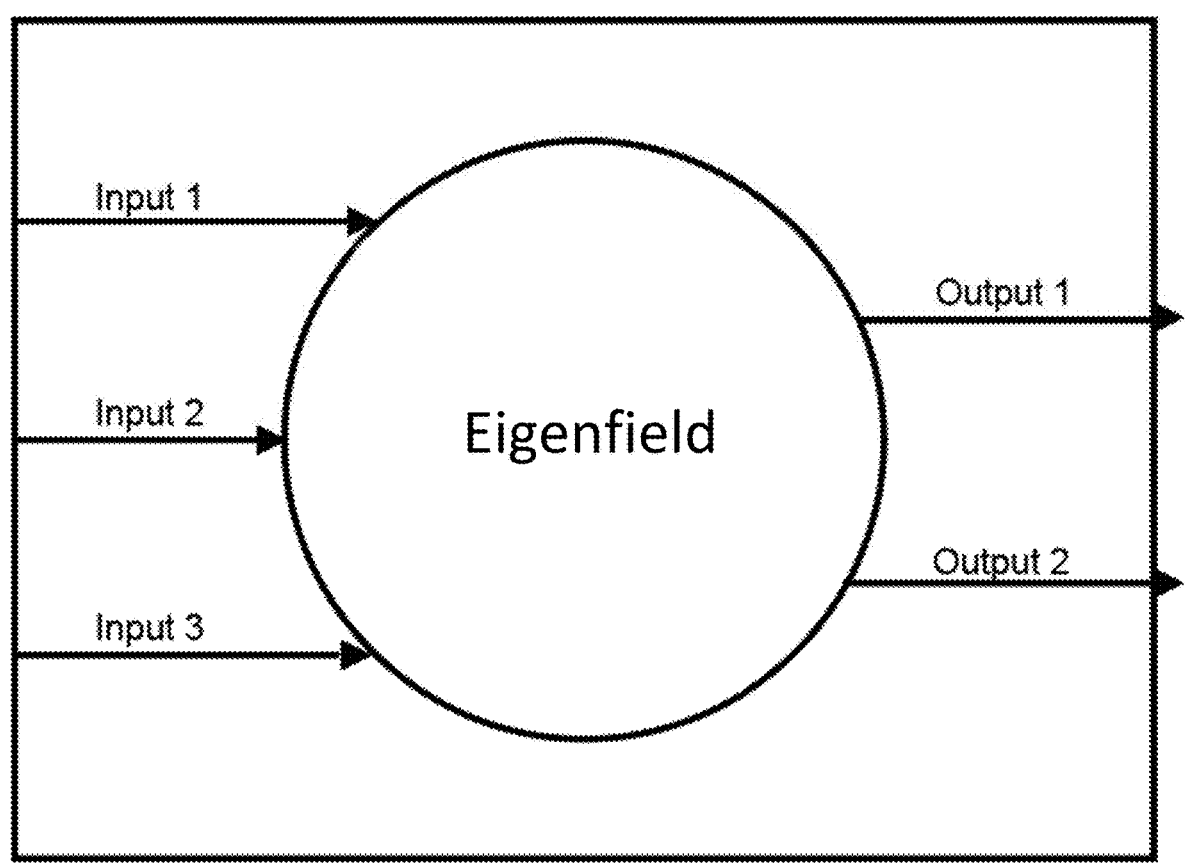
FIG. 27 illustrates a schematic diagram of a system of the present invention.

FIG. 27 illustrates a schematic diagram of a system of the present invention. Multiple inputs are operable to be received by the eigenfield or a neuromorphic substrate, and the eigenfield or neuromorphic substrate is operable to create multiple outputs. In one non-limiting example, the eigenfield or neuromorphic substrate is operable to receive three inputs and produce two outputs. The inputs are operable to include a plurality of different types or formats of inputs and the outputs are operable to include a plurality of different types or formats of outputs.

Example

In one example, the present invention is able to be used for image recognition, particularly for recognition of hand-drawn numerals utilizing a hybrid system that combines elements of convolutional neural networks with the neuromorphic field and associated pre-biased and trained PDEs that provide rich, deterministic nonlinearities to support input-to-output mapped training.

The primary goal of the invention in this case is to bypass the need for traditional deep learning related training of hidden layers in neural networks, thereby offering significantly faster training times and more efficient computation, as well as other advantages.

The key innovation lies in replacing the hidden layers of a traditional neural networks with a neuromorphic field governed by PDEs, analogous to the human brains basis formed early on in life, but with key differences and resulting utilities. This approach leverages the power of both neural networks and differential equations to create a more flexible and potentially more interpretable model for function approximation and representation tasks, thereby enabling this neural network-based system to serve as a universal function approximator, while bypassing the need for time, cost, and energy inefficient training and optimization of hidden layers inherent to traditional deep learning neural network architectures.

Figure 28:
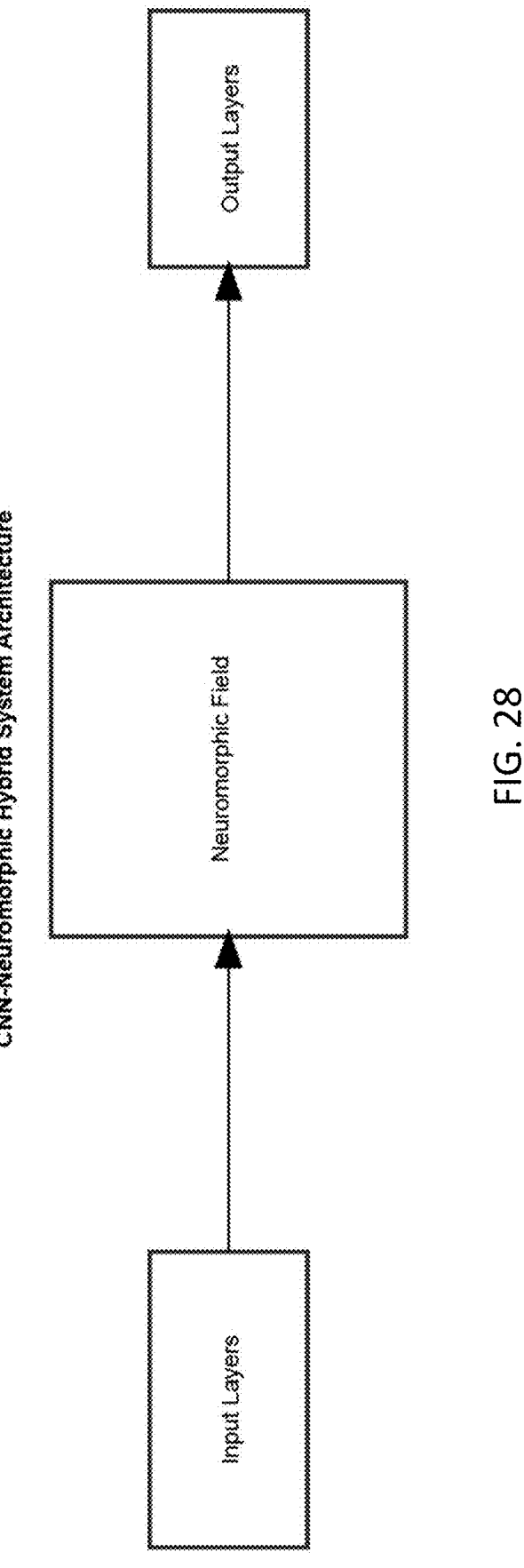
FIG. 28 illustrates a schematic diagram of a system according to one embodiment of the present invention.

As shown in FIG. 28, the input layers in this example are derived from the initial layers of a CNN and are responsible for initial feature extraction from input images of handwritten digits. The neuromorphic field replaces the hidden layers of a traditional CNN and utilizes PDEs and related architecture of the neuromorphic field to process and transform the extracted features. The output layers are then derived from the final layers of a CNN, producing final classification probabilities.

In the input processing stage, the hand-drawn numeral image is prepared for feature extraction. This hand-drawn numeral image (e.g., 28×28 pixels in greyscale) is passed through initial convolutional and pooling layers of a CNN which are configured using standard techniques. Feature maps are extracted from the input layers, representing low-level features such as edges, corners, and textures in the image. Therefore, the input layer transforms raw pixel data into a meaningful set of features that is able to then be transformed by the neuromorphic field and differentially mapped to an output across the field, leveraging proven effectiveness of CNNs in extracting relevant features while handing off primitive elements to the neuromorphic field.

Figure 29:
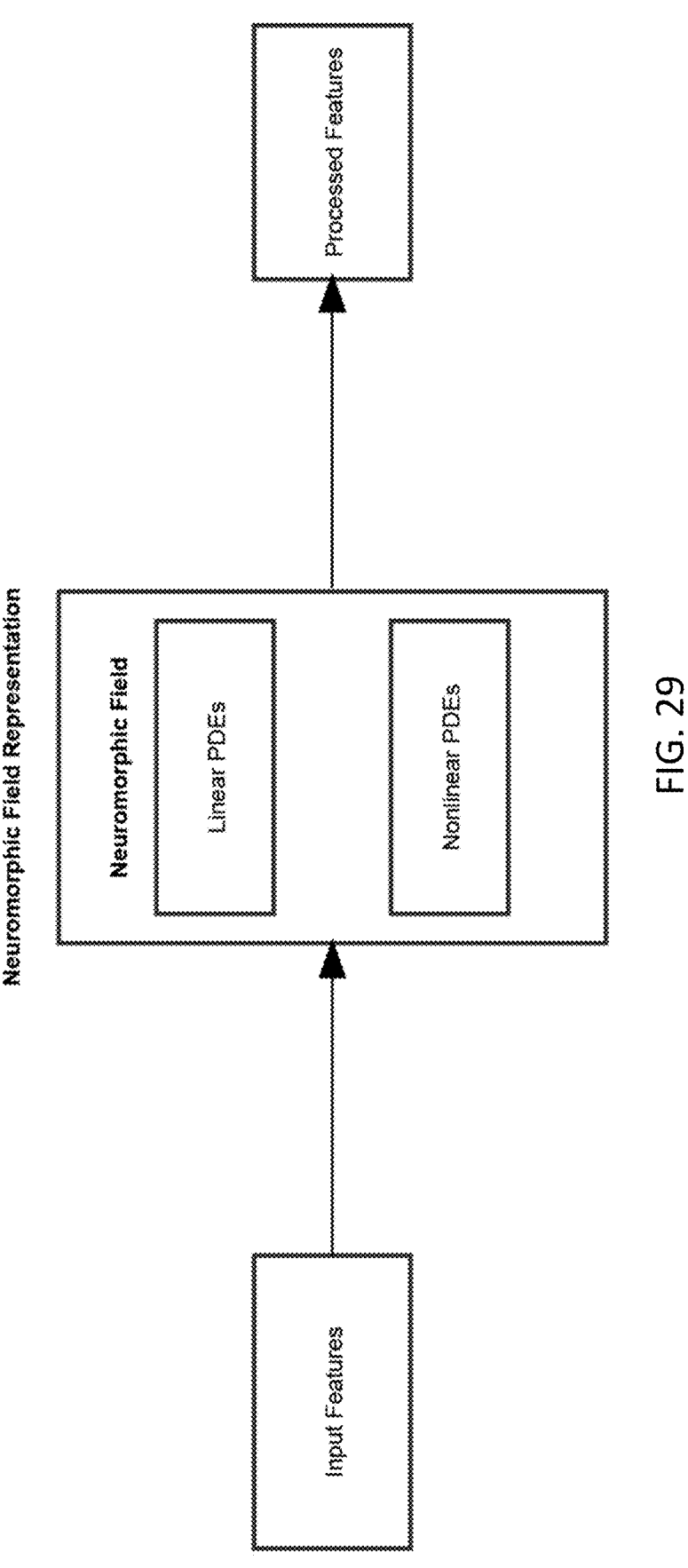
FIG. 29 illustrates a schematic diagram of a system utilizing both linear and nonlinear PDEs according to one embodiment of the present invention.

The neuromorphic field stage represents a core portion of this particular invention. The neuromorphic field is pre-defined and pre-trained to induce deterministically bounded nonlinearities across the field using a set of PDEs. This creates sets of linear and nonlinear related PDEs that support input to output transformation across the field, such that the input-output mapping is defined by the training using the handwritten numeral data. The PDEs employed represent archetypical patterns designed to provide a rich set of deterministically bounded transformations for the input data. The neuromorphic field is used to map the extracted features from the input processing stage across the field, involving transforming the feature maps into transformed elements. Nonlinear transformations are applied and solved across the PDEs to process the information based on standards sets of differentially mapped transform equations, which involves numerical integration of the PDEs over a specified time interval. A diagram of this process is shown in FIG. 29.

In this way, the neuromorphic field replaces the hidden layers of a traditional deep learning neural network, while the PDEs introduce a continuous physics-inspired model able to effectively capture complex patterns and relationships in the data for increased flexibility, efficiency, and interpretability compared to hidden layer approaches.

The output generation stage produces the final classification result, mapping the processed information from the neuromorphic field to the input of the CNN's output layers. The output layers of the CNN are used to generate the final classification probabilities for numerical digits (e.g., 0-9). In one embodiment, the layers involve one or more fully connected layers followed by a softmax activation.

Figure 30:
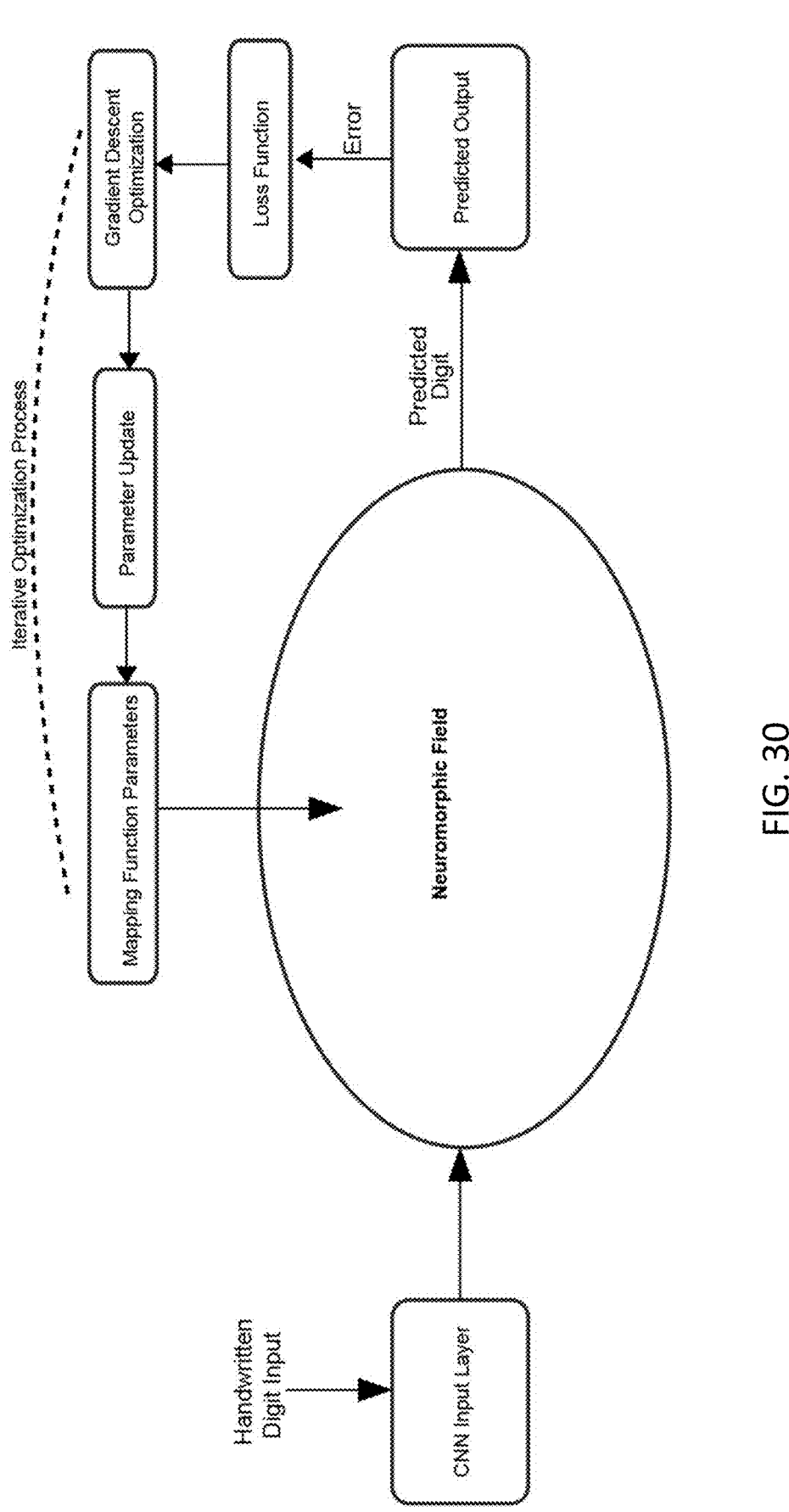
FIG. 30 illustrates a schematic diagram of a system for training a neural network according to one embodiment of the present invention.

The mapping optimization training process in this case differs from traditional neural network training as, instead of using backpropagation through multiple hidden layers, the PDEs and neuromorphic field parameters are adjusted based on error between predicted and actual outputs. This adjustment process involves techniques from both machine learning and numerical analysis of PDEs and is iterated until the desired accuracy is achieved or until a maximum number of iterations is reached. This process is shown in the diagram of FIG. 30.

By bypassing traditional hidden layer weight updates, the system is able to achieve faster training times, especially compared to other deep networks. The system also has improved interpretability due to the use of PDEs, as the PDEs have clear physical and mathematical meanings and are fully differentiable and deterministically bounded. Further, by combining the strengths of CNNs in feature extraction and the expressive power of PDEs, the system is more flexible and able to capture more complex patterns in the data. Finally, the continuous nature of the neuromorphic field offers improved scalability to high-dimensional data compared to discrete neural network layers.

Figure 31:
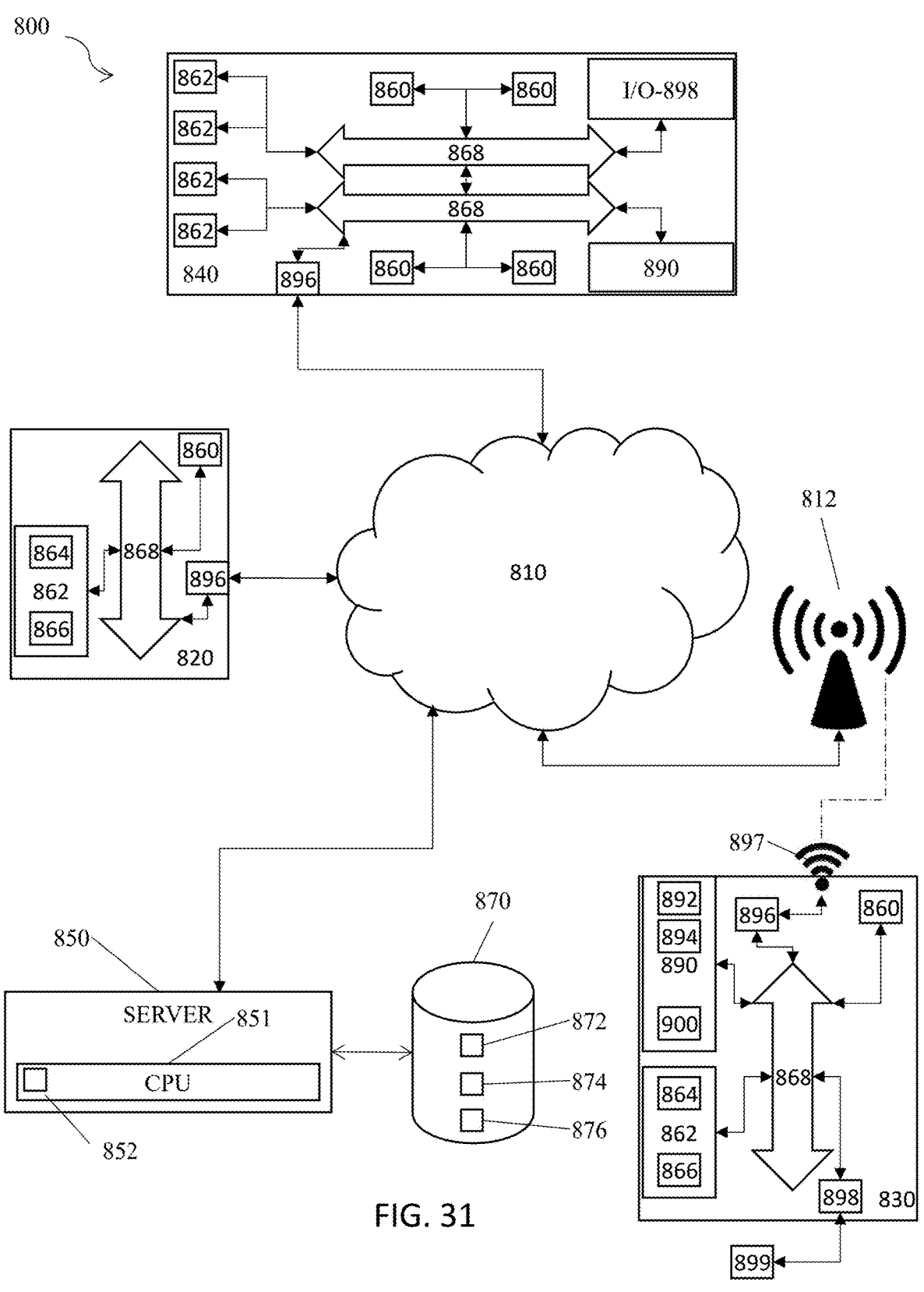
FIG. 31 is a schematic diagram of a system of the present invention.

FIG. 31 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, gaming controllers, joy sticks, touch pads, signal generation devices (e.g., speakers), augmented reality/virtual reality (AR/VR) devices (e.g., AR/VR headsets), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 31, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable to be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 31, is operable to include other components that are not explicitly shown in FIG. 31, or is operable to utilize an architecture completely different than that shown in FIG. 31. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A neural network, comprising:
an input layer;
an output layer;
an input-to-output mapping function; and
a neuromorphic field connecting the input layer to the output layer;
wherein the neural network is trained using regularization, scaled dot product attenuation, and gating structures;
wherein the neuromorphic field is operable to form patterns in response to different inputs and/or input types;
wherein the input-to-output mapping function includes at least one adjustable partial differential equation (PDE) hyperparameter;
wherein the input-to-output mapping function is operable to perform synaptic pruning;
wherein a PDE Solver computes evolution of the neuromorphic field over time;
wherein the neuromorphic field is operable to be sampled at learned sampling points;
wherein the at least one adjustable PDE hyperparameter represents complexity of the input-to-output mapping function, time scale and pattern weight; and
wherein the neuromorphic field includes a plurality of interconnected artificial neurons whose behaviors are defined and governed by one or more PDEs.

2. The neural network of claim 1, wherein the output layer is operable to apply a transformation to achieve a desired output format.

3. The neural network of claim 1, wherein the one or more PDEs include a reaction-diffusion PDE.

4. The neural network of claim 1, wherein the input layer receives input data, normalizes the input data, converts the input data into continuous signals, and injects the continuous signals into the neuromorphic field.

5. The neural network of claim 1, wherein the plurality of interconnected artificial neurons includes one or more excitatory nodes, one or more inhibitory nodes, one or more oscillatory nodes, one or more adaptive nodes, and/or one or more modulatory nodes.

6. The neural network of claim 1, wherein the neuromorphic field includes one or more boundary conditions, including one or more periodic boundaries, one or more reflective boundaries, one or more Robin boundaries, and/or one or more absorbing boundaries.

7. The neural network of claim 1, wherein a training process of the neural network includes backpropagation.

8. The neural network of claim 1, wherein the neural network is utilized for audio enhancement and audio restoration.

9. A neural network, comprising:
an input layer;
an output layer;
an input-to-output mapping function; and
a neuromorphic field connecting the input layer to the output layer;
wherein the neural network is trained using regularization, scaled dot product attenuation, and gating structures;
wherein the neuromorphic field is operable to form patterns in response to different inputs and/or input types;
wherein the input-to-output mapping function includes at least one adjustable partial differential equation (PDE) hyperparameter;
wherein the input-to-output mapping function is operable to perform synaptic pruning;
wherein the at least one adjustable PDE hyperparameter represents complexity of the input-to-output mapping function, time scale and/or pattern weight;
wherein a PDE Solver computes evolution of the neuromorphic field over time;
wherein the neuromorphic field is operable to be sampled at learned sampling points;
wherein the neuromorphic field is defined by one or more PDEs having one or more boundary conditions; and
wherein the one or more PDEs includes a reaction-diffusion PDE.

10. The neural network of claim 9, wherein the output layer is operable to apply a transformation to achieve a desired output format.

* * * * *